(12) United States Patent
Savenok

(10) Patent No.: US 11,684,197 B2
(45) Date of Patent: Jun. 27, 2023

(54) PORTABLE BEVERAGE SYSTEM AND ASSEMBLY

(71) Applicant: Pavel Savenok, Wheaton, IL (US)

(72) Inventor: Pavel Savenok, Wheaton, IL (US)

(73) Assignee: Resolute Patents, LLC, Wheaton, IL (US)

( * ) Notice: Subject to any disclaimer, the term of this patent is extended or adjusted under 35 U.S.C. 154(b) by 450 days.

(21) Appl. No.: 16/389,157

(22) Filed: Apr. 19, 2019

(65) Prior Publication Data

US 2019/0320839 A1     Oct. 24, 2019

Related U.S. Application Data

(60) Provisional application No. 62/660,662, filed on Apr. 20, 2018, provisional application No. 62/689,330, (Continued)

(51) Int. Cl.
*B65D 85/80*     (2006.01)
*B65D 51/20*     (2006.01)
(Continued)

(52) U.S. Cl.
CPC ........... *A47J 31/005* (2013.01); *A47J 31/407* (2013.01); *A47J 31/4407* (2013.01); *A47J 31/46* (2013.01); *A47J 31/521* (2018.08); *B60N 3/18* (2013.01); *B65D 51/2807* (2013.01); *B65D 85/8046* (2013.01)

(58) Field of Classification Search
CPC .............. B65D 85/8043; B65D 85/804; B65D 85/8046; B65D 51/28; B65D 51/2807; B65D 51/2814; B65D 51/2821; B65D 51/2828; B65D 51/2835; B65D 75/327; B65D 21/0237; B65D 21/0233;
(Continued)

(56) References Cited

U.S. PATENT DOCUMENTS 5,472,719 A * 12/1995 Favre .................. A47J 31/0673
426/112
2002/0134249 A1 * 9/2002 Melton .................... A47J 31/10
99/317
(Continued)

*Primary Examiner* — Ericson M Lachica
(74) *Attorney, Agent, or Firm* — Christopher J. Scott

(57) ABSTRACT

A beverage service system, assembly, and method enable a consumer to portably consume a beverage output from a single-service beverage media container. The beverage service system incorporates a lid formation and a liquid container. The lid formation is configured to receive and retain a single-service beverage media container, and provides a primary beverage outlet, a container-receiving aperture, and a container retention mechanism. The single-service beverage media container is received in the container-receiving aperture and retained by the container retention mechanism. The lid formation is attached to the primary liquid container thereby forming a lid-container combination. A liquid such as hot water may be directed through the single-service beverage media container as received and retained by the lid formation for outputting beverage therefrom into the liquid container. The beverage, as outlet from the lid formation and collected in the liquid container, may then be consumed via the primary beverage outlet.

18 Claims, 38 Drawing Sheets

Related U.S. Application Data filed on Jun. 25, 2018, provisional application No. 62/699,109, filed on Jul. 17, 2018.

(51) Int. Cl.

| | | |
|---|---|---|
| *A47J 31/00* | (2006.01) | |
| *A47J 31/40* | (2006.01) | |
| *A47J 31/50* | (2006.01) | |
| *A47J 31/44* | (2006.01) | |
| *B60N 3/18* | (2006.01) | |
| *A47J 31/52* | (2006.01) | |
| *B65D 51/28* | (2006.01) | |
| *B65D 85/804* | (2006.01) | |
| *A47J 31/46* | (2006.01) | |

(58) Field of Classification Search
CPC ......... B60N 3/18; A47J 31/005; A47J 31/407; A47J 31/4407; A47J 31/46; A47J 31/521
See application file for complete search history.

(56) References Cited

U.S. PATENT DOCUMENTS

| | | | | |
|---|---|---|---|---|
| 2009/0311384 | A1* | 12/2009 | MacMahon | B65D 85/8043 426/78 |
| 2010/0006534 | A1* | 1/2010 | Dlouhy | B65D 23/12 215/383 |
| 2010/0154645 | A1* | 6/2010 | Nosler | A47J 31/36 99/281 |
| 2010/0264150 | A1* | 10/2010 | Leon | A47G 19/2261 220/669 |
| 2011/0142996 | A1* | 6/2011 | Kruger | B65B 29/022 426/80 |
| 2011/0303095 | A1* | 12/2011 | Fu | A47J 31/06 99/317 |
| 2012/0321756 | A1* | 12/2012 | Estabrook | B65D 51/246 426/115 |
| 2014/0123859 | A1* | 5/2014 | Verbeek | A47J 31/407 99/295 |
| 2014/0154369 | A1* | 6/2014 | Kolls | B67D 1/008 426/115 |
| 2014/0178538 | A1* | 6/2014 | Husband | A47J 31/446 426/115 |
| 2015/0110928 | A1* | 4/2015 | Kihnke | B65D 85/8043 426/110 |
| 2016/0058239 | A1* | 3/2016 | Bentley | A47J 31/0605 426/433 |
| 2016/0367072 | A1* | 12/2016 | Boone | A47J 43/046 |
| 2017/0129692 | A1* | 5/2017 | Ayaroglu | B65D 85/8043 |
| 2018/0099805 | A1* | 4/2018 | Johnson | B65D 51/1644 |

* cited by examiner

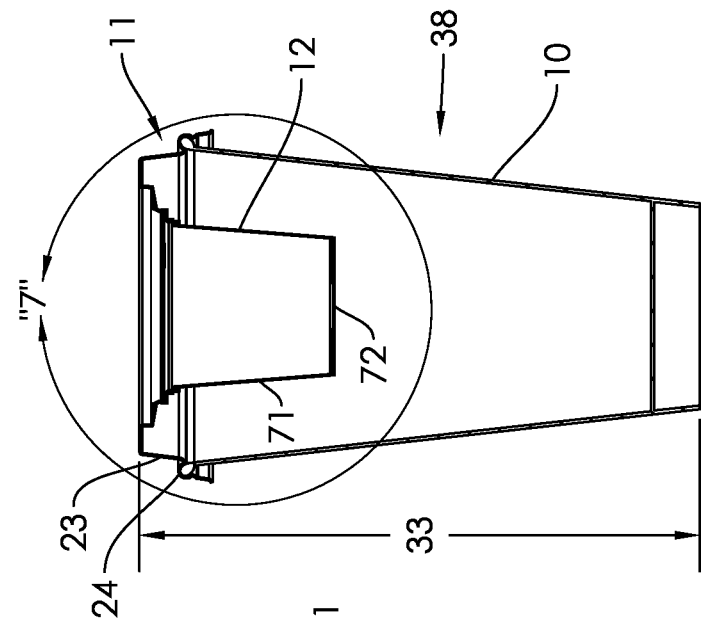
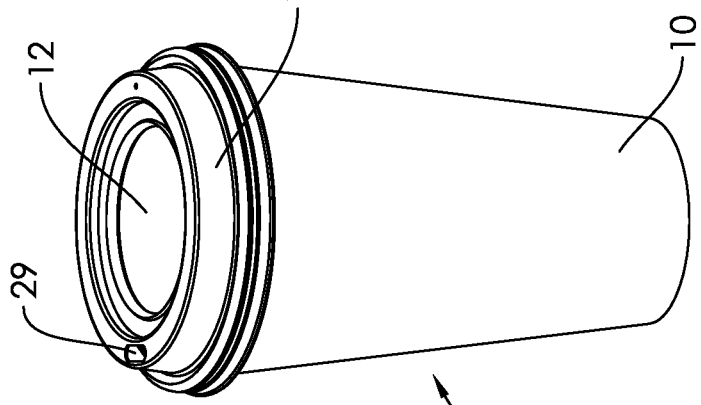
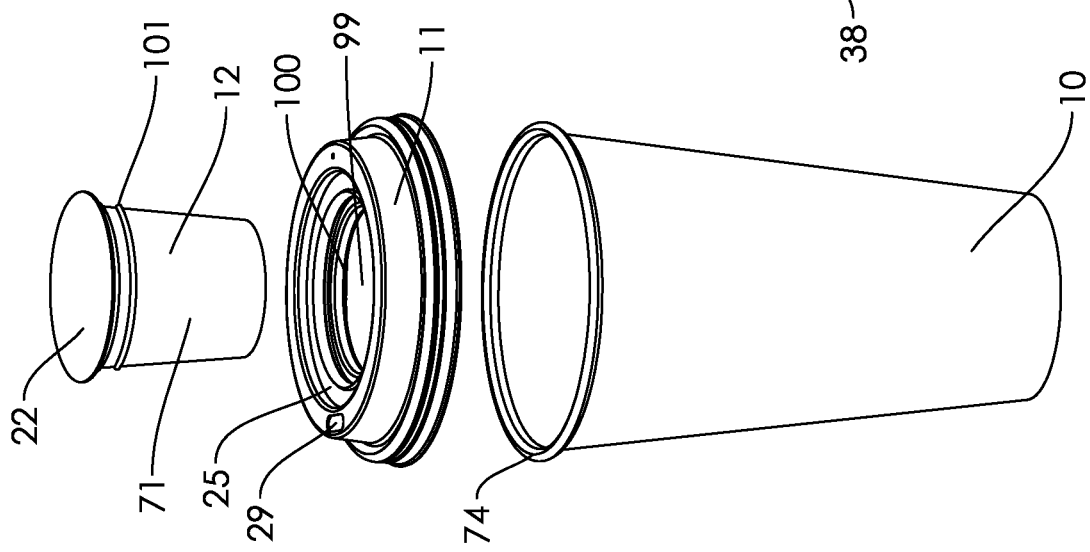

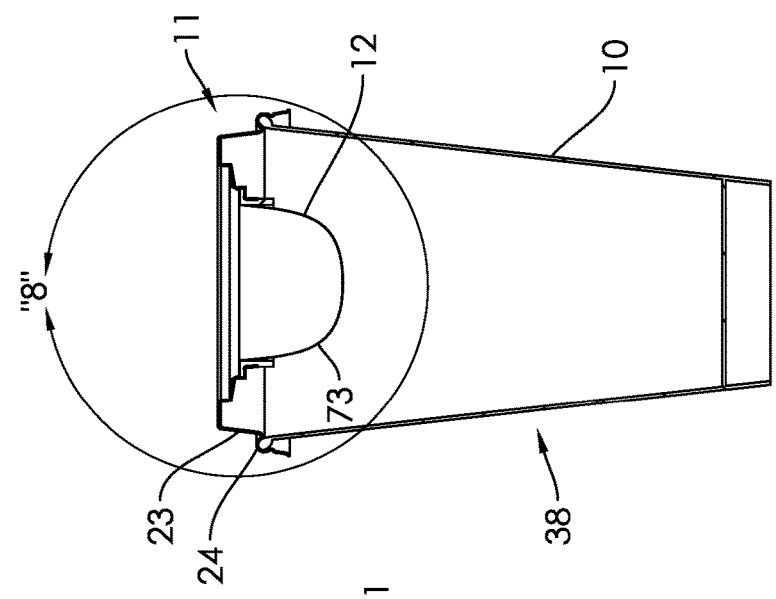
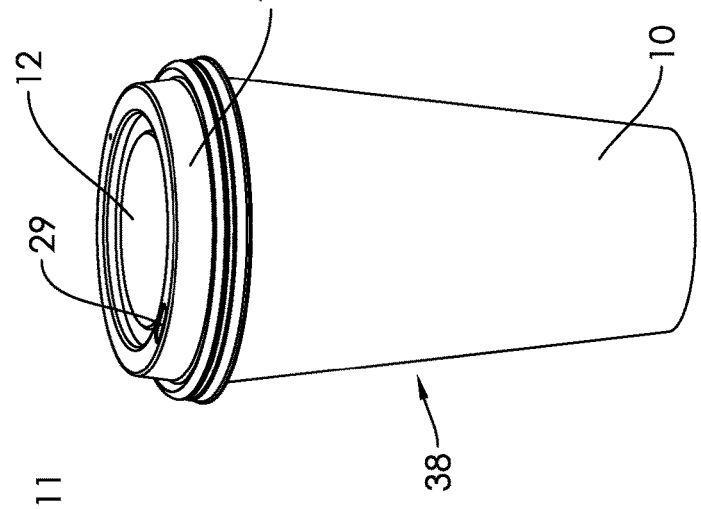
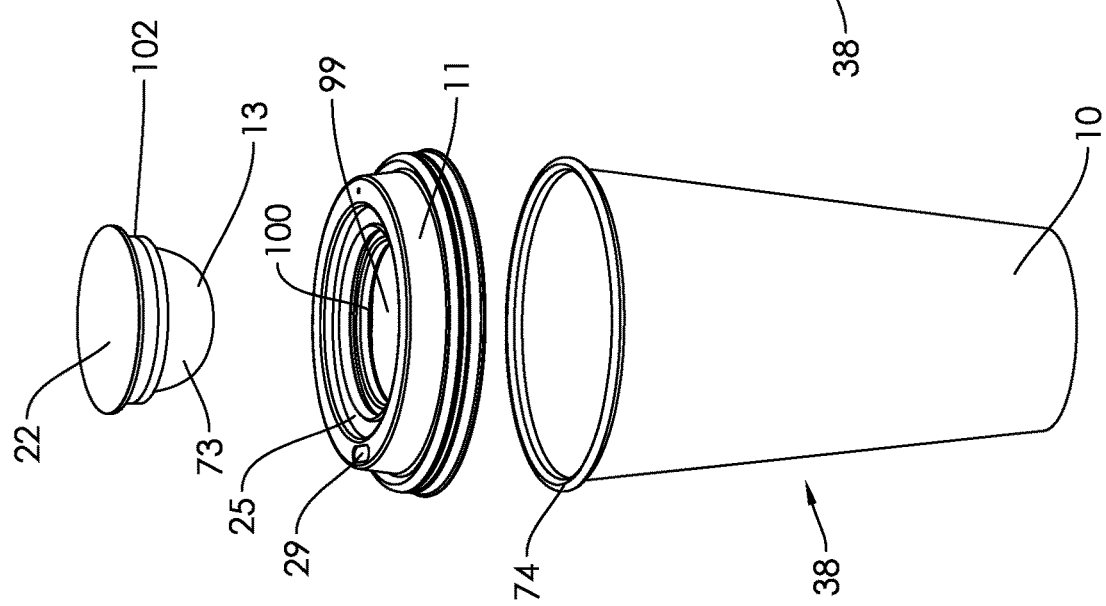

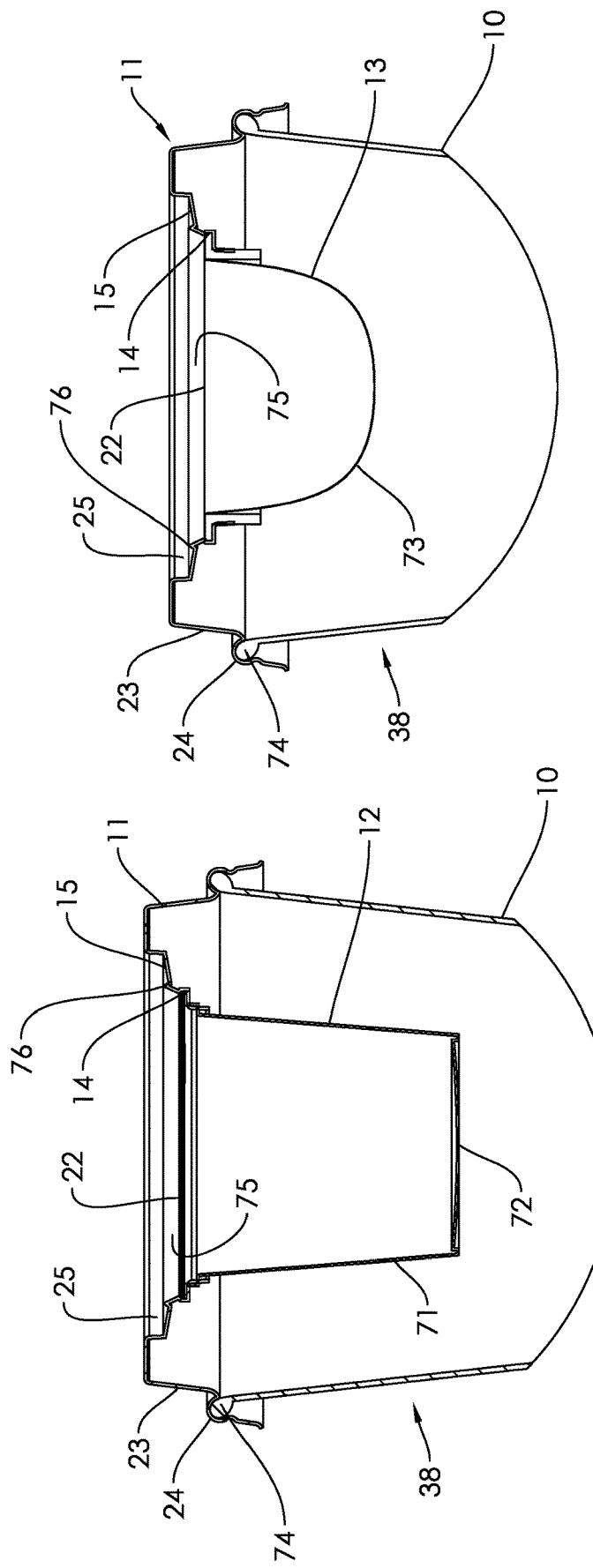

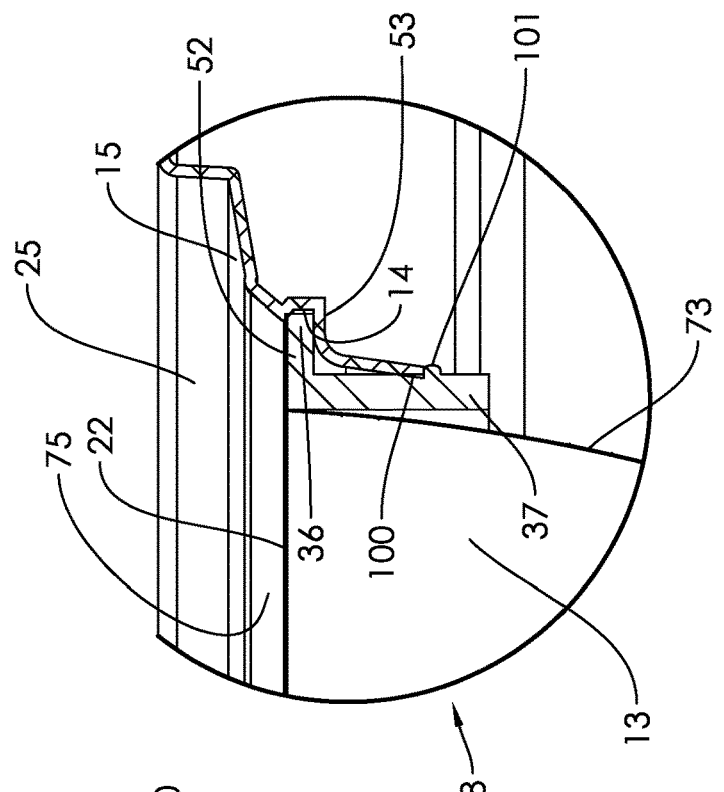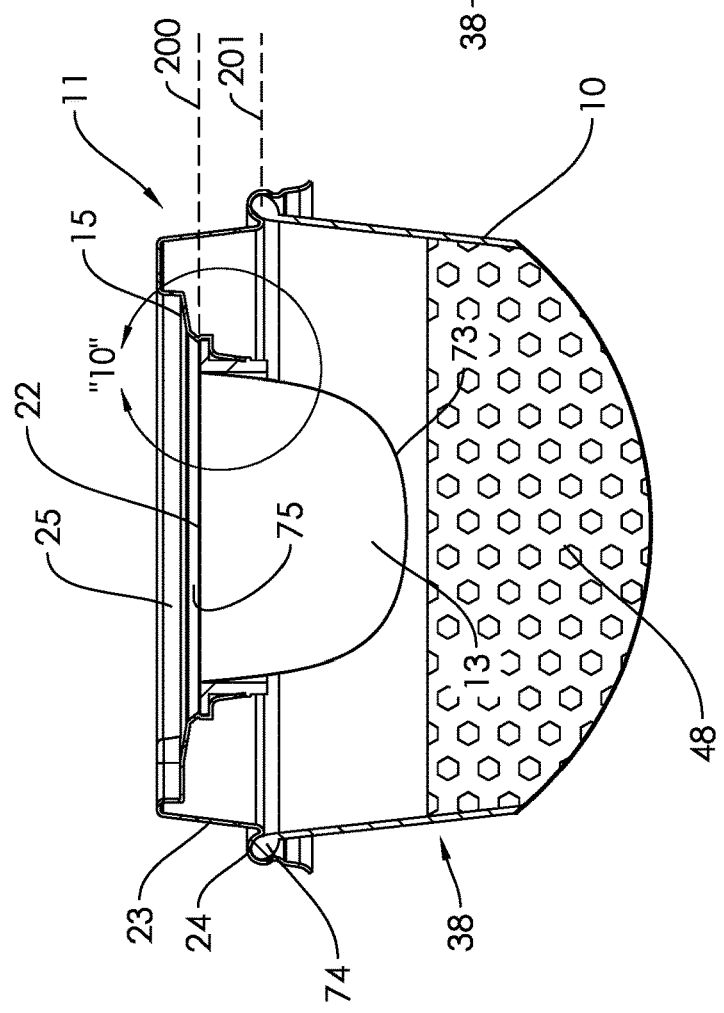

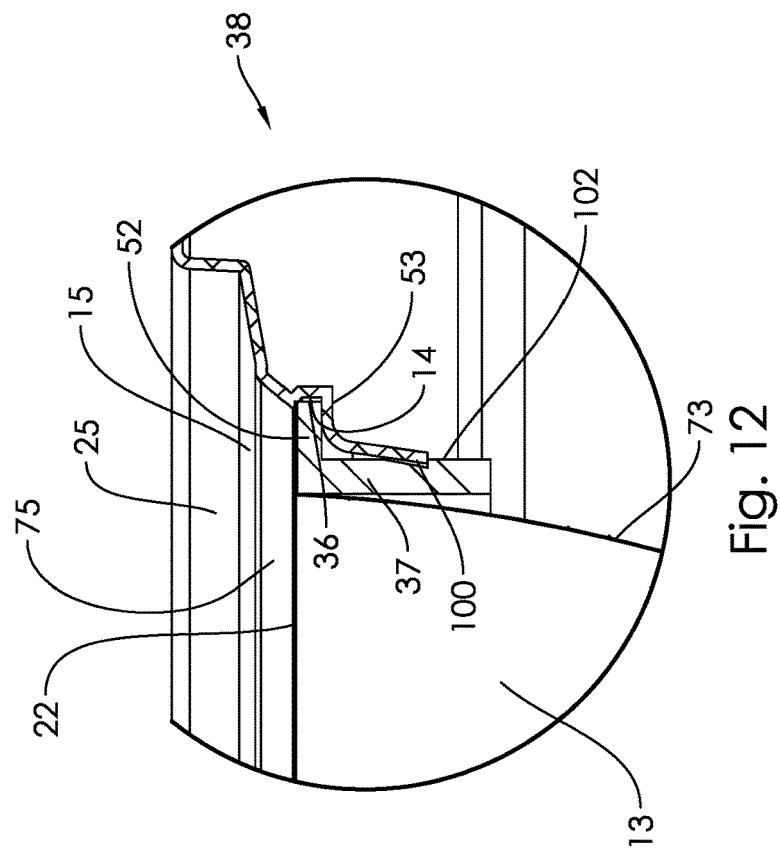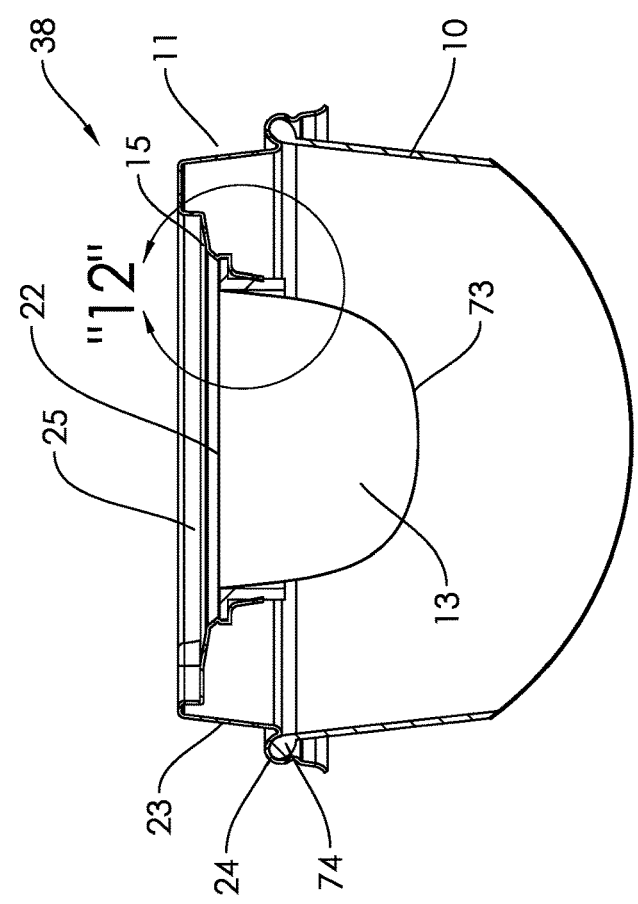

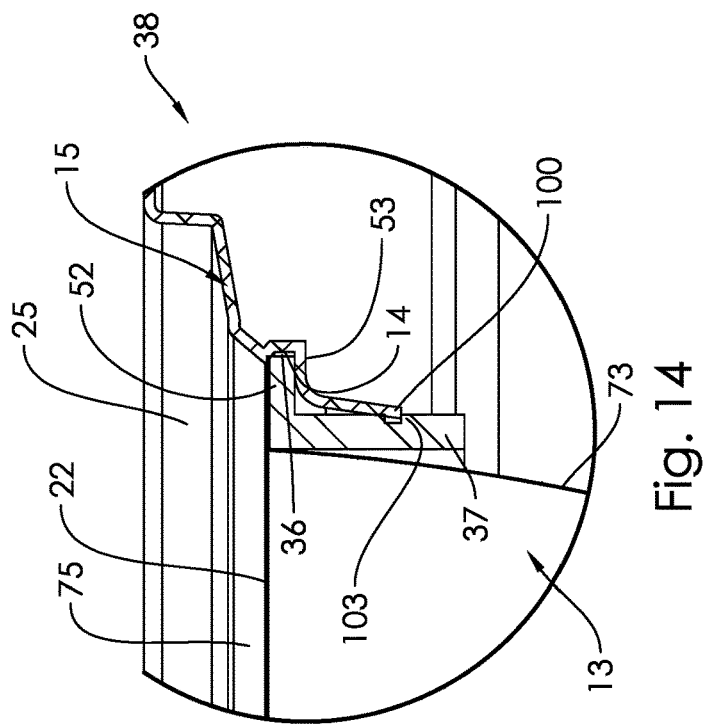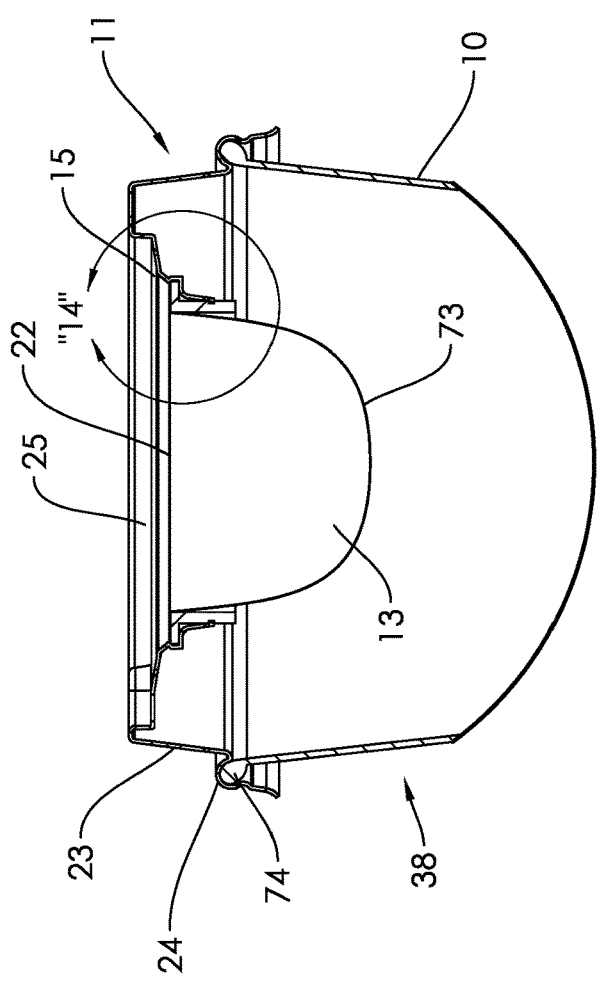

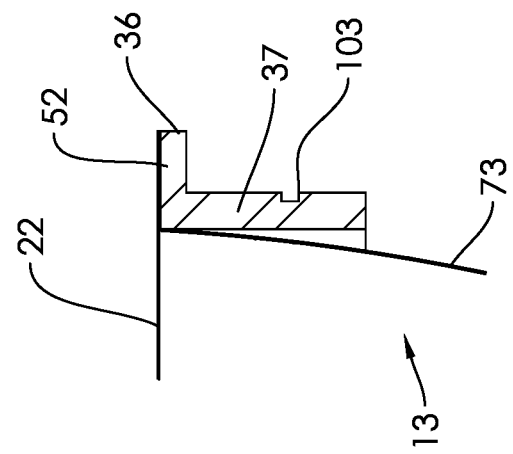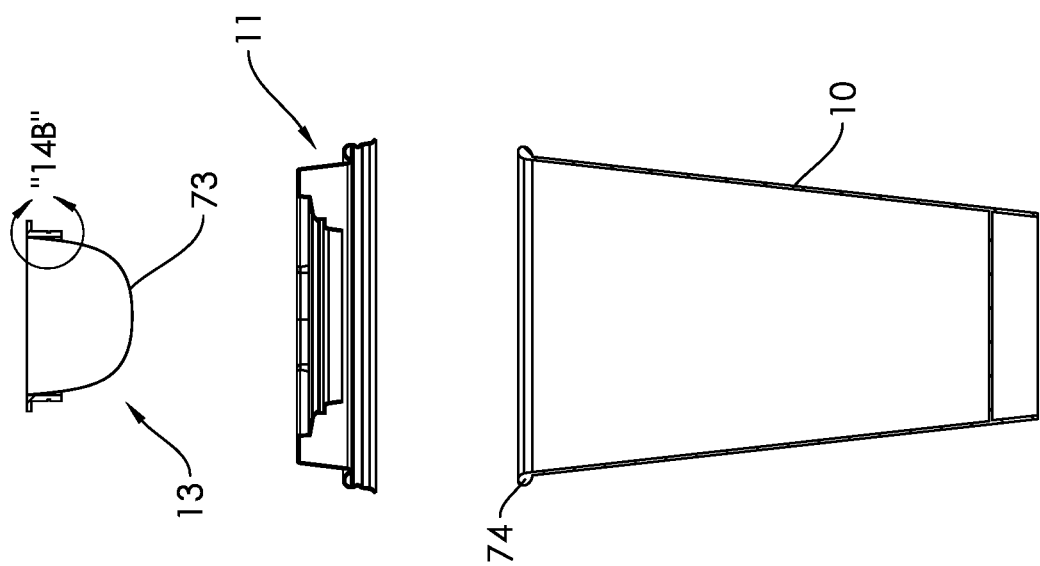

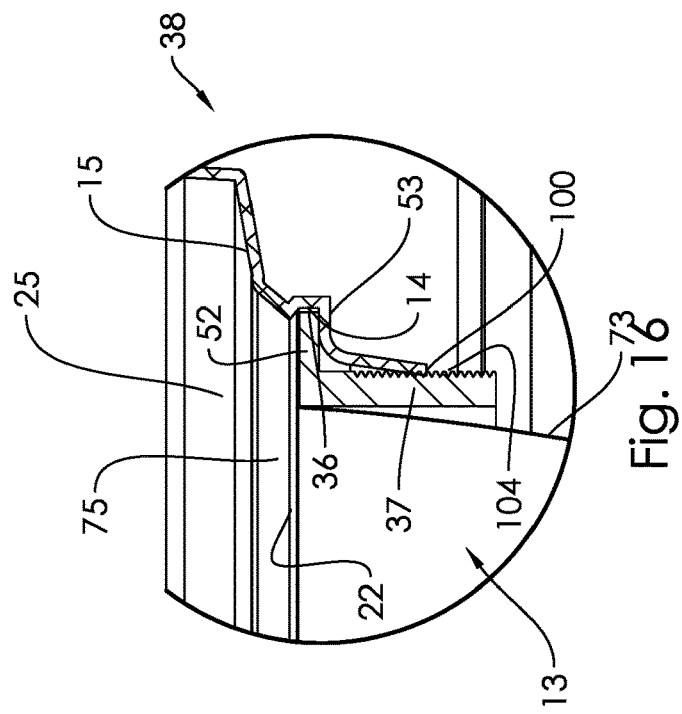
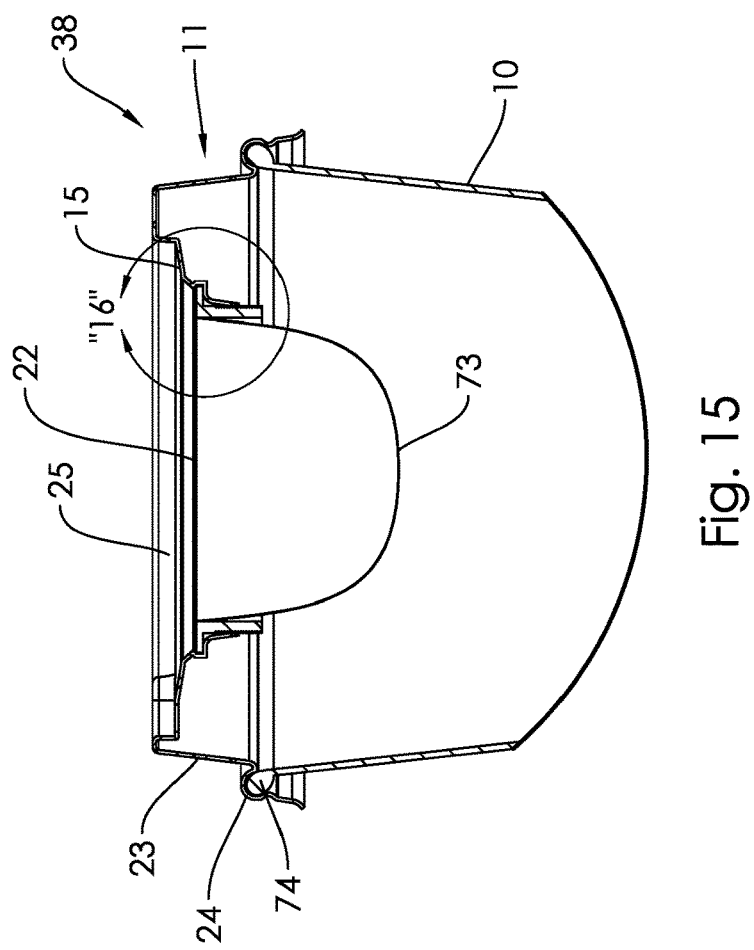

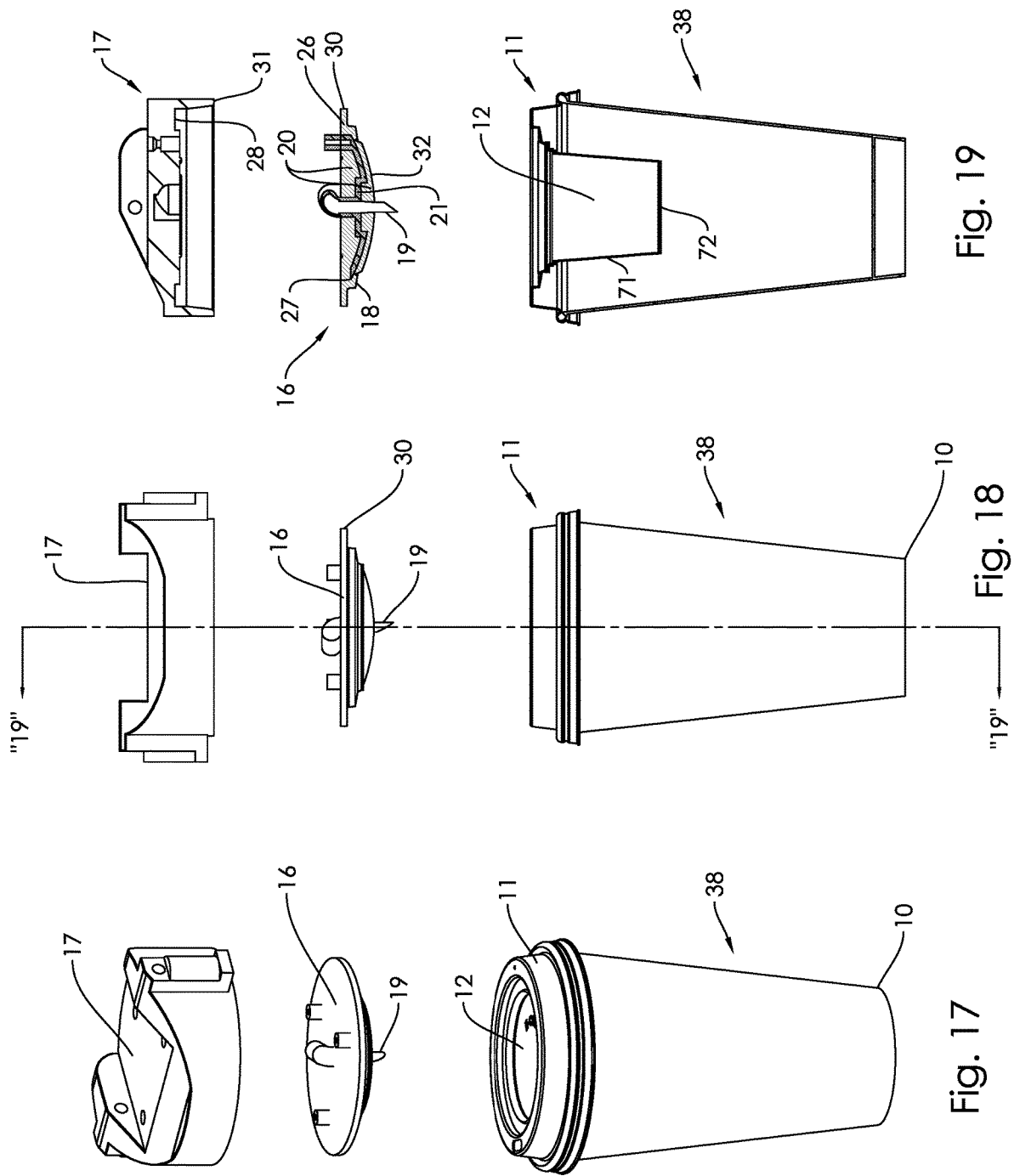

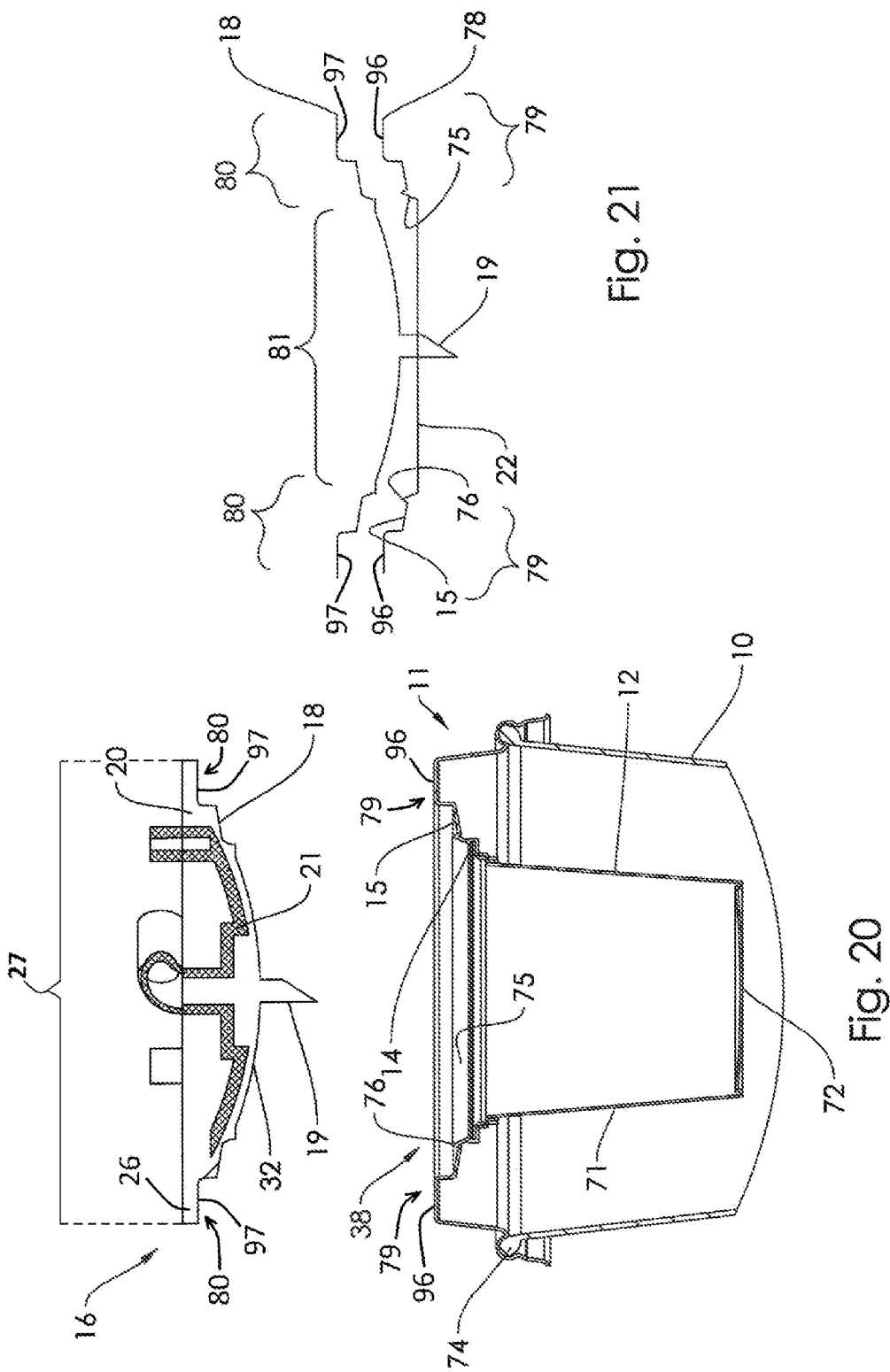

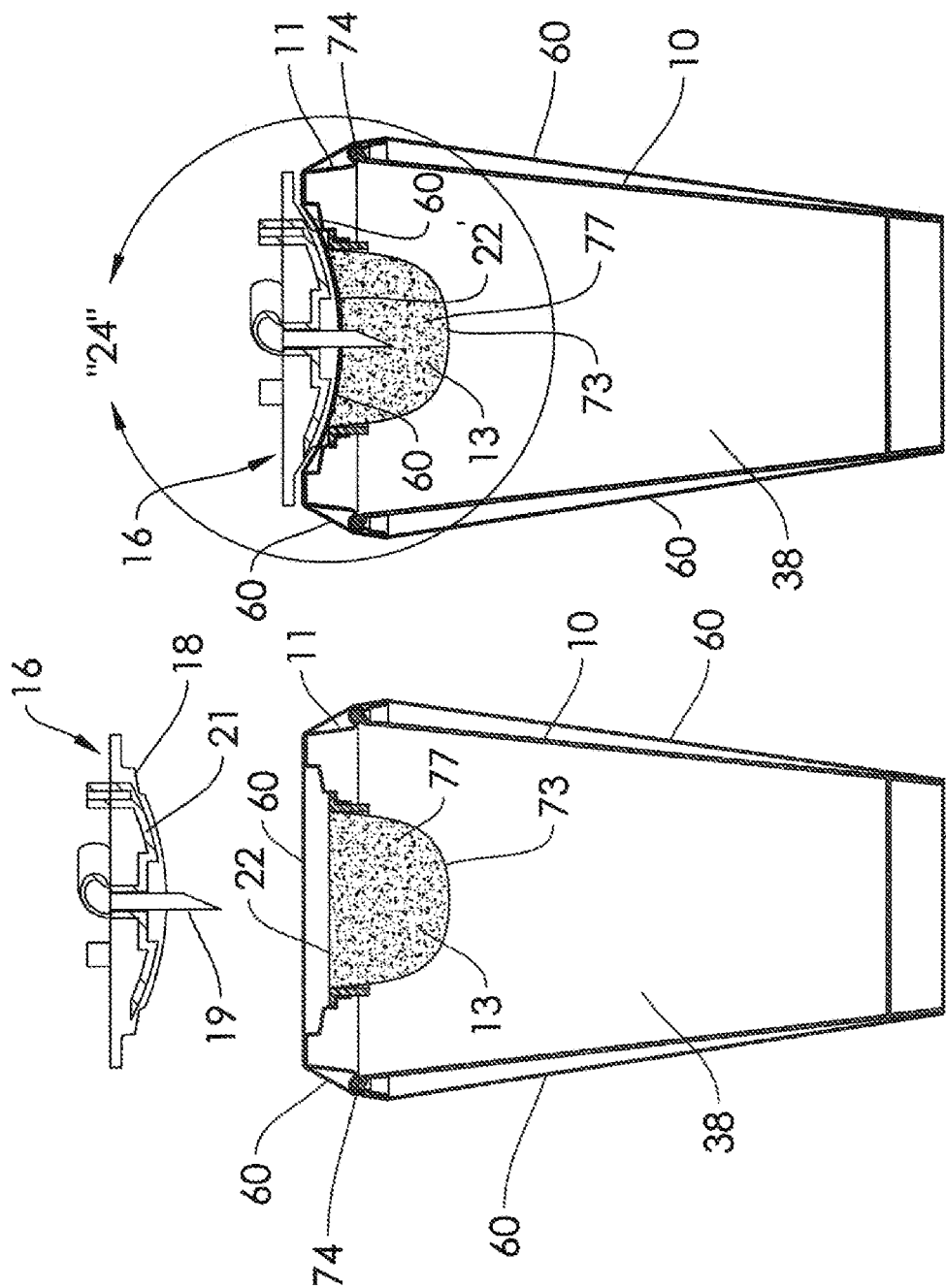

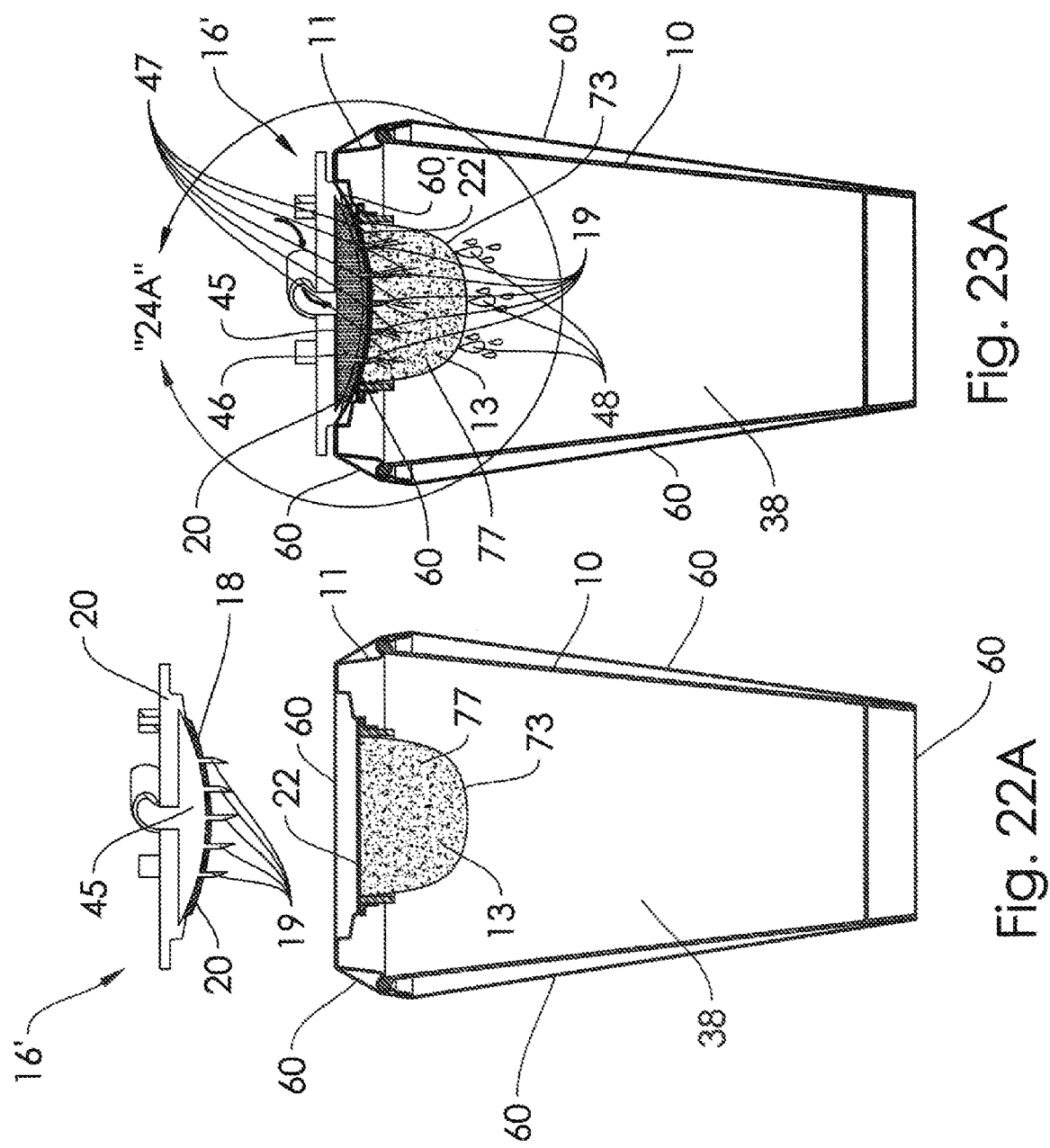

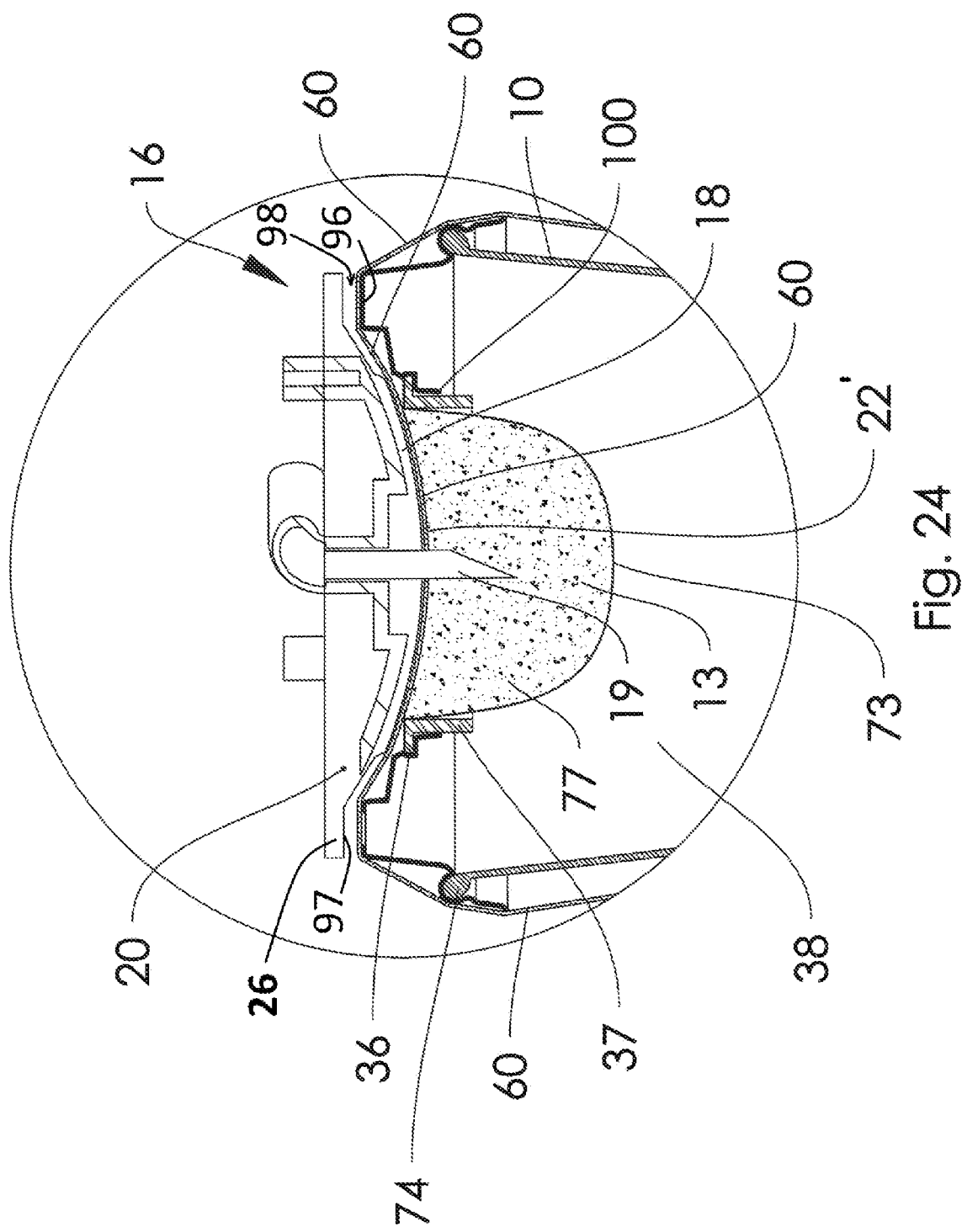

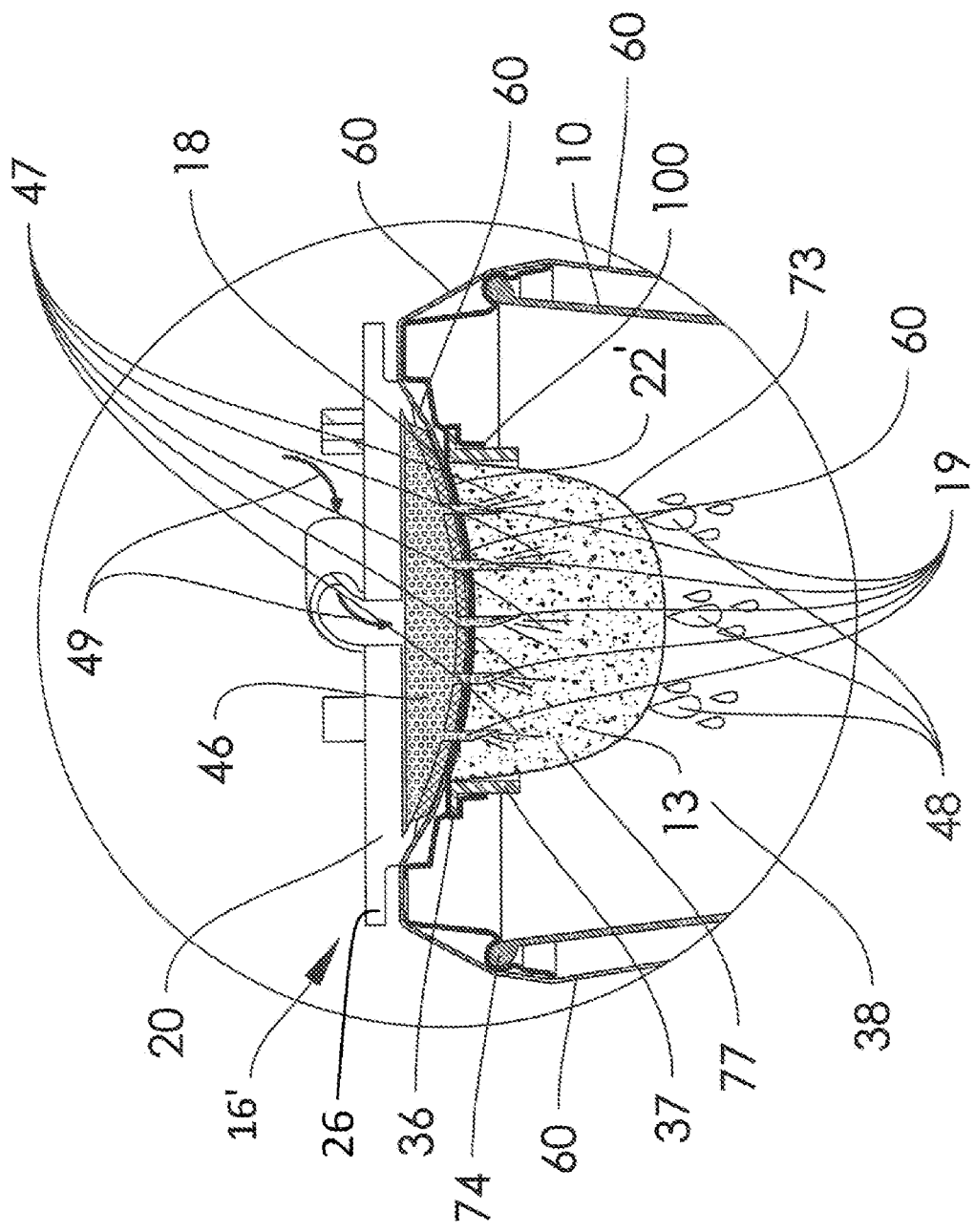

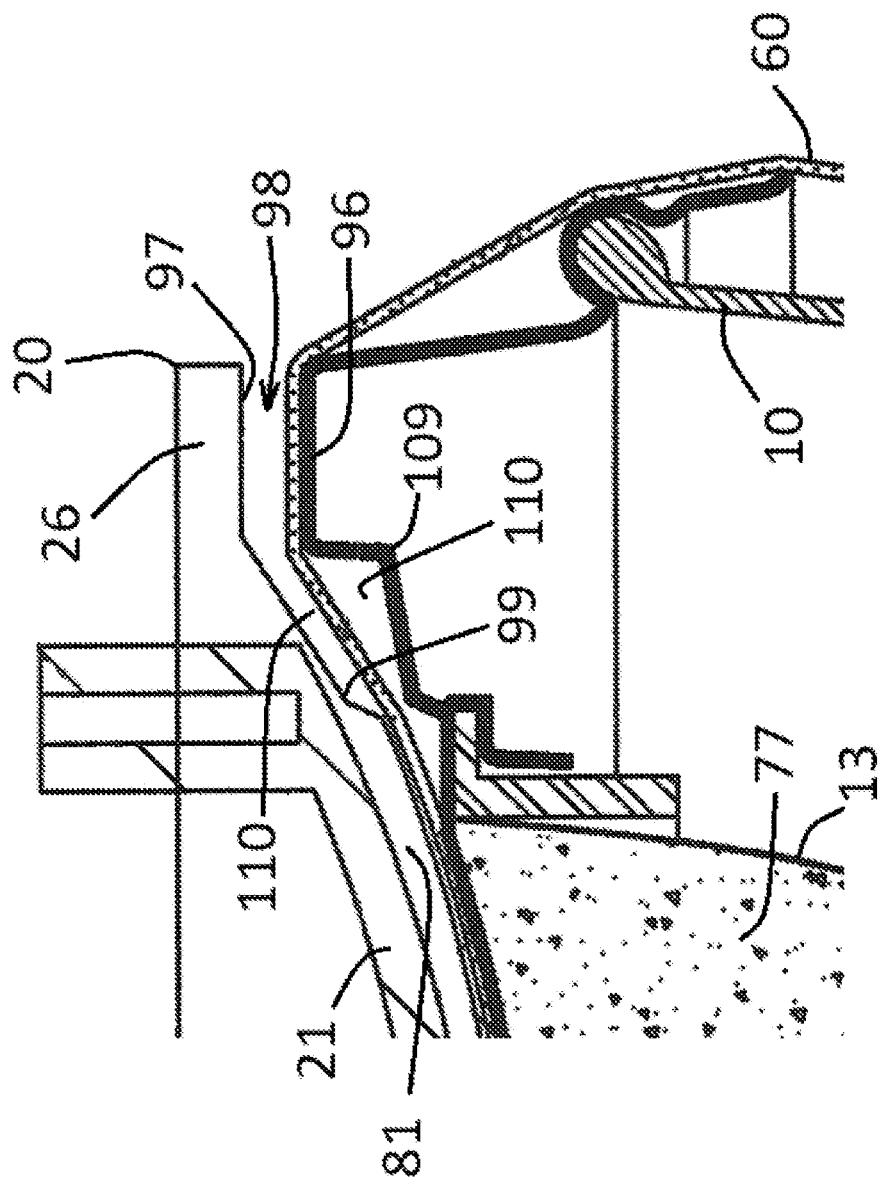

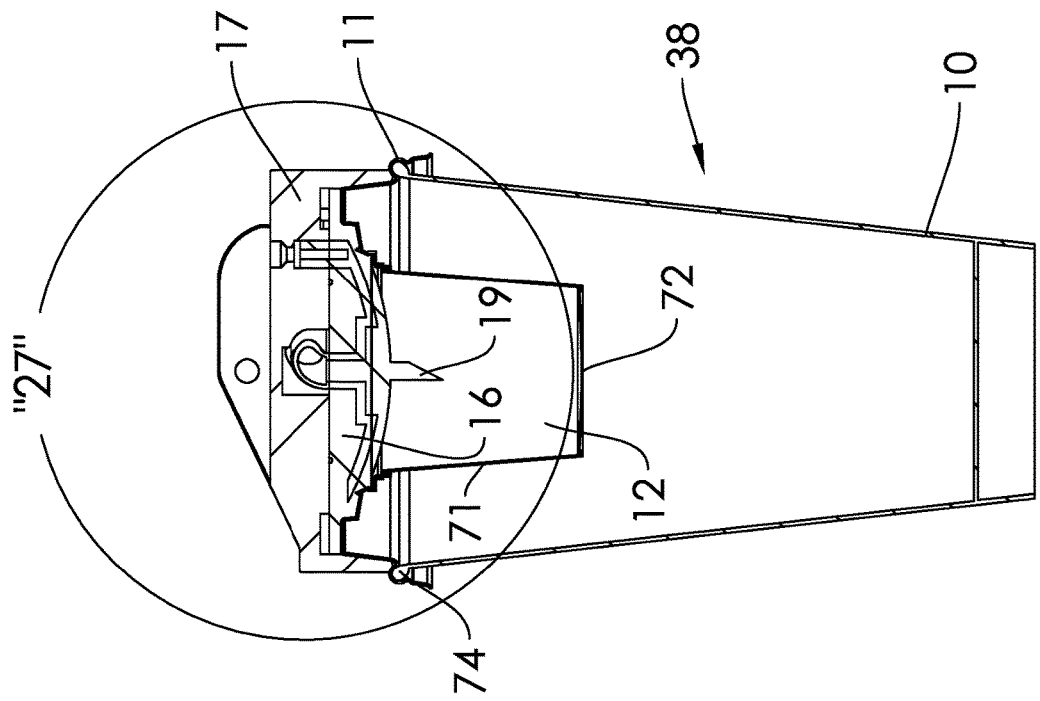
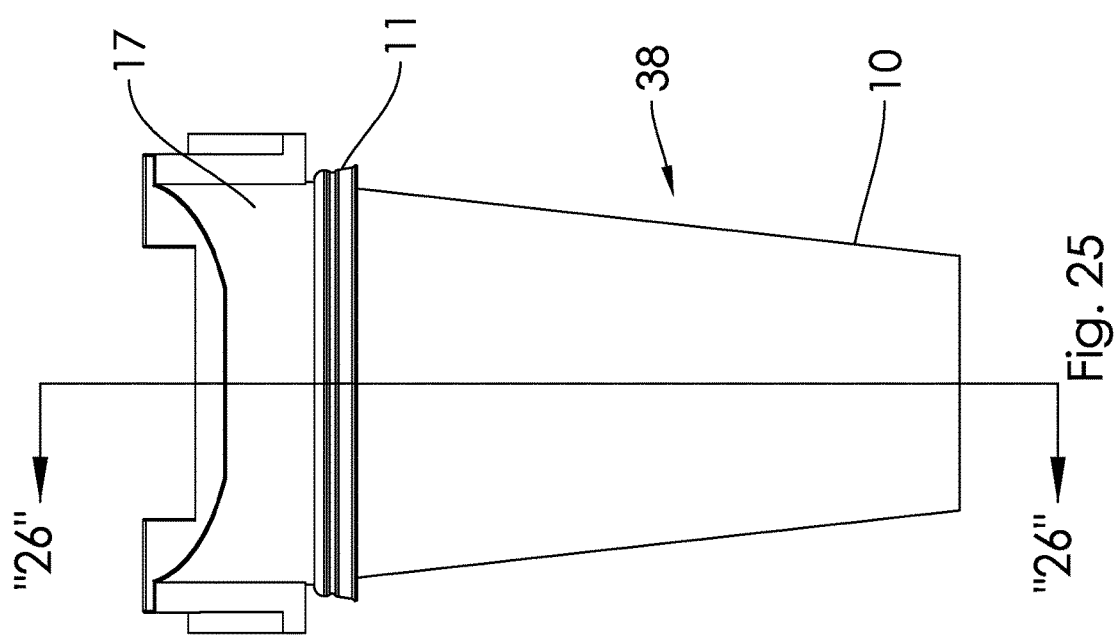

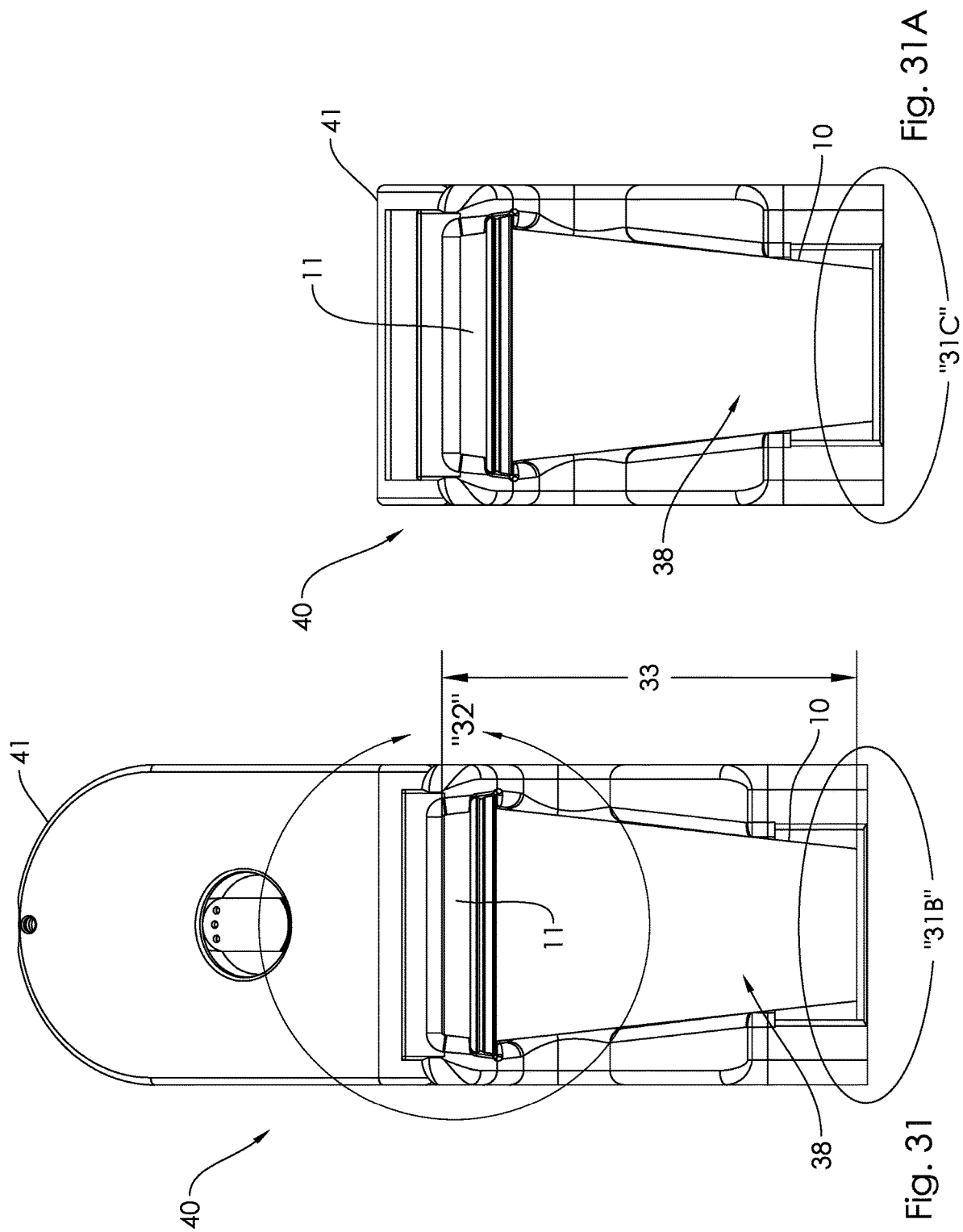

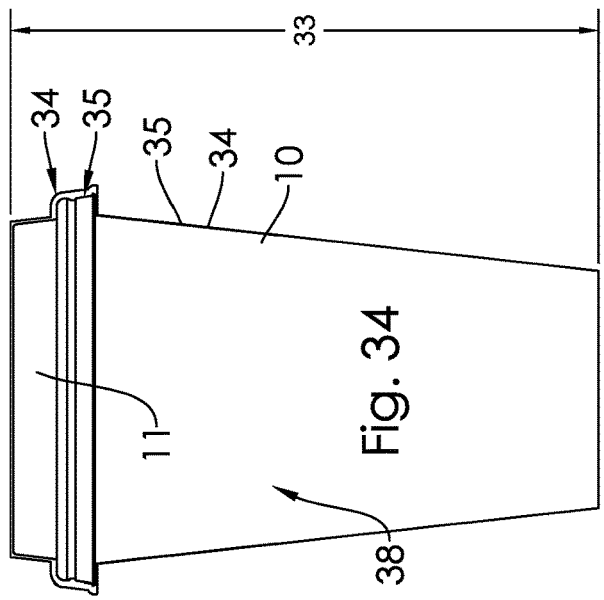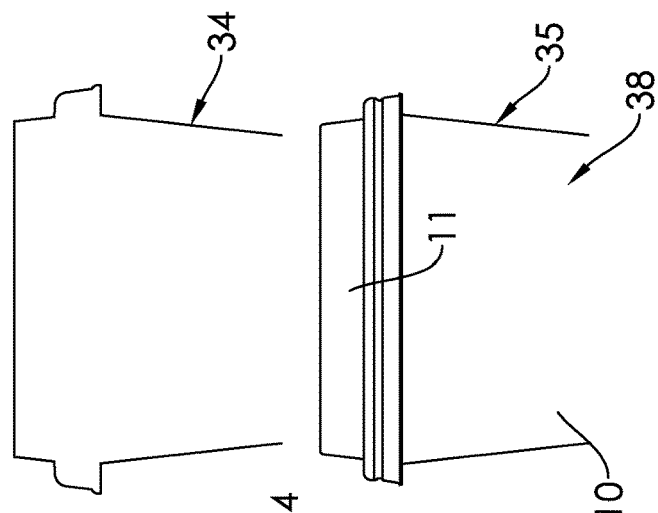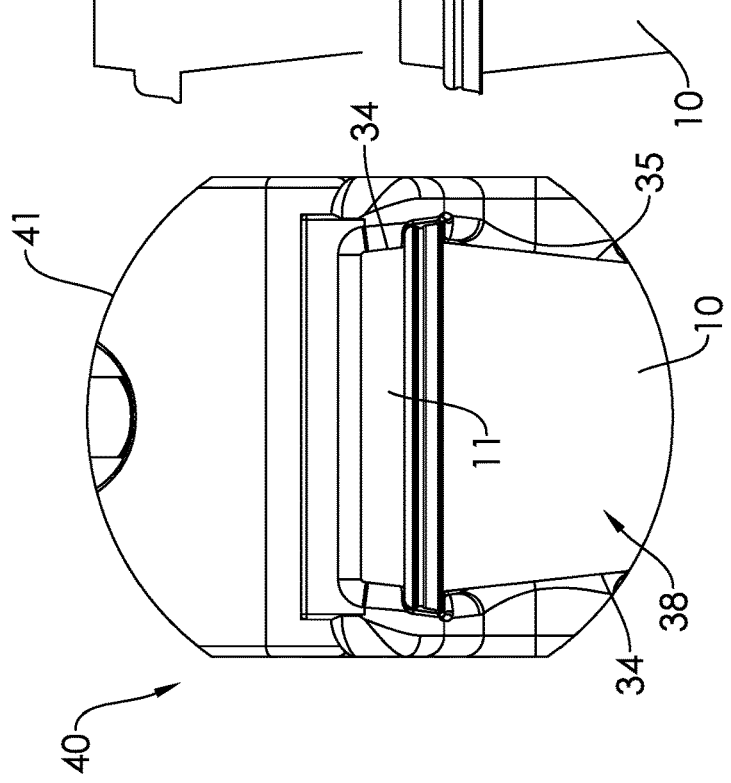

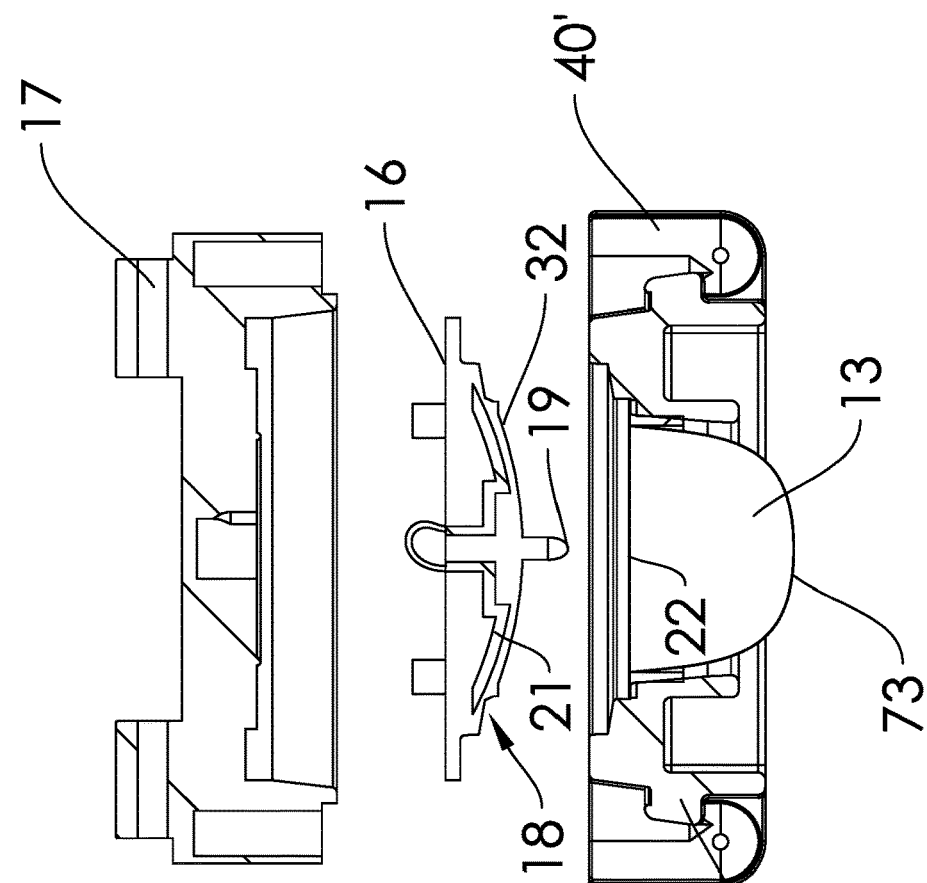
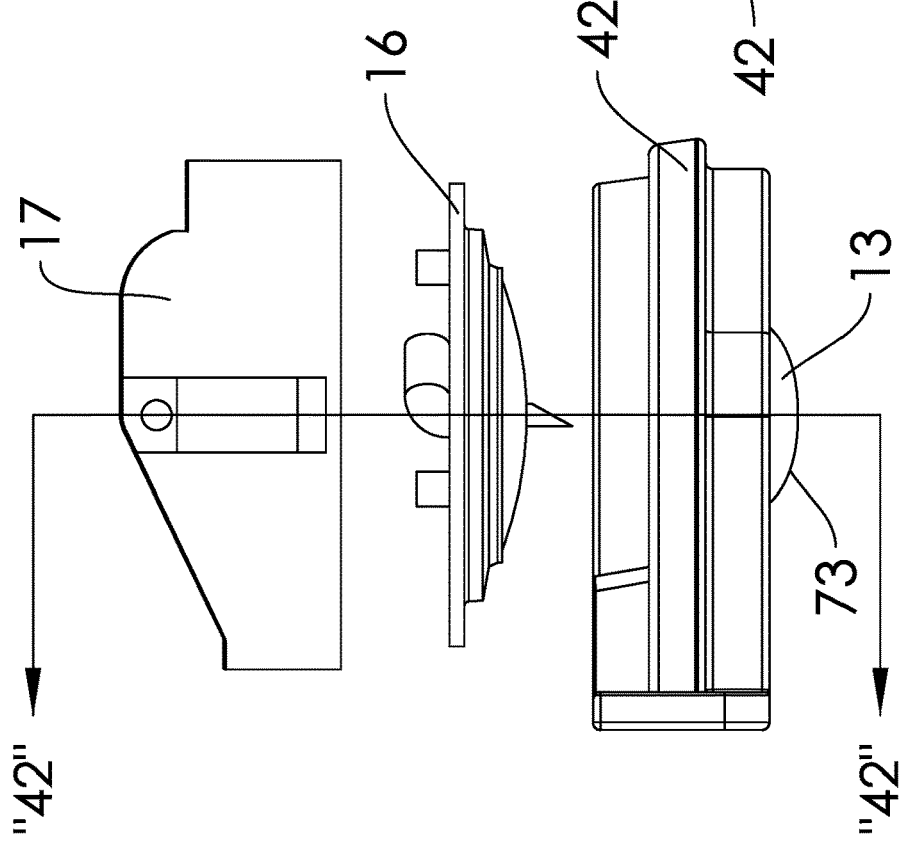

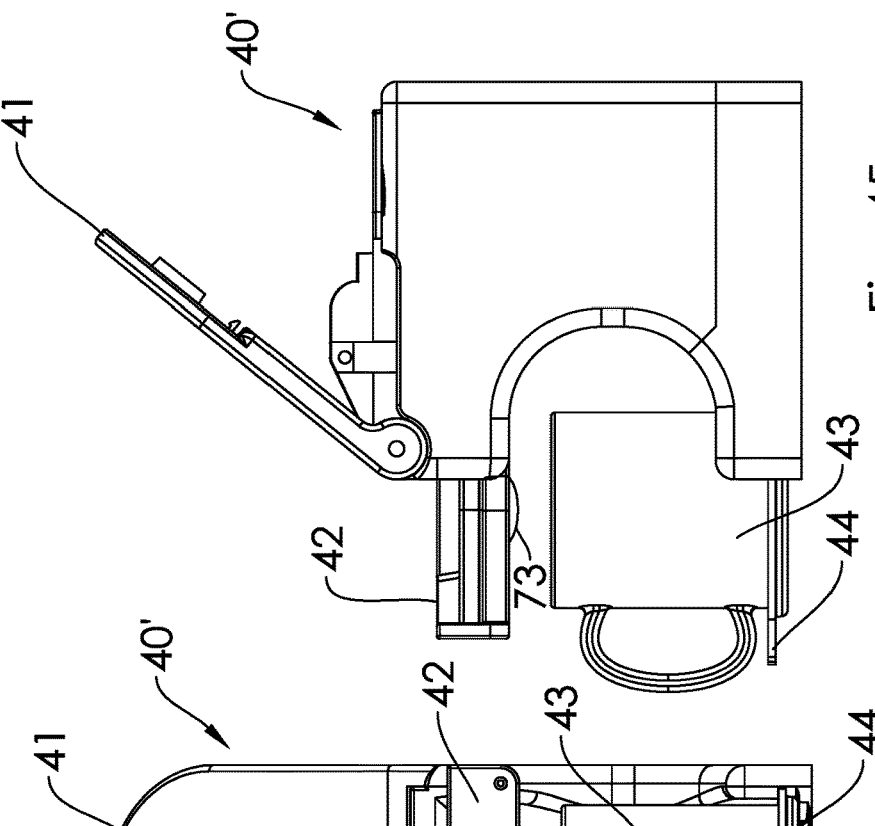
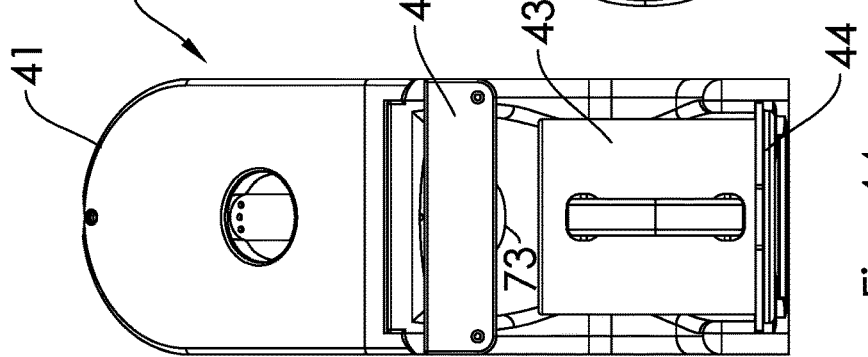
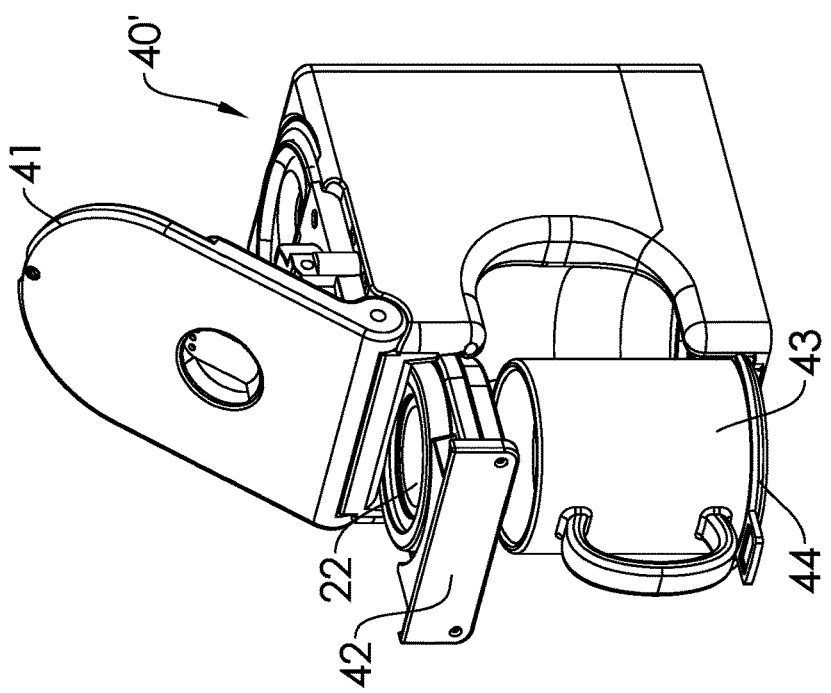

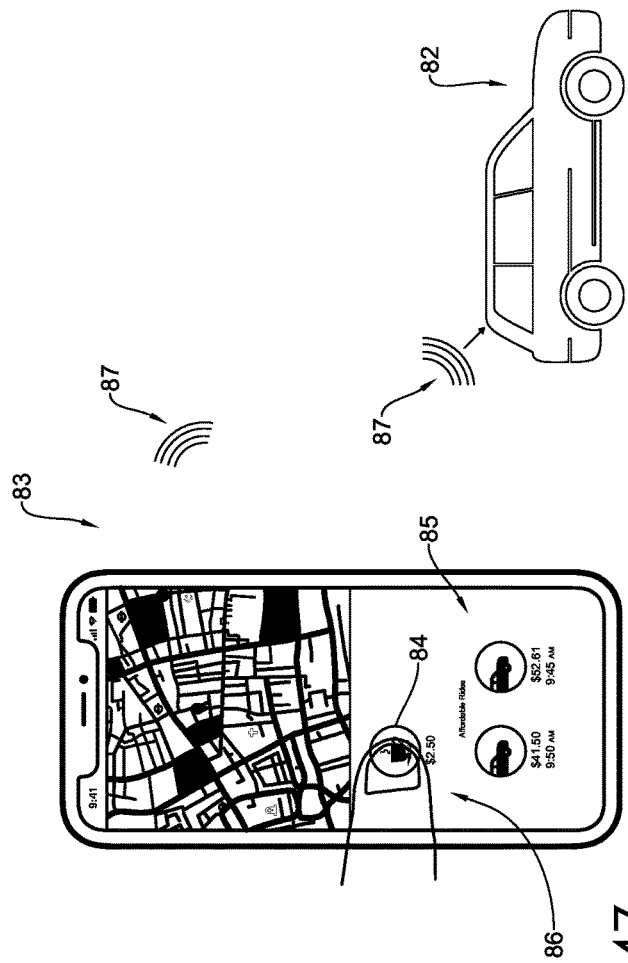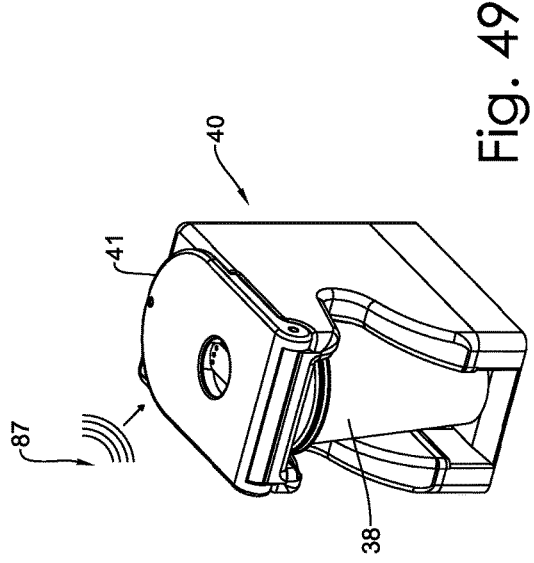

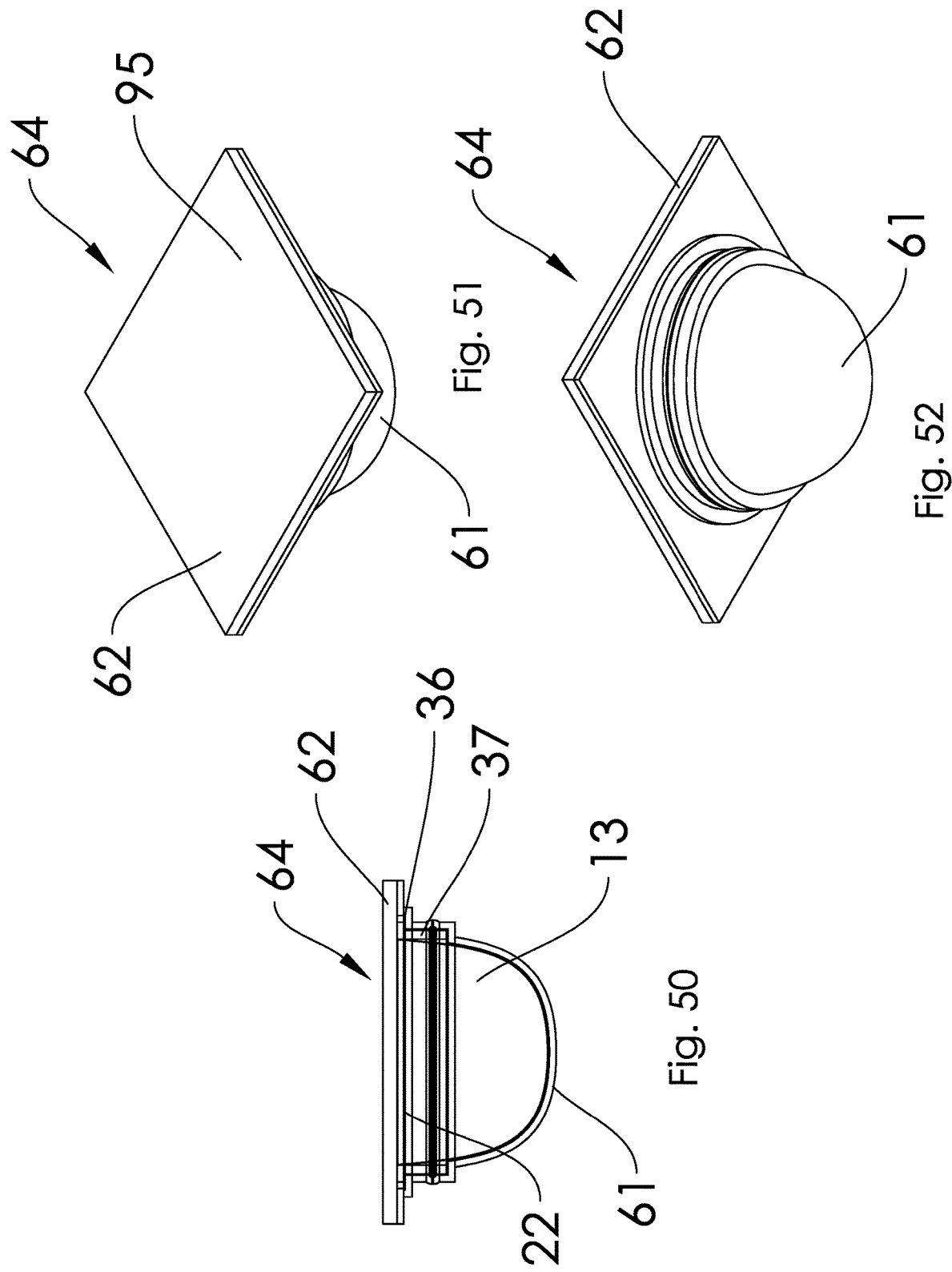

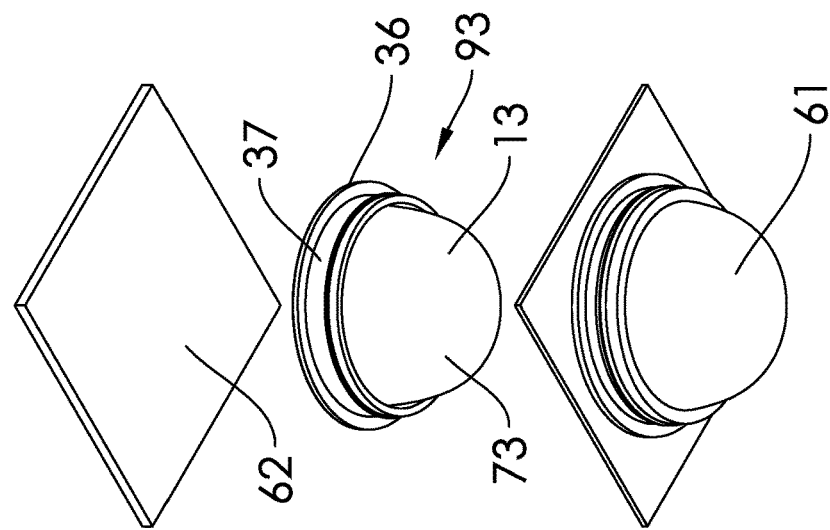
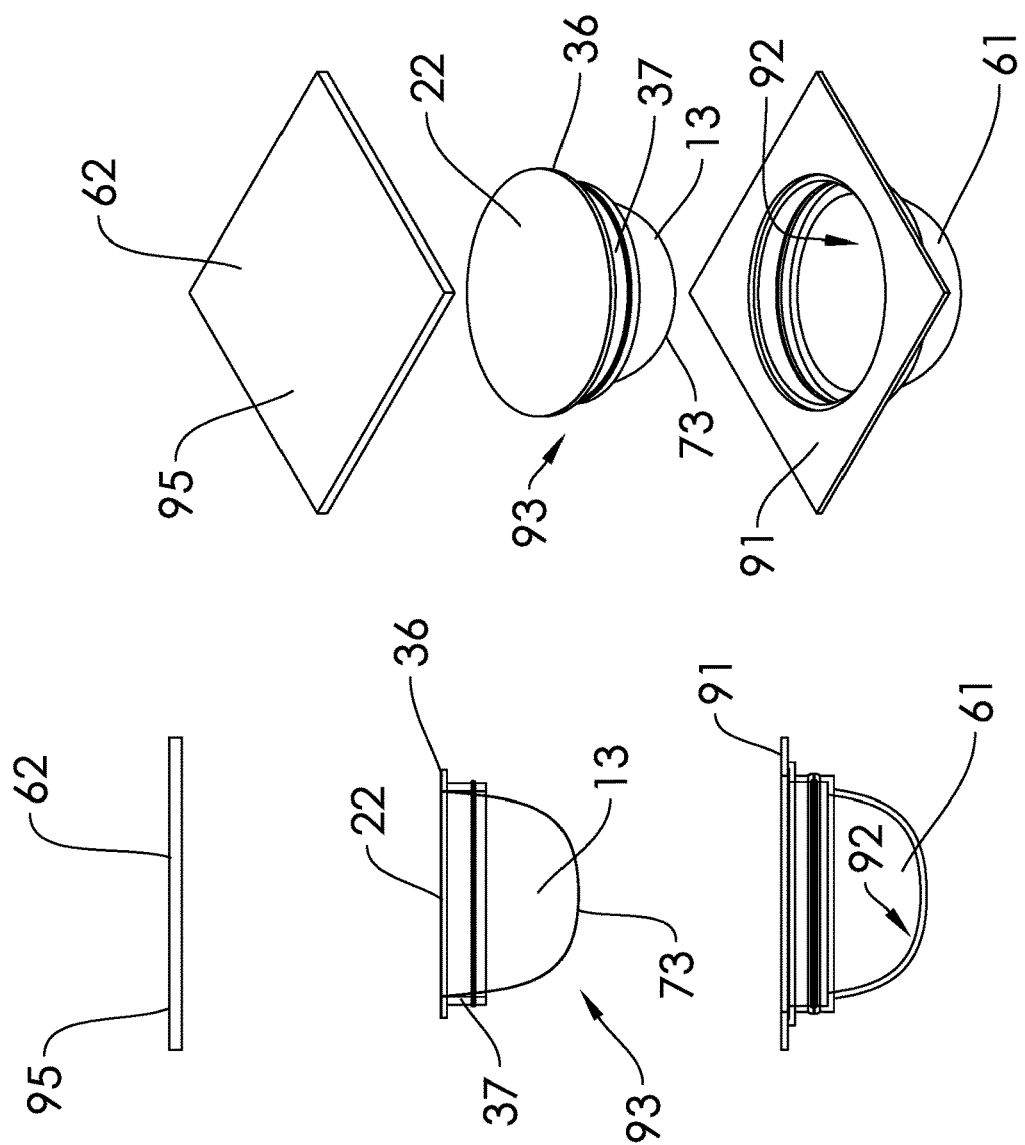
Fig. 53A  Fig. 53B  Fig. 53C

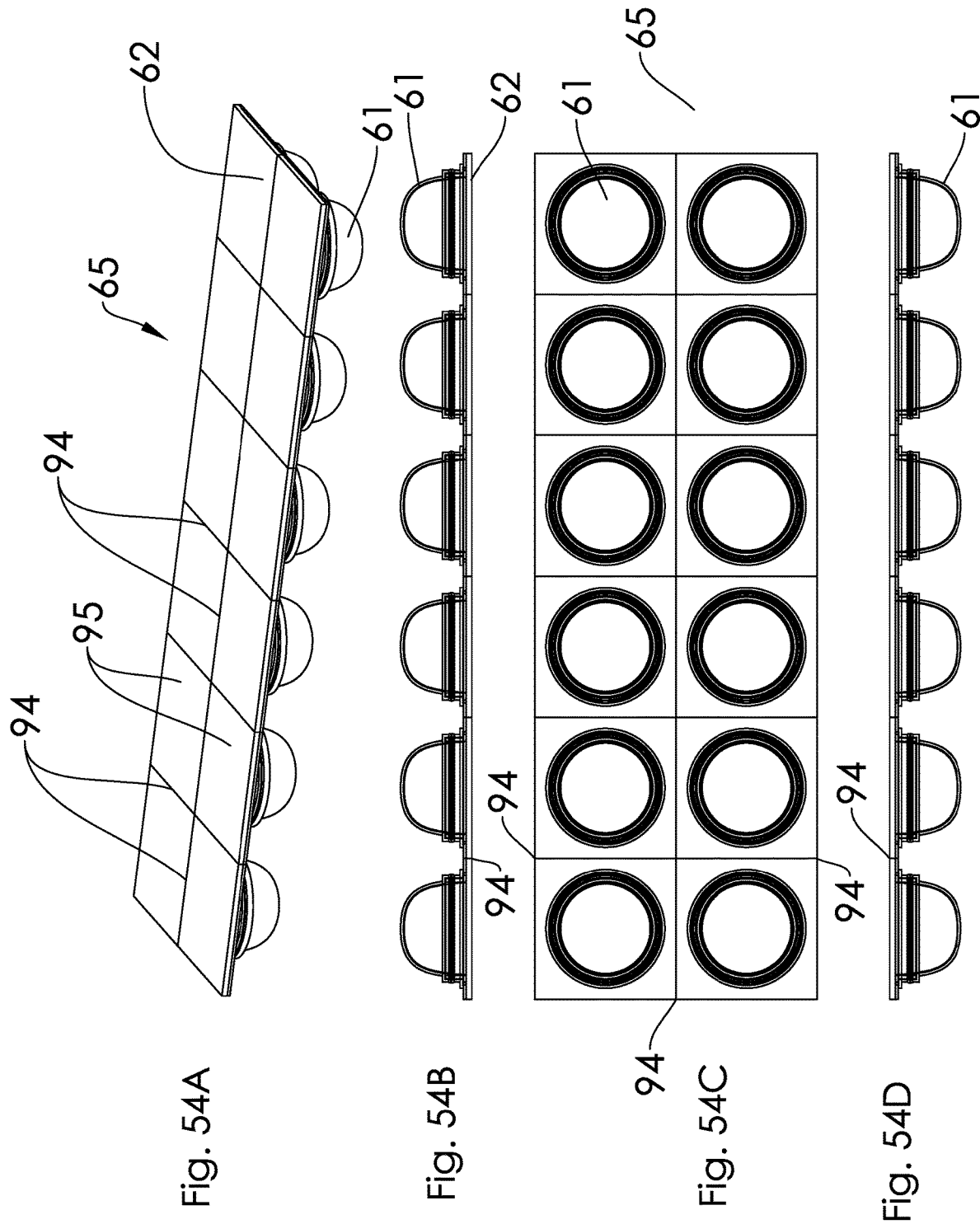

PORTABLE BEVERAGE SYSTEM AND ASSEMBLY

PRIOR HISTORY

This application claims the benefit of (1) U.S. Provisional Patent Application No. 62/660,662 filed in the United States Patent and Trademark Office (USPTO) on 20 Apr. 2018; (2) U.S. Provisional Patent Application No. 62/689,330 filed in the USPTO on 25 Jun. 2018; and (3) U.S. Provisional Patent Application No. 62/699,109 filed in the USPTO on 17 Jul. 2018, the specifications of which are hereby incorporated by reference thereto.

BACKGROUND OF THE INVENTION

Field of the Invention

The present invention relates generally to a lid formation and single-service beverage media container usable in combination with one another to provide a single-service beverage directly into a low-cost disposable beverage container as exemplified by coffee cups and the like. Associated support elements and liquid delivery means are further described to provide the basis for the portable beverage service system according to the present invention.

Brief Description of the Prior Art

Following the debut of the popular K-Cup single-service coffee container or pod in the 1990's, single-service beverage media containers have continued to gain in popularity for the purpose of single-service beverage preparations. Rideshare services offered by transportation network companies, mobility service providers, or ride-hailing services have similarly seen an ongoing gain in popularity while beverage consumption has remained a vital everyday need for consumers.

In view of these trends, the prior art perceives a need for a low cost, portable beverage service system, apparatus, and method for enabling consumers to consume a single-service beverage as output from a single-service beverage media container directly into an low cost disposable liquid container as provided on the go with ridesharing serving as an exemplary scenario for such beverage services. The present invention attempts to address this perceived need by providing a portable beverage service system, assembly, and method, as summarized in more detail hereinafter.

SUMMARY OF THE INVENTION

Among the many objectives of this invention is the provision of a beverage service system for enabling a consumer to portably consume a beverage output from a single-service beverage media container. The following specifications further support a beverage service assembly basically comprising the lid formation and single-service beverage media container(s), as well as certain beverage service methodology practiced or enabled thereby.

The beverage service system according to the present invention may be said to essentially comprise the lid formation and primary liquid container usable as a lid-container combination. The lid formation is preferably configured to receive and retain a single-service beverage media container, and comprises a primary beverage outlet, a container-receiving aperture, and at least one container retention mechanism. The single-service beverage media container is received in the container-receiving aperture and retained by the at least one container retention mechanism.

As stated, the lid formation, being attached to the primary liquid container, forms a lid-container combination. A liquid such as hot water may be directed through the single-service beverage media container as received and retained by the lid formation for outputting beverage therefrom into the primary liquid container. The beverage, as collected in the primary liquid container, having been outlet from the single-service beverage media container, may thereafter be outlet from the lid formation via the primary beverage outlet for enabling the consumer to portably consume the beverage as previously.

The single-service beverage media container comprises an upper peripheral edge and the at least one container retention mechanism comprises an edge-receiving groove. The upper peripheral edge is receivable in the edge-receiving groove, which edge-receiving groove retaining the upper peripheral edge in secured position thereby preventing inadvertent removal of the single-service beverage media container from the lid formation. The lid formation preferably further comprises a sloped region in superior adjacency to the edge-receiving groove for structurally guiding the upper peripheral edge into the edge-receiving groove. The edge-receiving groove is preferably formed in the lid formation so as to position the upper peripheral edge in a plane parallel to and above the rim-receiving groove.

The single-service beverage media container comprises at least one outwardly extending support ledge that extends in parallel relation to the upper peripheral edge. The outwardly extending support ledge supports an inner downwardly extending edge of the lid formation for enhancing container-to-lid retention of the single-service beverage media container. The at least one outwardly extending support ledge may preferably extend outwardly in inferior adjacency to an upper groove formation formed in the single-service beverage media container, which upper groove formation may receive inner portions of the inner downwardly extending edge. The at least one outwardly extending support ledge may be within a serrated region, which serrated region may preferably comprise a series of outwardly extending tooth-like support ledges.

The beverage service system according to the present invention may further comprise, in combination, a liquid delivery apparatus for directing liquid through the single-service beverage media container and for outputting beverage therefrom into the primary liquid container. In this regard, the lid formation may preferably comprise an upper lid profile and the liquid delivery apparatus, may comprise a plug/nozzle assembly having a lower plug profile. The upper lid profile and lower plug profiles each comprise outer peripheral portions, which outer peripheral portions comprise opposed parallel surfacing for enhancing mated engagement therebetween.

The lower plug profile may comprise a central portion relative to the outer peripheral portion of the plug/nozzle assembly. The central portion is preferably convex relative to upper planar seal or cover of the single-service beverage media container. The central portion operates to depress the upper planar seal or cover when directing liquid through the single-service beverage media container for enhancing liquid delivery therethrough.

The liquid delivery apparatus may further preferably comprise an assembly-receiving profile and the lid-container combination may preferably comprise an upper assembly profile. The assembly-receiving profile is dimensioned or sized and shaped to receive the upper assembly profile such that lateral and superior opposed surfacing of the liquid delivery apparatus and the lid-container formation are substantially parallel when so received. In other words, the orifice of the liquid delivery apparatus for receiving the lid-container combination or entire ensemble with single-service beverage media container received therein, is shaped substantially the same as at least upper portions of the lid-container combination or ensemble for eliminating space between the liquid delivery apparatus and the lid-container combination or ensemble so as to provide a tighter fit therebetween.

The liquid delivery apparatus may be vehicle-based, the vehicle-based liquid delivery apparatus enables the user to portably consume the beverage output from the single-service beverage media container while in a vehicle outfitted with the vehicle-based liquid delivery apparatus. The beverage service system according to the present invention may further preferably comprise, in combination, the single-service beverage media container as received and retained in the lid formation as attached to the primary liquid container and all elements sealed in an assembly-protective envelope. The assembly-protective envelope seals the single-service beverage media container and lid-container combination before liquid is directed through the single-service beverage media container.

The beverage service system may further preferably comprise an adapter mechanism usable in combination with the liquid delivery apparatus for enabling the user to direct liquid through the single-service beverage media container into an open top secondary liquid container. The adapter mechanism may comprise an adapter-based container-receiving aperture and an open top-seating formation. The adapter-based container-receiving aperture receives and positions the single-service beverage media container. The open top-seating formation accepts the open top of the secondary liquid container. The liquid delivery apparatus directs liquid through the single-service beverage media container for outputting beverage therefrom into the open top secondary liquid container.

The beverage service system further contemplates a vehicle-based liquid delivery apparatus comprising circuitry or means for receiving a remotely initiated signal to wirelessly or automatically direct liquid through the single-service beverage media container for outputting beverage therefrom into the primary liquid container. The remotely initiated signal may preferably be remotely initiated via a mobile application operable via a communication device or similar other computer or electronic device for sending similar signals.

The single-service beverage media container may preferably be provided within an individual package construction according to the present invention. The individual package construction comprises a planar package top and a package bottom dimensioned or sized and shaped to receive the single-service beverage media container such that an upper seal or cover of the single-service beverage media container is flush with upper package surface of the package bottom, and such that package bottom interior surfacing inferior to the upper package surface is parallel to exterior surfacing of the single-service beverage media container inferior to the upper seal or cover.

The individual package construction is structurally linked to at least one substantially identical adjacent individual package construction. The individual package construction and at least one adjacent individual package construction are preferably removably linked or removably interconnected via the planar package tops. The planar package tops may be connected to one another either at peripheral edging of adjacent planar package tops or at opposed planar surfacing of the planar package tops.

The beverage service assembly according to the present invention may be said to essentially comprise a single-service beverage media container according to the present invention and a lid formation configured to receive and support the single-service beverage media container. The lid formation comprises a container-receiving aperture and a container support mechanism. The single-service beverage media container is received in the container-receiving aperture and supported by the container support mechanism.

The beverage service assembly according to the present invention may further preferably comprise, in combination, a liquid container. The lid formation is attachable to the liquid container for enabling a consumer to position the single-service beverage media container relative to the liquid container for dispensing beverage directly into the liquid container via the lid formation. The lid formation may further preferably comprise a primary beverage outlet. Liquid directed through the single-service beverage media container outputs as beverage into the liquid container. The primary beverage outlet enables a user to consume beverage from the liquid container. The lid formation further preferably comprises at least one container retention mechanism. The at least one container retention mechanism prevents inadvertent removal of the single-service beverage media container from the lid formation.

The beverage service method according to the present invention may be said to essentially comprise the steps of: (1) providing a lid formation, the lid formation being configured to receive and retain a single-service beverage media container, and comprising a container-receiving aperture and a container support mechanism; (2) inserting a single-service beverage media container in the container-receiving aperture; and (3) supporting the single-service beverage media container by the container support mechanism.

The method may further comprise the step of attaching the lid formation to a liquid container thereby simultaneously covering the liquid container and positioning the single-service beverage media container relative to the liquid container. The method of may further comprise the step of directing liquid through the single-service beverage media container for outputting beverage into the liquid container. The method may further comprise the step of outfitting the lid formation with a primary beverage outlet for enabling a user to consume beverage from the liquid container. The method may further comprise the step of retaining the single-service beverage media container in the lid formation via a container retention mechanism.

Other secondary objects of the present invention, as well as particular features, elements, and advantages thereof, will be elucidated or become apparent from, the following brief descriptions of the drawings and the accompanying drawing figures.

BRIEF DESCRIPTIONS OF THE DRAWINGS

Other features and objectives of the invention will become more evident from a consideration of the following brief descriptions of patent drawings.

FIG. 1 is a top perspective view of a first single-service beverage container assembly according to the present invention depicted in an exploded manner to show from top to bottom a first single-service beverage media container, a first lid formation, and a prior art liquid container.

FIG. 2 is a top perspective view of the first single-service beverage container assembly according to the present invention as otherwise shown in FIG. 1 and depicted in an assembled manner.

FIG. 3 is a longitudinal cross-sectional view of the first single-service beverage container assembly according to the present invention.

FIG. 4 is a top perspective view of a second single-service beverage container assembly according to the present invention depicted in an exploded manner to show from top to bottom a second single-service beverage media container, the first lid formation, and a prior art liquid container.

FIG. 5 is a top perspective view of the second single-service beverage container assembly according to the present invention as otherwise shown in FIG. 4 and depicted in an assembled manner.

FIG. 6 is a longitudinal cross-sectional view of the second single-service beverage container assembly according to the present invention.

FIG. 7 is a first enlarged, fragmentary cross-sectional view of upper portions of the first single-service beverage container assembly according to the present invention as enlarged and fragmented from FIG. 3.

FIG. 8 is a first enlarged, fragmentary cross-sectional view of upper portions of the second single-service beverage container assembly according to the present invention as enlarged and fragmented from FIG. 6.

FIG. 9 is a second enlarged, fragmentary cross-sectional view of upper portions of the second single-service beverage container assembly according to the present invention depicted in side-by-side relation with FIG. 10 for ease of comparison therewith.

FIG. 10 is an enlarged, fragmentary cross-sectional view of container-to-lid junction site of the second single-service beverage container assembly according to the present invention, the container-to-lid junction site being enlarged from FIG. 9 to depict with greater clarity structures associated with the second single-service beverage media container and the first lid formation.

FIG. 11 is an enlarged, fragmentary cross-sectional view of upper portions of a third single-service beverage container assembly according to the present invention showing a third single-service beverage media container in assembled relation with the first lid formation and the prior art liquid container and depicted in side-by-side relation with FIG. 12 for ease of comparison therewith.

FIG. 12 is an enlarged, fragmentary cross-sectional view of container-to-lid junction site of the third single-service beverage container assembly according to the present invention, the container-to-lid junction site being enlarged from FIG. 11 to depict with greater clarity structures associated with the third single-service beverage media container and the first lid formation.

FIG. 13 is an enlarged, fragmentary cross-sectional view of upper portions of a fourth single-service beverage container assembly according to the present invention showing a fourth single-service beverage media container in assembled relation with the first lid formation and the prior art liquid container and depicted in side-by-side relation with FIG. 14 for ease of comparison therewith.

FIG. 14 is an enlarged, fragmentary cross-sectional view of container-to-lid junction site of the fourth single-service beverage container assembly according to the present invention, the container-to-lid junction site being enlarged from FIG. 13 to depict with greater clarity structures associated with the fourth single-service beverage media container and the first lid formation.

FIG. 14A is a longitudinal cross-sectional view of the fourth single-service beverage container assembly according to the present invention depicted in an exploded manner to show from top to bottom the fourth single-service beverage media container, the first lid formation, and the prior art liquid container.

FIG. 14B is an enlarged, fragmentary view of upper right portions of the fourth single-service beverage media container as enlarged and fragmented from FIG. 14A to show in greater clarity structures associated therewith.

FIG. 15 is an enlarged, fragmentary cross-sectional view of upper portions of a fifth single-service beverage container assembly according to the present invention showing a fifth single-service beverage media container in assembled relation with the first lid formation and the prior art liquid container and depicted in side-by-side relation with FIG. 16 for ease of comparison therewith.

FIG. 16 is an enlarged, fragmentary cross-sectional view of container-to-lid junction site of the fifth single-service beverage container assembly according to the present invention, the container-to-lid junction site being enlarged from FIG. 15 to depict with greater clarity structures associated with the fifth single-service beverage media container and the first lid formation.

FIG. 17 is a top perspective view of the first single-service beverage container assembly according to the present invention depicted in an exploded manner to show from bottom to top the first single-service beverage container assembly, a first plug/nozzle assembly, and a plug casing according to the present invention.

FIG. 18 is a side elevational view of the first single-service beverage container assembly according to the present invention depicted in an exploded manner to show from bottom to top the first single-service beverage container assembly, the first plug/nozzle assembly, and the plug casing according to the present invention.

FIG. 19 is a longitudinal cross-sectional view of the first single-service beverage container assembly according to the present invention depicted in an exploded manner to show from bottom to top the first single-service beverage container assembly, the first plug/nozzle assembly, and the plug casing according to the present invention.

FIG. 20 is a second enlarged, fragmentary cross-sectional view of upper portions of the first single-service beverage container assembly according to the present invention depicted in exploded relation relative to the first plug/nozzle assembly according to the present invention and in side-by-side relation to FIG. 21 for ease of comparison therewith.

FIG. 21 is a diagrammatic depiction showing a nozzle feature of the first plug/nozzle assembly piercing the sealing cover feature of the first single-service beverage media container as otherwise depicted in exploded relation in FIG. 20.

FIG. 22 is a longitudinal cross-sectional view of the second single-service beverage container assembly according to the present invention outfitted with a protective seal and depicted in exploded relation relative to the first plug/nozzle assembly according to the present invention having a singular liquid-letting nozzle prior to the first plug/nozzle assembly engagement with the second single-service beverage media container.

FIG. 23 is a longitudinal cross-sectional view of the second single-service beverage container assembly according to the present invention outfitted with a protective seal and depicted in assembled relation with the first plug/nozzle assembly according to the present invention having a singular liquid-letting nozzle after the first plug/nozzle assembly engagement with the second single-service beverage media container.

FIG. 22A is a longitudinal cross-sectional view of the second single-service beverage container assembly according to the present invention outfitted with a protective seal and depicted in exploded relation relative to a second plug/nozzle assembly according to the present invention having a series of liquid-letting nozzles prior to the second plug/nozzle assembly engagement with the second single-service beverage media container.

FIG. 23A is a longitudinal cross-sectional view of the second single-service beverage container assembly according to the present invention outfitted with a protective seal and depicted in assembled relation with the first plug/nozzle assembly according to the present invention having a series of liquid-letting nozzles after the first plug/nozzle assembly engagement with the second single-service beverage media container.

Figure 22C:
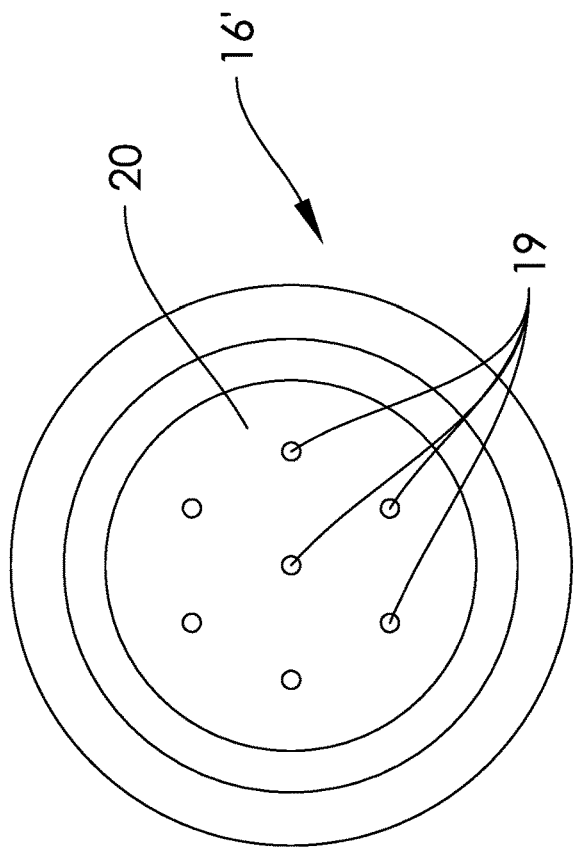
Figure 22B:
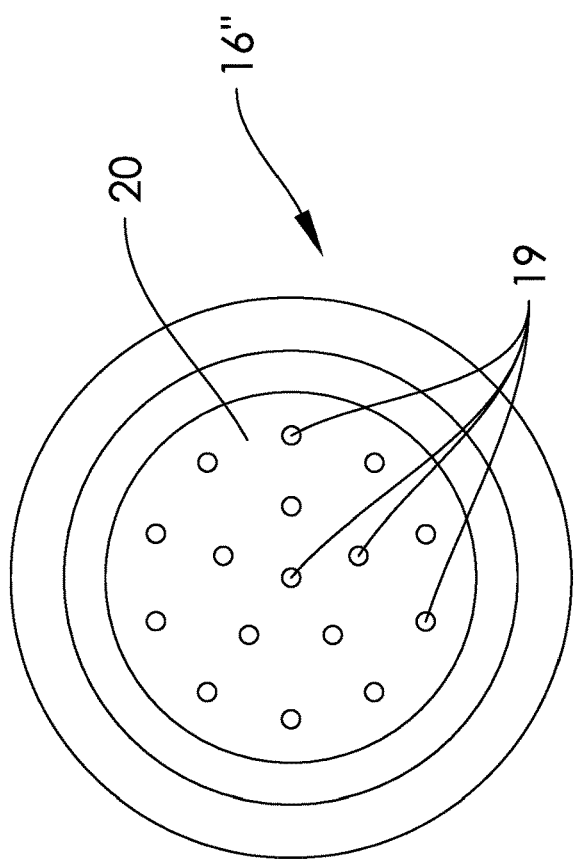

FIG. 22B is a bottom plan view of a third plug/nozzle assembly showing a series of sixteen miniature nozzles outfitted upon the third plug/nozzle assembly.

FIG. 22C is a bottom plan view of the second plug/nozzle assembly showing a series of 7 miniature nozzles outfitted upon the second plug/nozzle assembly.

FIG. 24 is a first enlarged, fragmentary cross-sectional view of upper portions of the second single-service beverage container assembly in assembled relation with the first plug/nozzle assembly having a singular liquid-letting nozzle as enlarged and fragmented from FIG. 23 to show in greater clarity structures associated therewith.

FIG. 24A is an enlarged, fragmentary cross-sectional view of upper portions of the second single-service beverage container assembly in assembled relation with the second plug/nozzle assembly having a series of liquid-letting nozzles as enlarged and fragmented from FIG. 23A to show in greater clarity structures associated therewith.

Figure 24B:
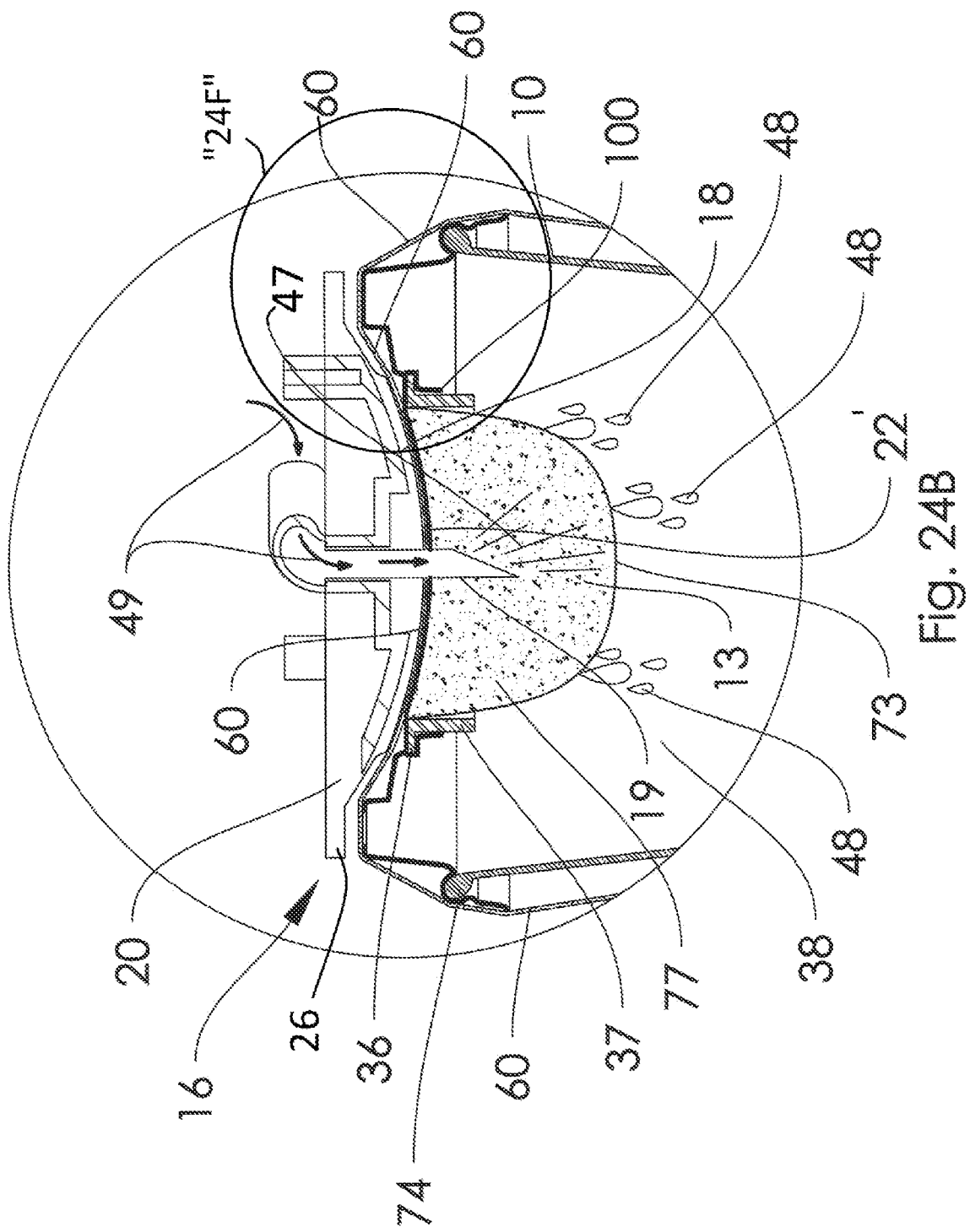

FIG. 24B is a second enlarged, fragmentary cross-sectional view of upper portions of the second single-service beverage container assembly in assembled relation with the first plug/nozzle assembly having the singular liquid-letting nozzle with liquid being directed into the second single-service beverage container assembly.

Figure 24C:
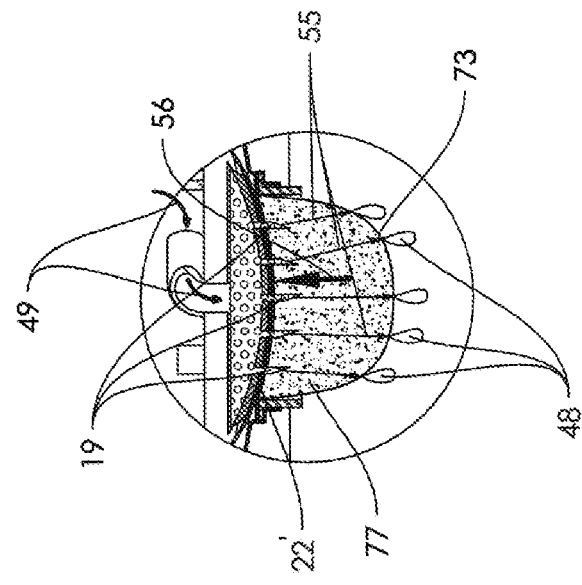

FIG. 24C is a first sequential enlarged longitudinal cross-sectional view through the second plug/nozzle assembly according to the present invention showing liquid being directed through beverage media contained in a pod type single-service beverage media container engaged with the second plug/nozzle assembly.

Figure 24E:
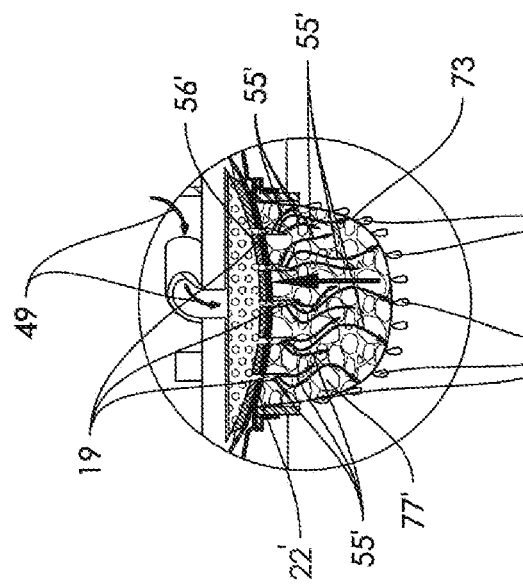
Figure 24D:
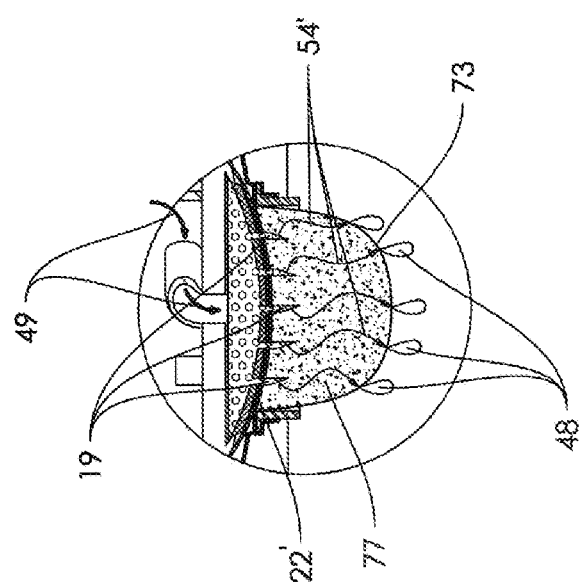

FIG. 24D is a second sequential enlarged longitudinal cross-sectional view through the second plug/nozzle assembly according to the present invention showing liquid being directed through beverage media contained in a pod type single-service beverage media container engaged with the second plug/nozzle assembly with a vector of relatively short length depicting initial resistance to liquid passage.

FIG. 24E is a third sequential enlarged longitudinal cross-sectional view through the second plug/nozzle assembly according to the present invention showing liquid being directed through beverage media contained in a pod type single-service beverage media container engaged with the second plug/nozzle assembly with a vector of relatively long length depicting greater resistance to liquid passage as beverage media absorbs and becomes saturated by liquid.

FIG. 24F is an enlarged fragmentary sectional view as enlarged and sectioned from FIG. 24B to show in greater structural detail an outer peripheral junction site between the first plug/nozzle assembly and the lid formation.

FIG. 25 is a side elevational view of the first single-service beverage container assembly in assembled relation with the first plug/nozzle assembly and plug casing according to the present invention.

FIG. 26 is a longitudinal cross-sectional view of the first single-service beverage container assembly in assembled relation with the first plug/nozzle assembly and plug casing according to the present invention.

Figure 27:
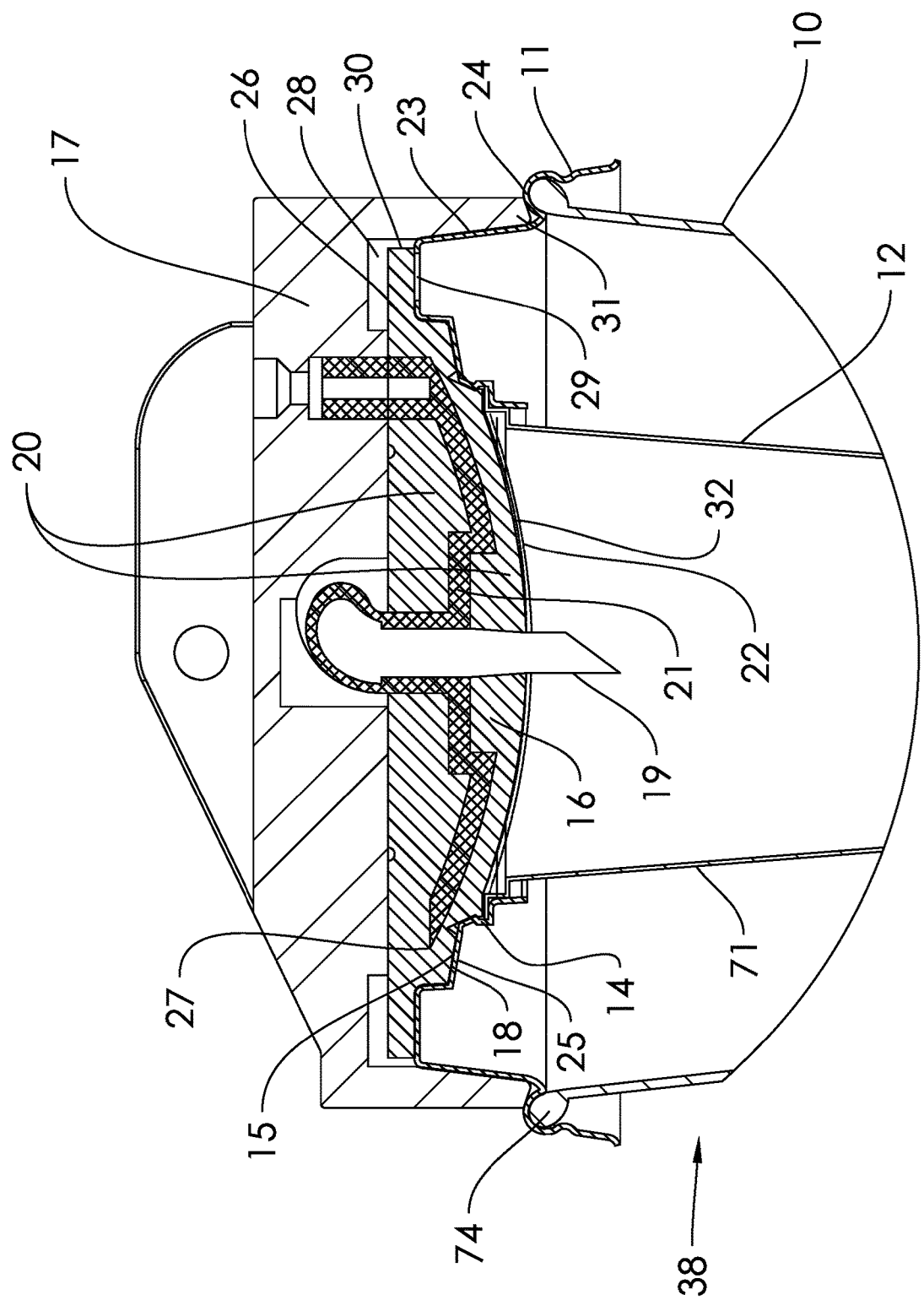

FIG. 27 is an enlarged, fragmentary cross-sectional view of upper portions of the first single-service beverage container assembly in assembled relation with the first plug/nozzle assembly and plug casing as enlarged and fragmented from FIG. 26 to show in greater clarity structures associated therewith.

Figure 28:
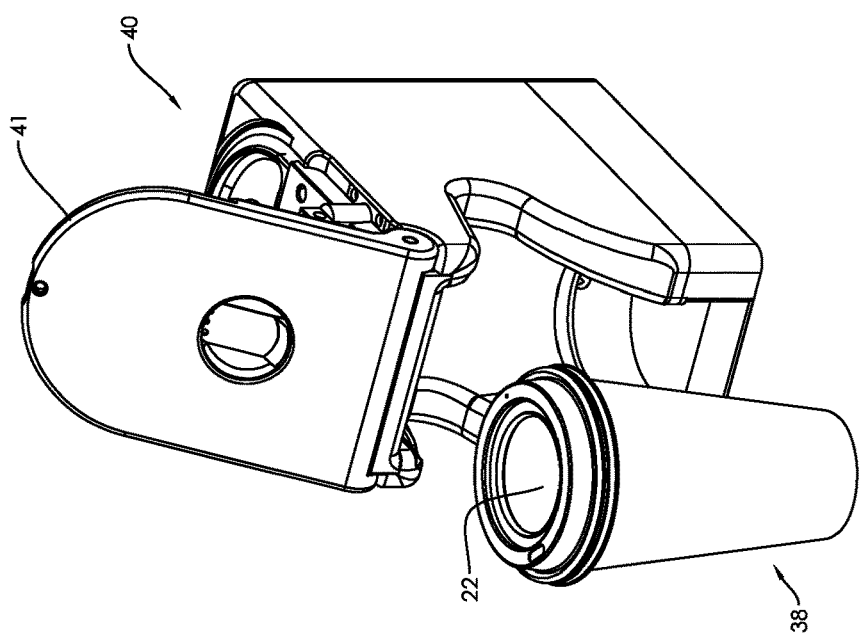

FIG. 28 is a top perspective view of the first single-service beverage container assembly prior to insertion into a first compact portable beverage apparatus having an upper lid mechanism according to the present invention showing the upper lid mechanism in a first condition of use.

Figure 29:
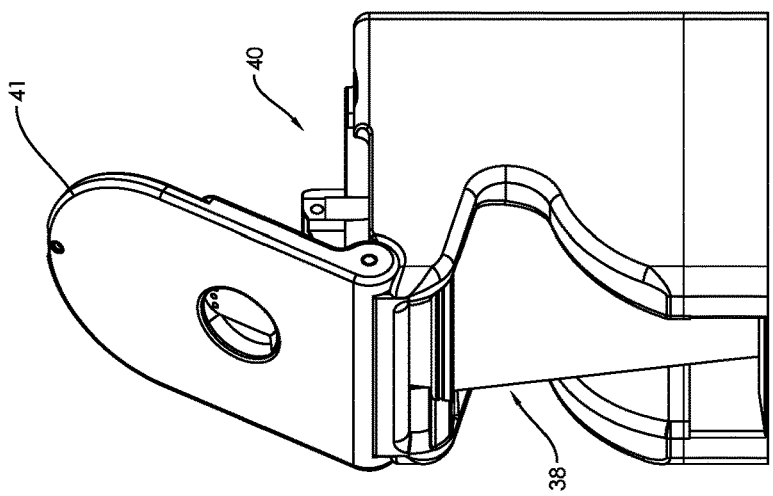

FIG. 29 is a side perspective view of the first single-service beverage container assembly after insertion into the first compact portable beverage apparatus with the upper lid mechanism in the first condition of use.

Figure 30:
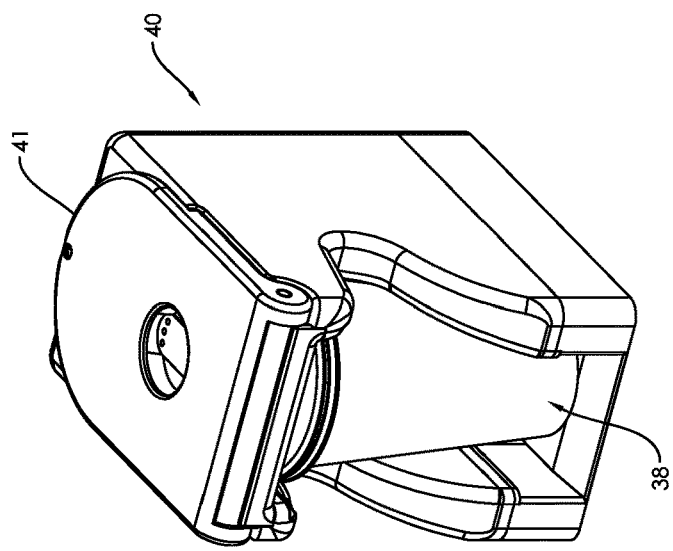

FIG. 30 is a top perspective view of the first single-service beverage container assembly after insertion into the first compact portable beverage apparatus with the upper lid mechanism in a second condition of use.

FIG. 31 is a frontal elevational view of the first single-service beverage container assembly after insertion into the first compact portable beverage apparatus with the upper lid mechanism in the first condition of use.

FIG. 31A is a frontal elevational view of the first single-service beverage container assembly after insertion into the first compact portable beverage apparatus with the upper lid mechanism in the second condition of use.

Figure 31C:
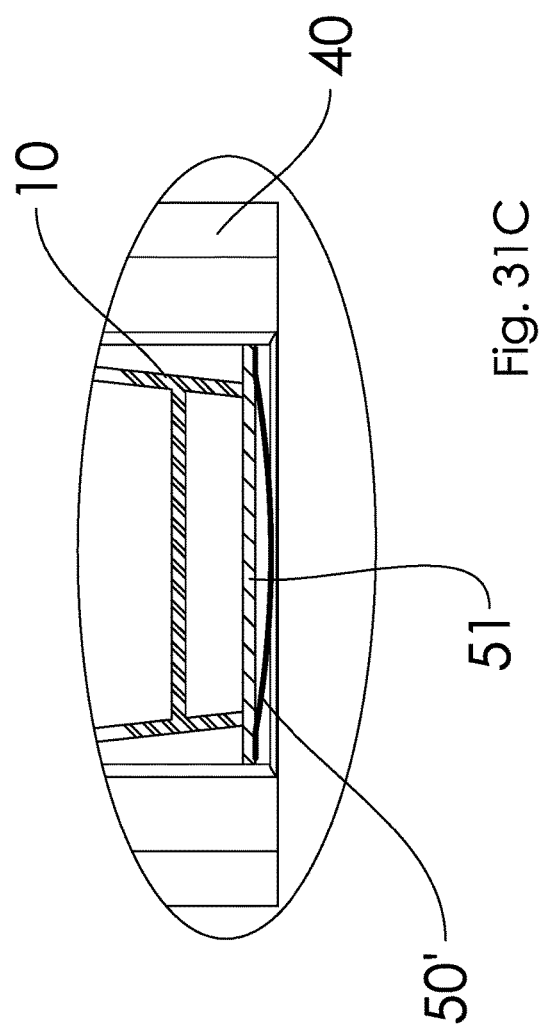
Figure 31B:
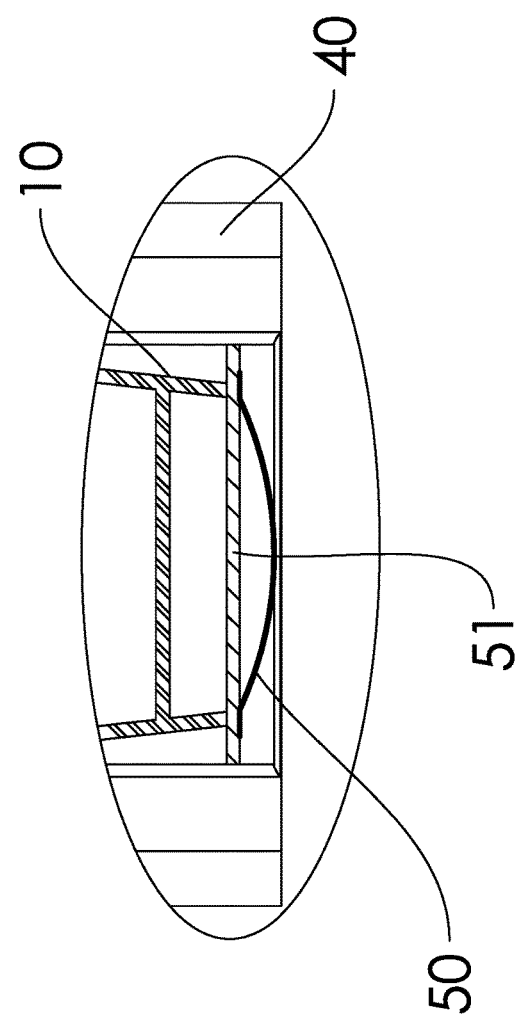

FIG. 31B is an enlarged, fragmentary view of bottom portions of the first single-service beverage container assembly after insertion into the first compact portable beverage apparatus with the upper lid mechanism in the first condition of use as enlarged and fragmented from FIG. 31 to show the features associated therewith in adjacency to FIG. 31C for ease of comparison.

FIG. 31C is an enlarged, fragmentary view of bottom portions of the first single-service beverage container assembly after insertion into the first compact portable beverage apparatus with the upper lid mechanism in the second condition of use as enlarged and fragmented from FIG. 31A to show the features associated therewith in adjacency to FIG. 31B for ease of comparison.

FIG. 32 is an enlarged, fragmentary view of the first single-service beverage container assembly after insertion into the first compact portable beverage apparatus with the upper lid mechanism in the first condition of use as enlarged and fragmented from FIG. 31 to show the features associated therewith in side-by-side relation with FIGS. 33 and 34 for ease of comparison.

FIG. 33 is a diagrammatic depiction of an assembly-receiving mouth port profile of the first compact beverage apparatus juxtaposed in upper relation relative to a fragmentary side view of upper portions of the first single-service beverage container assembly to depict the similarly sized and shaped profiles of the assembly-receiving mouth port profile and the fragmentary side view of upper portions of the first single-service beverage container assembly.

FIG. 34 is a diagrammatic depiction of the assembly-receiving mouth port profile of the first compact beverage apparatus juxtaposed in assembled relative to the fragmentary side view of the first single-service beverage container assembly to depict the similarly sized and shaped profiles of the assembly-receiving mouth port profile and the first single-service beverage container assembly with a full height there depicted.

Figure 35:
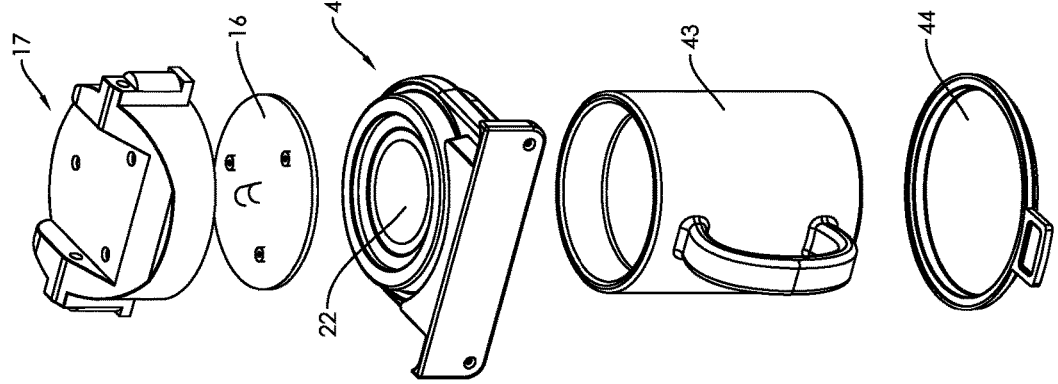

FIG. 35 is a top perspective relatively loosely exploded view showing from top to bottom the plug casing, the first plug/nozzle assembly, an adapter mechanism (in assembled relation with the second single-service beverage media container), a prior art beverage mug, and a spill tray according to the present invention.

Figure 36:
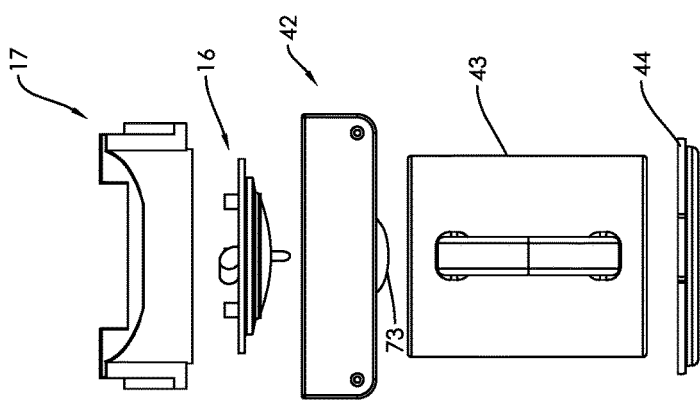

FIG. 36 is a frontal side elevational exploded view showing from top to bottom the plug casing, the first plug/nozzle assembly, the adapter mechanism (in assembled relation with the second single-service beverage media container), the prior art beverage mug, and the spill tray according to the present invention.

Figure 37:
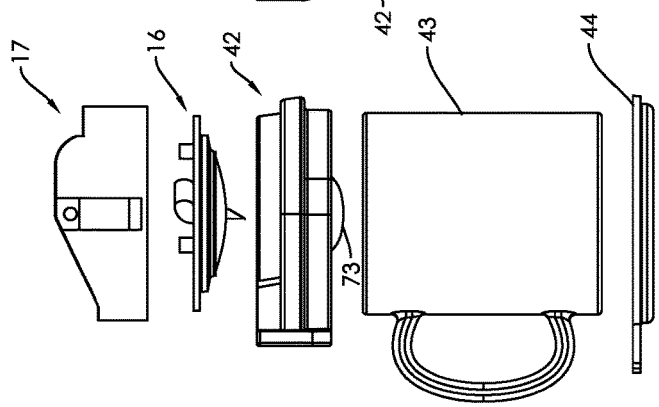

FIG. 37 is a lateral side elevational exploded view showing from top to bottom the plug casing, the first plug/nozzle assembly, the adapter mechanism (in assembled relation with the second single-service beverage media container), the prior art beverage mug, and the spill tray according to the present invention.

Figure 38:
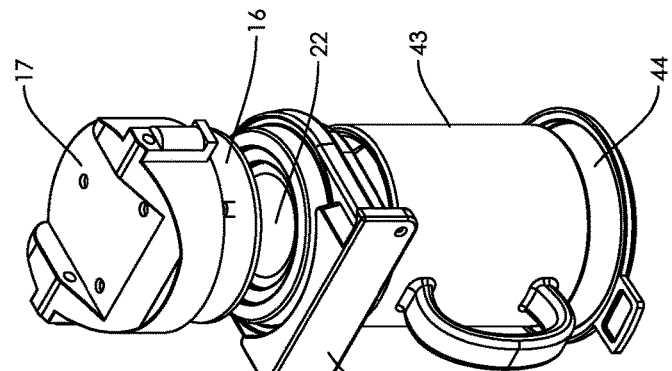

FIG. 38 is a top perspective relatively tightly exploded view showing from top to bottom the plug casing, the first plug/nozzle assembly, the adapter mechanism (in assembled relation with the second single-service beverage media container), the prior art beverage mug, and the spill tray according to the present invention.

Figure 39:
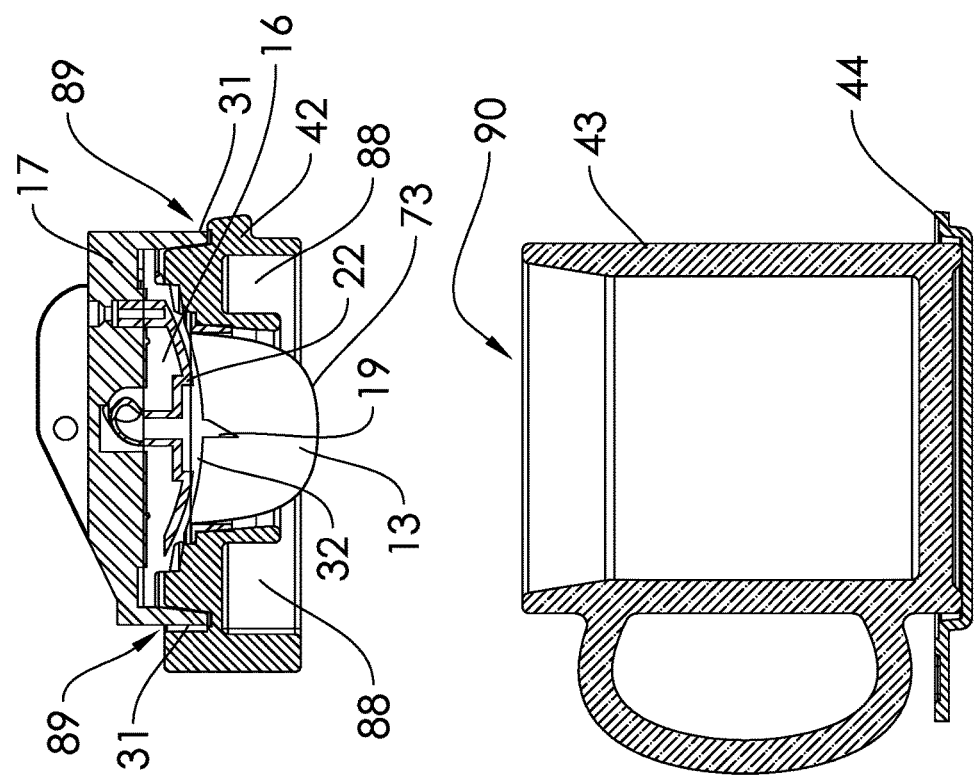

FIG. 39 is a longitudinal cross-sectional view of the prior art beverage mug in assembled relation with the spill try and in exploded relation relative to the plug casing, first plug/nozzle assembly and adapter mechanism (in assembled relation with the second single-service beverage media container).

Figure 40:
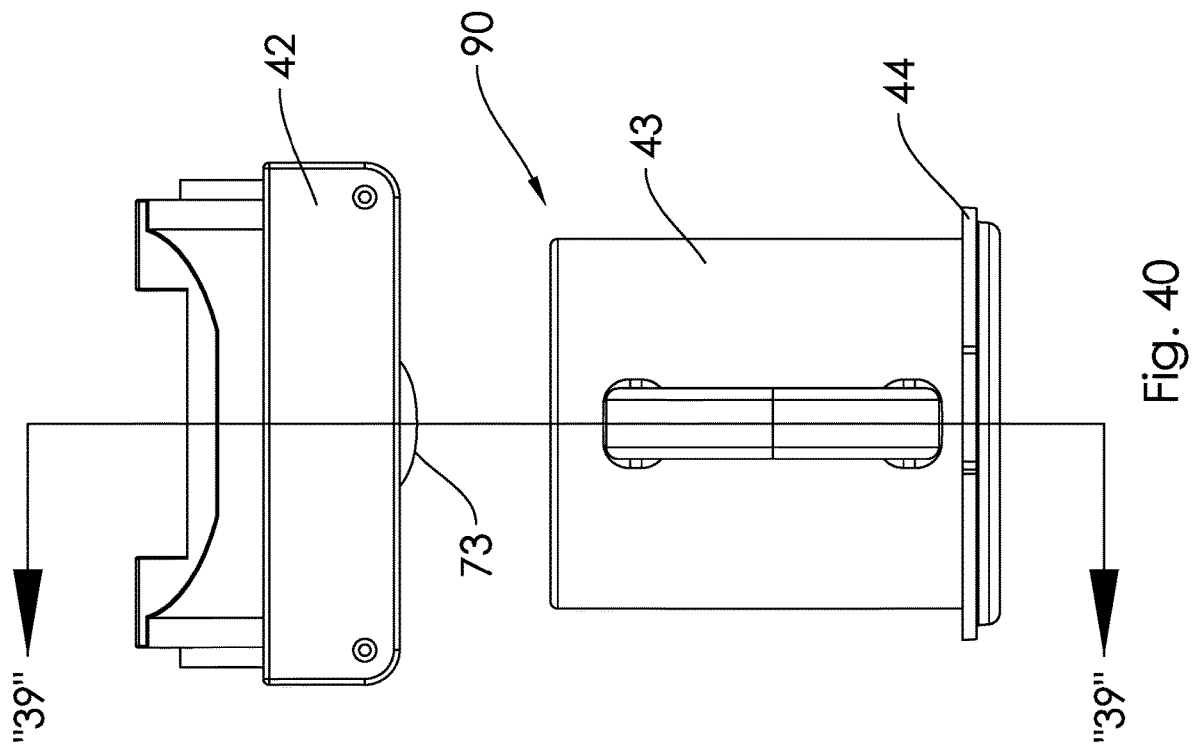

FIG. 40 is an enlarged frontal elevational view of the prior art beverage mug in assembled relation with the spill try and in exploded relation relative to the plug casing, first plug/nozzle assembly and adapter mechanism (in assembled relation with the second single-service beverage media container).

FIG. 41 is an enlarged lateral side elevational exploded view showing from top to bottom the plug casing, the first plug/nozzle assembly, and the adapter mechanism (in assembled relation with the second single-service beverage media container) as enlarged from FIG. 37 to show in greater clarity the structures associated therewith.

FIG. 42 is an enlarged cross-sectional exploded view showing from top to bottom the plug casing, the first plug/nozzle assembly, and the adapter mechanism (in assembled relation with the second single-service beverage media container) as enlarged and cross-sectioned from FIG. 36 to show in greater clarity the structures associated therewith.

FIG. 43 is a top perspective view of (a) the prior art mug and spill tray in assembled relation and (b) the adapter mechanism (in assembled relation with the second single-service beverage media container) prior to insertion into a second compact portable beverage apparatus having an upper lid mechanism according to the present invention showing the upper lid mechanism in a first condition of use.

FIG. 44 is a frontal elevational view of (a) the prior art mug and spill tray in assembled relation and (b) the adapter mechanism (in assembled relation with the second single-service beverage media container) prior to insertion into the second compact portable beverage apparatus having an upper lid mechanism showing the upper lid mechanism in the first condition of use.

FIG. 45 is a lateral elevational view of (a) the prior art mug and spill tray in assembled relation and (b) the adapter mechanism (in assembled relation with the second single-service beverage media container) prior to insertion into the second compact portable beverage apparatus having an upper lid mechanism showing the upper lid mechanism in the first condition of use.

Figure 46:
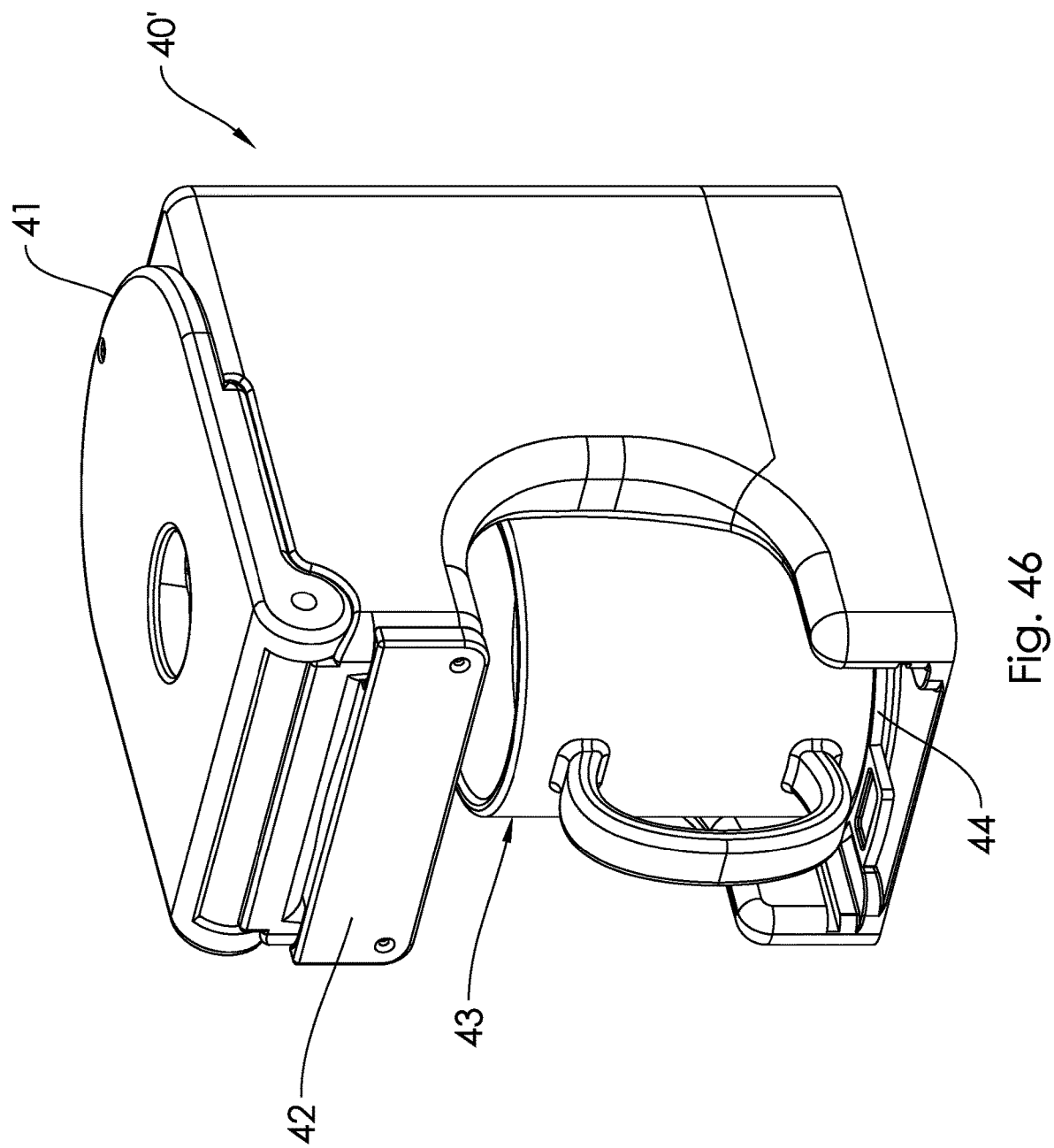

FIG. 46 is a top perspective view of (a) the prior art mug and spill tray in assembled relation and (b) the adapter mechanism (in assembled relation with the second single-service beverage media container) after insertion into a second compact portable beverage apparatus having an upper lid mechanism showing the upper lid mechanism in a second condition of use.

FIG. 47 is a frontal view of a mobile communications device having a visual display depicting a ridesharing mobile application screenshot with a beverage service option icon being selected/pressed by a user's finger.

FIG. 48 is a generic depiction of a rideshare vehicle receiving an incoming beverage service signal as generated via the ridesharing mobile application screenshot with beverage service option icon as selected/pressed by a user's finger.

FIG. 49 is a top perspective view of the first single-service beverage container assembly after insertion into the first compact portable beverage apparatus receiving an incoming beverage service signal as generated via the ridesharing mobile application screenshot with beverage service option icon as selected/pressed by a user's finger.

FIG. 50 is a longitudinal cross-sectional view of an individually packaged single-service beverage media container assembly according to the present invention.

FIG. 51 is a top perspective view of the individually packaged single-service beverage media container assembly according to the present invention.

FIG. 52 is a bottom perspective view of the individually packaged single-service beverage media container assembly according to the present invention.

FIG. 53A is a longitudinally cross-sectioned and exploded side view of the individually packaged single-service beverage media container assembly according to the present invention showing from top to bottom a packaging top, the second single-service beverage media container, and a packaging bottom.

FIG. 53B is a top perspective exploded view of the individually packaged single-service beverage media container assembly according to the present invention showing from top to bottom a packaging top, the second single-service beverage media container, and a packaging bottom.

FIG. 53C is a bottom perspective exploded view of the individually packaged single-service beverage media container assembly according to the present invention showing from top to bottom a packaging top, the second single-service beverage media container, and a packaging bottom.

FIG. 54A is a top perspective view of a multi-pack single-service beverage media container array according to the present invention showing twelve individually packaged single-service beverage media container assemblies within the array.

FIG. 54B is a first, inverted longitudinal cross-sectional view the multi-pack single-service beverage media container array according to the present invention showing six individually packaged single-service beverage media container assemblies within the array.

FIG. 54C is a transverse cross-sectional view the multi-pack single-service beverage media container array according to the present invention showing twelve individually packaged single-service beverage media container assemblies within the array.

FIG. 54D is a second longitudinal cross-sectional view the multi-pack single-service beverage media container array according to the present invention showing six individually packaged single-service beverage media container assemblies within the array.

Figure 55:
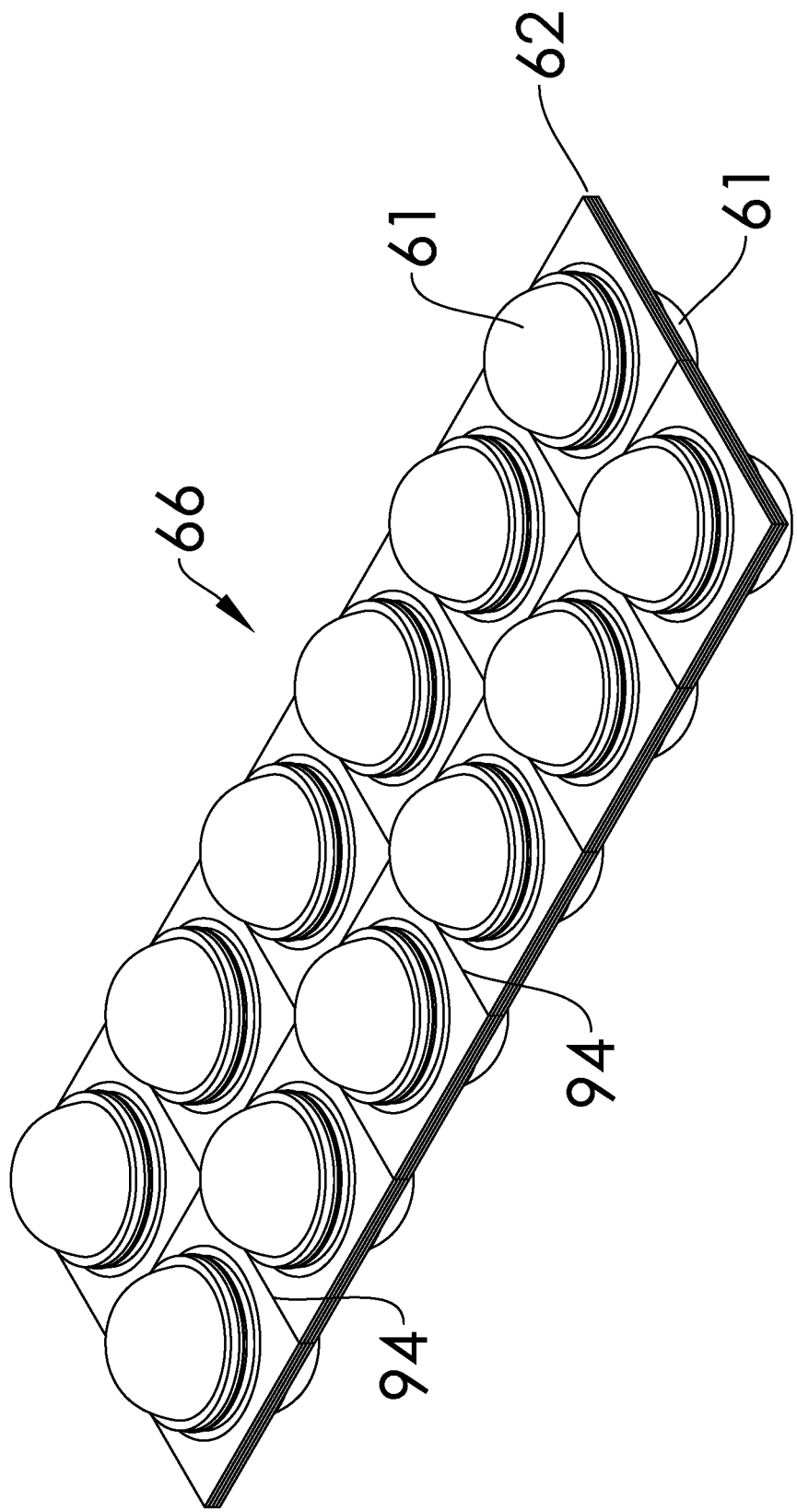

FIG. 55 is a top perspective view of a double, multi-pack single-service beverage media container array according to the present invention.

Figure 56B:
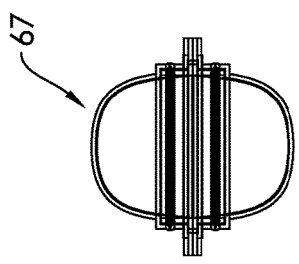
Figure 56C:
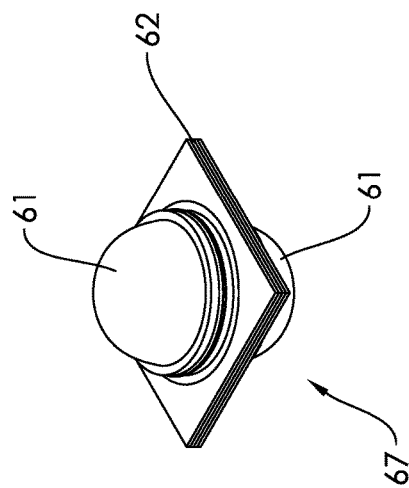
Figure 56A:
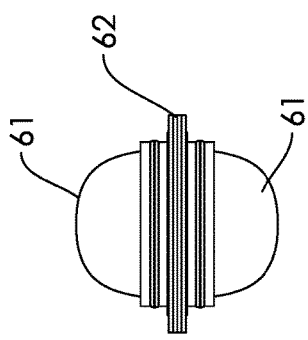

FIG. 56A is a side elevational view of a double, individually packaged single-service beverage media container assembly according to the present invention.

FIG. 56B is a longitudinal cross-sectional view of the double, individually packaged single-service beverage media container assembly according to the present invention.

FIG. 56C is a top perspective view of the double, individually packaged single-service beverage media container assembly according to the present invention.

Figure 56D:
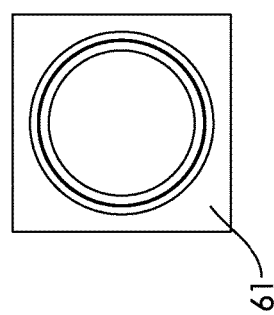

FIG. 56D is a top plan view of the double, individually packaged single-service beverage media container assembly according to the present invention.

Figure 57:
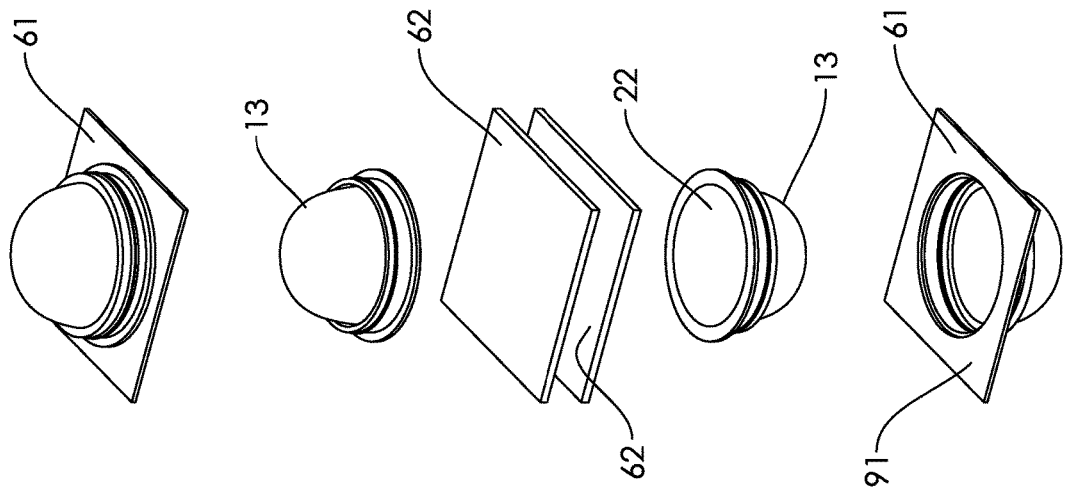

FIG. 57 is a top perspective exploded view of the double, individually packaged single-service beverage media container assembly according to the present invention showing from top to bottom a first package bottom, a first second single-service beverage media container, a first package top, a second package top, a second, second single-service beverage media container, and a second package bottom.

DETAILED DESCRIPTION OF THE PREFERRED EMBODIMENTS

Referring now to the drawings with more specificity, the following specifications generally describe a beverage service system for enabling a consumer to portably consume a beverage output from a single-service beverage media container. Single-service beverage media containers usable in combination with the subject invention may be exemplified by K-cups and similar other single-serve beverage containers otherwise referred to as beverage pods and/or beverage capsules. Notably, beverage media other than coffee grounds can be contained with these single-service vessels, which beverage media may include tea, instant or soluble coffee preparations, cocoas, dairy-based beverages, lemonades, cider, and other fruit-based drinks.

A cup type single-service beverage media container usable in combination with the subject invention is generally depicted and referenced at 12, and a pod type single-service beverage media container usable in combination with the subject invention is generally depicted and referenced at 13. Both the cup type single-service beverage media container 12 and the pod type single-service beverage media container 13 typically comprise an upper planar seal or cover that is piercable by a water/liquid delivery nozzle for delivering water or liquid into the beverage media contained by the lower portions of the containers 12 or 13. The lid formation 11 according to the present invention cooperates with both state of the art containers of these types as well as newly conceived containers of these types so as to position containers of these types for use with low-cost disposable beverage or liquid containers.

In the case of the cup type single-service beverage media container 12, the lower media-containing portion 71 is typically formed of a lightweight plastic material that is piercable through bottom portion(s) 72 of the media-containing portion 71 and through which piercing liquid-turned-beverage is allowed to permeate. In the case of the pod type single-service beverage media container 13, the lower media-containing portion 73 is typically formed of a liquid permeable (paper) filter material through which material liquid-turned-beverage is allowed to permeate.

The pod type single-service beverage media container 13 further comprises an upper structural wall or ring as at 37. The outer wall surfacing of the lower media-containing portion 71 of the cup type single-service beverage media container 12, and the outer wall surfacing of the upper structural wall or ring 37 of the pod type single-service beverage media container 13 according to the present invention may be preferably outfitted with certain container retention formations for aiding in the retention of the containers 12/13 within the lid formation 11 as discussed in more detail below. In both cases, the liquid-turned-beverage outlets from the media-containing portions 71/73 through liquid-letting structure associated with the portions 71/73 directly into a vessel located in inferior adjacency thereto under gravitational force.

As indicated, the beverage service system according to the present invention is usable in combination with state-of-the-art single-service beverage media containers, but is further usable in combination with improved single-service beverage media containers as illustrated and hereafter described. Key to operability in combination with the presently described inventive concepts is a single-serve or single-service beverage media container exemplified by containers 12 and/or 13 both of which comprise an upper peripheral edge as at 36 with an upper planar (e.g. foil) seal or cover as at 22, which seal or cover 22 is seated atop the upper peripheral edge 36 or adhered thereto for covering the upper mouth portion of the container(s) 12/13 and preventing contaminants from entering the media containment portions 71/73 of the containers 12/13.

The upper peripheral edge 36 of the containers 12/13 is typically circular in formation and preferably comprises a standardized diameter. The lid formation 11 according to the present invention is configured to cooperate with the upper peripheral edge 36 and its corresponding diameter. In this regard, the reader is directed to the interior circular, container-receiving opening or aperture as at 99, which aperture 99 is defined, in part, by an interior, downwardly extending edge as at 100. The lid formation 11 further preferably comprises a rim-receiving groove as at 24, a primary beverage outlet as at 29 formed in the lid dome perimeter 23, a particularly configured lid depression as at 25, and certain container retention mechanisms as variously exemplified. The lid formation 11 is thus configured to receive and retain the single-service beverage media container as exemplified by containers 12/13. A single-service beverage media container is thus receivable in the container-receiving aperture 99, and supportable/retainable by certain container support/retention mechanisms as variously exemplified.

A primary liquid container is generally depicted and referenced at 10 throughout the drawing support submitted in support of these specifications. The primary liquid container referenced at 10 may be state of the art and comprises an upper container rim as at 74. The lid formation 11 is attachable via its rim-receiving groove 24 to the upper container rim 74 of the primary liquid container 10 thereby forming a lid-container combination. When the single-service beverage media container as at 12/13 is received and retained by the lid formation 11, ensemble 38 comprising elements 10, 11, and 12 or 13 is provided.

A liquid such as hot water is directable into either of the single-service beverage media container(s) 12/13 by piercing an aperture in the seal or cover 22 and inputting the liquid into the container(s) 12/13 where it mixes with the beverage media (e.g. coffee grounds) stored within the container(s) 12/13 and is output as beverage from the container(s) 12/13 into the primary liquid container 10. Beverage may then be outlet from the lid formation 11 via the primary beverage outlet 29 thereby enabling the consumer to portably consume the beverage output via the single-service beverage media container(s) 12/13 with the single-service beverage media container(s) 12/13 retained by the lid formation 11 during consumption events.

Noting that the single-service beverage media container(s) 12/13 each preferably comprise an upper peripheral edge 36, the reader is directed to a radially extending edge-receiving, container-locking groove 14 formed in the lid formation 11. A preferred first means for both supporting and retaining the containers 12/13 according to the present invention may thus be exemplified by the edge-receiving, container-locking groove 14. The upper peripheral edge 36 is received in the edge-receiving, container-locking groove 14 and the flange portion 52, that extends radially outward from the media-containment portions 71/73 terminating at the upper peripheral edge 36, rests upon flange support structure 53 of the lid formation 11.

The upper peripheral edge 36 is receivable in the edge-receiving, container-locking groove 14, which edge-receiving, container-locking groove 14 retains the upper peripheral edge 36 by a snap fit type engagement thereby preventing inadvertent removal of the single-service beverage media container(s) 12/13 from the lid formation 11. The edge-receiving, container-locking groove 14 may be preferably formed in the lid formation 11 so as to position the upper peripheral edge 36 and flange portion 52 in a plane 200 parallel to (and above) the plane 201 of the rim-receiving groove 74 for elevating the containers 12/13 above beverage 48 collected in the primary liquid container 10 as generally depicted in FIG. 9.

The lid formation 11 further preferably comprises an outer lid dome perimeter 23 and an inner, centrally located depression as at 25, which depression 25 comprises a lower sloped region 75 in superior and radial outer adjacency to the edge-receiving, container-locking groove 14. The lower sloped region 75, extending in an oblique manner relative to the plane of the edge-receiving, container-locking 14, structurally guides the upper peripheral edge 36 into the edge-receiving, container-locking groove 14. An upper ridge 76 may be formed at the upper portion of the lower sloped region 75 for structurally separating the lower sloped region 75 from the upper sloped region 15, and providing a certain pooling annular region upon the upper sloped region 15 for any excess beverage that may become trapped by the upper ridge 76.

Alternative or secondary locking mechanisms for retaining the single-service beverage media containers 12/13 in the lid formation 11 may be exemplified by a number of alternative structures associated with or formed at outer wall surfacing of the single-service beverage media containers 12/13. The alternative locking mechanisms utilize resistive forces inherent in the material construction of the lid formation 11 to push the interior downwardly extending edge 100 of the container-receiving circular opening or aperture 99 against or into engagement with outwardly extending surface ledges or protrusion features as referenced at 101, 102, 103, and 104. The outwardly extending surface ledges or protrusion features 101-104 are structurally located in inferior adjacency to the flange portion 52 and upper peripheral edge 36 of the single-service beverage media containers 12/13.

The outwardly extending surface ledges or protrusion features of the single-service beverage media containers 12/13 provide certain means to accept and or support the interior downwardly extending (circular) edge 100 of interior circular opening 99 and to secondarily secure the containers 12/13 in position in combination with the edge-receiving, container-locking groove 14. In other words, the combination of container retention mechanisms 14, 101, 102, 103, and 104 maintain the single-service beverage media containers 12/13 in secured position and prevent inadvertent removal thereof from the lid formation 11.

Figure 10B:
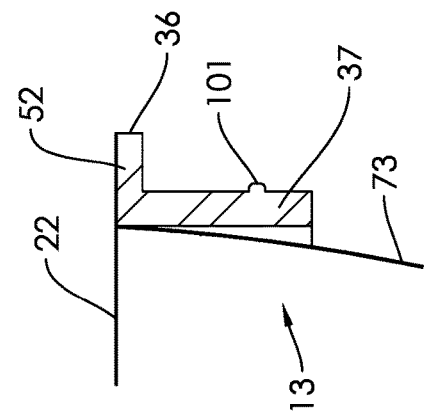
FIG. 10B is an enlarged, fragmentary view of upper right portions of the second single-service beverage media container as enlarged and fragmented from FIG. 10A to show in greater clarity structures associated therewith.
Figure 10A:
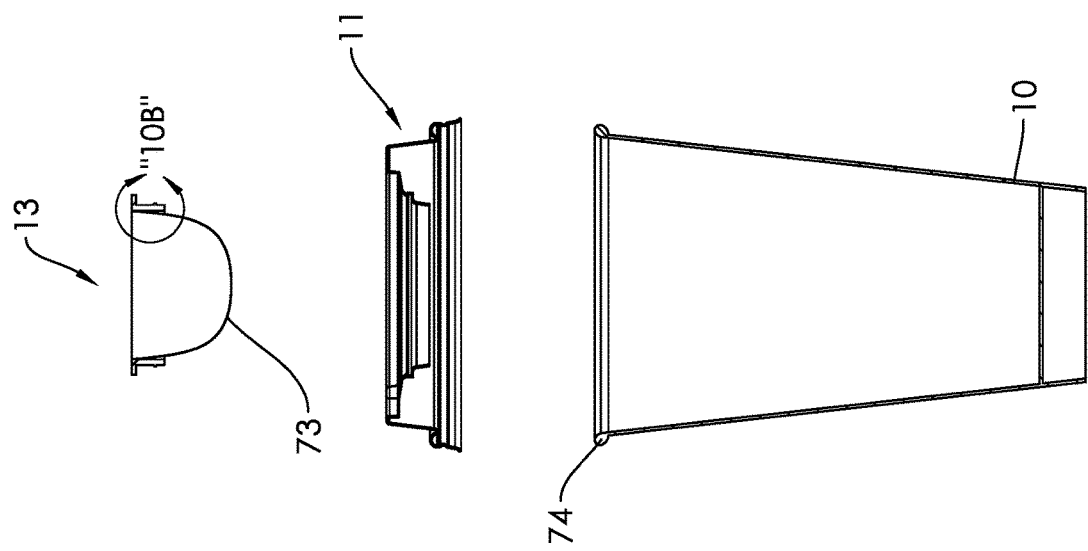
FIG. 10A is a longitudinal cross-sectional view of the second single-service beverage container assembly according to the present invention depicted in an exploded manner to show from top to bottom the second single-service beverage media container, the first lid formation, and the prior art liquid container.
Figure 12B:
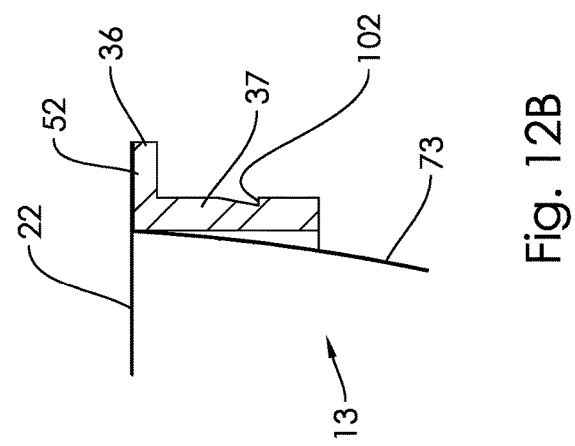
FIG. 12B is an enlarged, fragmentary view of upper right portions of the third single-service beverage media container as enlarged and fragmented from FIG. 12A to show in greater clarity structures associated therewith.
Figure 12A:
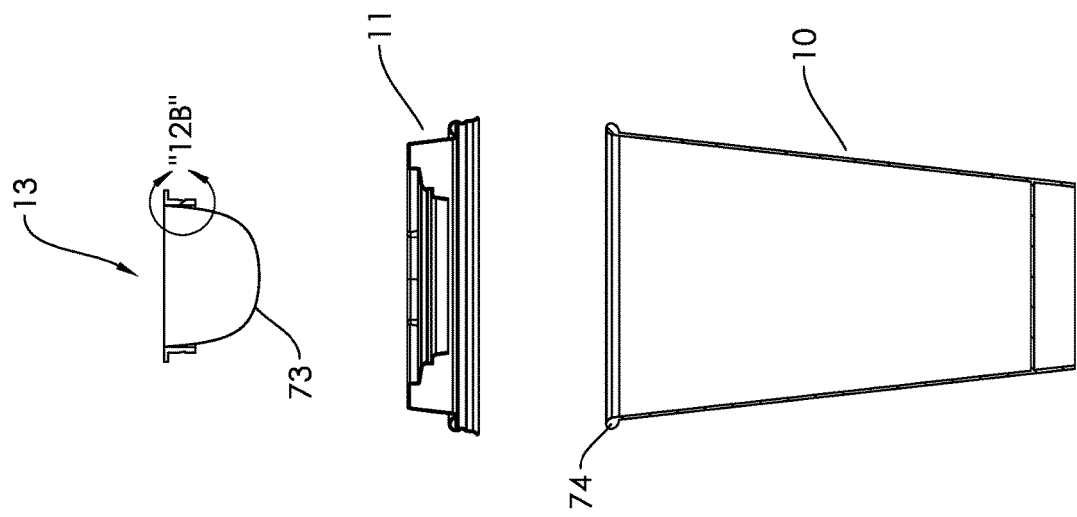
FIG. 12A is a longitudinal cross-sectional view of the third single-service beverage container assembly according to the present invention depicted in an exploded manner to show from top to bottom the third single-service beverage media container, the first lid formation, and the prior art liquid container.

The first outer surface ledge or ridge feature is generally depicted and referenced at 101 and is essentially an outwardly extending protrusion, ridge, or bump upon which the interior downwardly extending edge 100 may be supported as generally and comparatively depicted in FIGS. 9, 10, and 10B. The second outer surface ledge or ridge feature is generally depicted and referenced at 102 and is essentially an outwardly extending protrusion, ridge, or bump having an angled/shaved groove thereabove as generally and comparatively depicted in FIGS. 11, 12, and 12B. The edge 100 is supported by the outwardly extending ledge 102 with inner portions of the edge 100 fitting into the angled channel or groove feature formed in superior adjacency thereto.

Figure 16B:
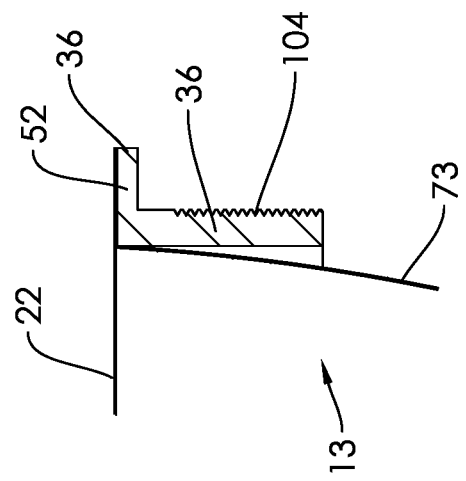
FIG. 16B is an enlarged, fragmentary view of upper right portions of the fifth single-service beverage media container as enlarged and fragmented from FIG. 16A to show in greater clarity structures associated therewith.
Figure 16A:
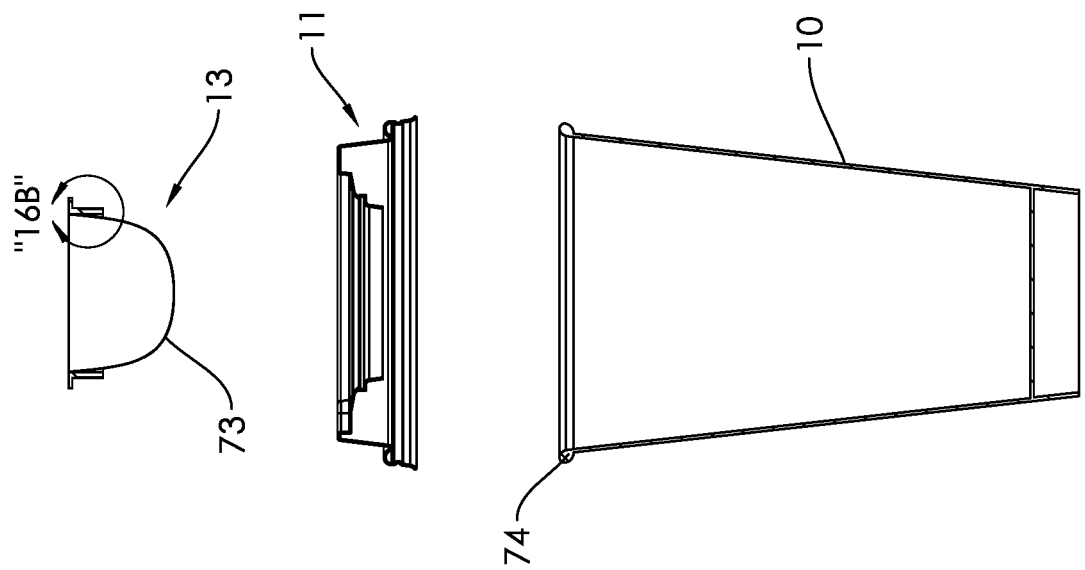
FIG. 16A is a longitudinal cross-sectional view of the fifth single-service beverage container assembly according to the present invention depicted in an exploded manner to show from top to bottom the fifth single-service beverage media container, the first lid formation, and the prior art liquid container.

The third outer surface ledge or ridge feature is generally depicted and referenced at 103 and is essentially an outwardly extending protrusion, ridge or bump having a rectangular groove or channel formed in superior adjacency thereto. The edge 100 may be supported by the ledge feature 103 and inner portions of the edge 100 are received in the rectangular groove or channel as generally and comparatively depicted in FIGS. 13, 14, and 14B. The fourth outer surface ledge(s) or ridge feature(s) are generally depicted and referenced at 104. The fourth outer surface ledge(s) or ridge feature(s) are a series of serrations or a serrated region comprising a series of outwardly extending teethlike projections, with trough-like gaps therebetween, and upon which the edge 100 may be supported by a select ledge or ridge as selected from the series of teethlike projections as generally and comparatively depicted in FIGS. 15, 16, and 16B.

It will thus be understood that the beverage service system according to the present invention may preferably provide a single-service beverage media container exemplified by container 12 or 13 that comprise at least one outwardly extending support ledge as variously exemplified that preferably extend in parallel relation to the flange portion 52 and the upper peripheral edge 36. The at least one outwardly extending support ledge(s) according to the present invention support the interior downwardly extending edge 100 of the lid formation 11 for enhancing container-to-lid retention of the single-service beverage media container(s) 12/13 as received and retained by the lid formation 11.

The at least one outwardly extending support ledge, however exemplified, extends outwardly in inferior adjacency to an upper groove formation, whether obliquely angled, rectangular, or trough-like as formed on the single-service beverage media containers 12/13. The at least one outwardly extending support ledge may be located within a serrated region as at 104, which serrated region 104 comprises a series of outwardly extending support ledges. The edge 100 may be supported by a select support ledge as selected from the series of outwardly extending support ledges of the serrated region 104.

Referring now to FIGS. 17-27, the reader will there consider certain drawings of a plug/nozzle assembly as generally depicted and referenced at 16 for directing liquid 47 into the single-service beverage media containers 12/13 particularly and the ensemble 38 generally. The plug/nozzle assembly 16 according to the present invention is usable in combination with a plug casing as at 17. The plug/nozzle assembly 16 preferably comprises a rubber or rubber-like (i.e. elastomeric) plug body 20 having a rubber or rubber-like edge as at 30 and at least one nozzle as at 19. Comparatively referencing FIGS. 22 and 23 versus FIGS. 22A and 23A, and FIGS. 24-24B, the reader will there note that the plug/nozzle assembly 16' may alternatively comprise a series of (miniature) nozzles 19.

FIG. 22A depicts a shower head-like reservoir 45 with multiple miniature nozzles 19, which alternative plug/nozzle assembly 16' may be preferred for use in combination with pod type single-service beverage media containers 13. In this regard, it is noted that pod type single-service beverage media containers 13 have a permeable lower portion 73. Because the lower portion 73 is permeable, hot water/liquid passes through ground coffee/tea with less resistance, and less mixing. Notably, it is difficult to create any beverage media-mixing pressure in pod type single-service beverage media containers 13 on par with the beverage media-mixing ability of cup type single-service beverage media containers 12.

Multiple miniature nozzles 19 arranged peripherally and centrally of the plug/nozzle assembly 16' (e.g. as few as 5 miniature nozzles 19 and as many as 20 miniature nozzles 19), help equally disperse hot water/liquid for wetting more coffee/tea content resulting in better media permeation and beverage flavor output. Comparatively referencing FIGS. 22A, 23A, and 24A, the reader will there consider alternative plug/nozzle assembly 16' having a liquid reservoir 45 with hot liquid/water 46 received therein via a pressured water/liquid source 49. Hot water is outlet as at 47 through the series of miniature nozzles 19 and mixes with beverage media 77 for forming beverage (e.g. coffee/tea) 48 that outputs into the primary liquid container 10 or similar other liquid container (e.g. an open top liquid container or mug as at 43).

Comparatively referencing FIGS. 22B, 22C, and 24C-24E, the reader will there consider certain variants of a multi-miniature nozzle arrangement and the physical process of directing liquid through beverage media contained in lower portion 73 via a series of multiple miniature nozzles 19. FIG. 22B depicts an alternative plug/nozzle assembly 16" comprising a nozzle field or arrangement of sixteen miniature nozzles 19 and FIG. 22C depicts alternative plug/nozzle assembly 16' comprising a nozzle field or arrangement of seven miniature nozzles 19.

FIGS. 24C through 24E sequentially depict liquid under pressure 49 being directed through a series of miniature nozzles 19, which liquid permeates the beverage media 77 and outputs as beverage 48. Vectors 54' in FIG. 24C generally reference (hot) liquid streams emanating from multiple miniature nozzles 19. Vectors 55 in FIG. 24D generally reference (hot) liquid streams under an initial flow pressure with an initial resistance being depicted at relatively short vector 56. Vectors 55' in FIG. 24E depict liquid pressing through saturated/swallowed beverage media (e.g. coffee/tea). Relatively long vector 56' in FIG. 24E depicts an increased resistance to liquid flow after the beverage media 77' is saturated/swallowed.

The plug/nozzle assemblies 16/16' each further preferably comprise a plug support structure 21 comprising a substantially rigid material; an outer perimeter flange as at 26 having an outer diameter 27; and a lower bowl-shaped surface as at 32 contributing to a vertically transverse plug profile as at 18. The plug casing 17 comprises an inner space-providing groove as at 28 and a casing edge as at 31 that seats down upon the rim-receiving groove 24 of the lid formation 11.

Comparatively referencing, FIGS. 20 and 21, the reader will consider that the lid formation 11 further preferably comprises an upper lid profile as at 78, and that the plug/nozzle assemblies 16/16' according to the present invention comprise a lower plug profile as at 18. The upper lid profile 78 and the lower plug profile 18 each preferably comprise outer lid and plug peripheral portions as at 79 and 80, respectively. The outer lid/plug peripheral portions 79 and 80 comprise opposed parallel surfacing for better mated engagement when the plug/nozzle assemblies 16/16' seat down into engagement with the lid formation 11. In this regard, specifically comparatively referencing FIGS. 21, 24, and 24F the reader will there see that the outer lid peripheral portion 79 and the outer plug peripheral portion 80 respectively comprise opposed parallel surfacing as at 96 and 97 spaced from one another at a first peripheral spacing 98 when the central portion 81 is fully engaged with the upper seal 22 of the single service beverage media containers 12/13 in the arcuately depressed seal 22' configuration.

Comparatively referencing FIGS. 24B and 24F, the reader will there further consider a stepped plug formation 99 of the plug body 20 radially inward from the outer perimeter flange 26 and radially outward from the central portion 81. The stepped plug formation 99 structurally opposes a stepped lid formation 109 radially inward from the planar surfacing 96 of the outer peripheral portion 80 of the lid formation 11. The stepped plug formation 99 and the lid formation 109 are spaced apart from one another as at spacing as at 110, which spacing 110 is coextensive with the first peripheral spacing 98 and allows packaging envelope 60 to extend between the stepped plug formation 99 and the stepped lid formation 109.

The lower plug profile 18 further preferably comprises a central portion 81 relative to the outer plug peripheral portion 80, which central portion 81 is convex relative to upper planar seal or cover 22 of the single-service beverage media containers 12/13. The central portion 81 thus arcuately depresses the upper planar seal or cover 22 into an arcuately depressed seal 22' when engaged therewith as generally and comparatively depicted in FIGS. 20-24. The arcuately depressed seal 22' is particularly depicted and referenced in FIGS. 23, and 23A-24E. Together, the convex central portion 81 and the nozzle 19 direct liquid 47 through the arcuately depressed seal or cover 22' of the single-service beverage media containers 12/13.

The convex central portion 81 of the lower lug profile 18 is the most important part of the profile 18 and the only part of profile 18 that can act independently from other sections of profile 18. For example, the convex central portion 81 is self-sufficient and the only portion of the plug assemblies 16/16'/16" that eliminates space between lower surfacing of the convex central portion 81 and upper surfacing of the arcuately depressed seal or cover 22' as generally and comparatively depicted in FIGS. 23, and 23A-24E. The convex central portion 81 thereby prevents liquid under pressure to back-flow or to pass between the plug/nozzle assembly 16 and the arcuately depressed seal or cover 22' of the single-service beverage media containers 12/13.

Referencing FIGS. 22-24B, the reader will there consider a pre-assembled ensemble 38 further pre-packaged into a sealed packaging envelope 60 of thin plastic/paper etc. The combination or ensemble 38 is particularly contemplated for use by service providers such as hotels and ridesharing services in which cases hygiene is important and the possibility of tampering is significant. For example, if a rideshare driver or driverless rideshare service vehicle were to receive an order to make coffee for an incoming rider, s/he may take a pre-assembled ensemble 38 with sealed packaging envelope 60 and insert it into a vehicle-based liquid delivery apparatus or coffee maker as at 40.

When the beverage has been prepared, the only damage to the packaging envelope 60 will be a small hole from the nozzle(s) 19. The beverage service system according to the present invention thus contemplates the provision of both a single-service beverage media container as at 12 or 13 or the ensemble 38 in combination with an assembly-protective (packaging) envelope 60. The assembly-protecting (packaging) envelope 60 primarily functions to seal the single-service beverage media container 12 or 13 and lid-container combination or ensemble 38 before liquid is directed through the single-service beverage media container 12 or 13 for preventing contamination of the ensemble 38, particularly for beverage service providers.

The beverage service system according to the present invention further contemplates the use of a compact (portable) liquid delivery apparatus, a first or preferred of which is generally depicted and referenced at 40. It is contemplated that the liquid delivery apparatus 40 may be placed upon a countertop or outfitted within a vehicle, however in any case primarily functions to direct liquid/water through the single-service beverage media containers 12/13 for outputting beverage 48 therefrom into the primary liquid container 10 or similar other liquid containers such as open top liquid containers as exemplified by coffee mugs 43.

It is important to note that a primary feature of the liquid delivery apparatus 40 is its ensemble-receiving mouth or port profile as generally depicted and referenced at 34. The liquid delivery apparatus 40 thus preferably comprises an assembly-receiving profile and the lid-container combination or ensemble 38 (note: the single-service beverage media containers 12/13 are recessed relative to upper portions or surfacing of the lid formation 11) comprises an upper assembly profile as at 35, as well as an ensemble height 33.

Comparatively referencing FIGS. 32-34, the assembly-receiving profile 34 is preferably dimensioned or sized and shaped to receive at least the upper assembly profile 35 such that lateral and superior opposed surfacing of the liquid delivery apparatus 40 and the lid-container combination or ensemble 38 is substantially parallel. In other words, the orifice of the liquid delivery apparatus for receiving the lid-container combination or entire ensemble 38 with single-service beverage media container(s) 12/13 received therein, is shaped substantially the same as at least upper portions of the lid-container combination or ensemble 38 for eliminating space between the liquid delivery apparatus 40 and the lid-container combination or ensemble so as to provide a tighter fit therebetween. The orifice shape may be tightly configured to receive the entire ensemble 38, having height 33, as generally depicted in FIG. 34.

The liquid delivery apparatus 40 further preferably comprises a lever/lid mechanism 41 for piercing the seal or cover 22 after insertion of the ensemble 38. Further, the liquid delivery apparatus 40 may be outfitted with a support plate 51 and a spring mechanism 50 for further structurally ensuring a tight fit between the liquid delivery apparatus 40 and the ensemble 38.

Comparatively referencing FIGS. 31-31C, the reader will there consider the lever 41, that when lowered, operates to hold the ensemble 38 tightly pressed and securely positioned within the "mouth" of the liquid deliver apparatus 40 exemplified by the profile 34. FIG. 31B attempts to depict a compensating spring mechanism 50 in a relaxed state when the liquid delivery apparatus 40 is in an unengaged state as otherwise depicted in FIG. 31. When the liquid delivery apparatus 40 is operated into an engaged state by depression of the lever 41, as generally depicted in FIG. 31A, the spring mechanism 50 is placed into an actuated stated and pressed by the support plate 51. This simple spring mechanism further maintains constant pressure between the plug profile 18 and the seal or cover 22 even if the material construction of the lid formation 11 were to soften during the application of heat resulting in the loss of some material resistivity. The compensating spring mechanism 50 compensates for the loss in material resistance to maintain a constant pressure on the ensemble 38.

As indicated above, the liquid delivery apparatus 40 may be vehicular-based for enabling users thereof to portably consume the beverage 48 output from the single-service beverage media containers 12/13 while in a vehicle 82 outfitted with the vehicular-based liquid delivery apparatus 40. The beverage service system according to the present invention thus contemplates a vehicle-based liquid delivery apparatus 40 comprising means for receiving a remotely initiated signal 87 to direct liquid through the single-service beverage media containers 12/13 for outputting beverage 48 therefrom into the primary liquid container 10 or similar other liquid container. The remotely initiated signal 87 may be remotely initiated via a mobile application operable via a communication device 83, for example.

Ridesharing services, as exemplified by Uber Technologies Inc. and Lyft, Inc., may thus be able to offer beverage (e.g. coffee) service during the rideshare event. When a rideshare customer orders a rideshare service, the rideshare customer may be provided with an option to order beverage service (e.g. via a beverage service icon 84 provided by a mobile application displayed upon a visual display 85 of a mobile communications device 83) as generally depicted in FIG. 47. By pressing, as at 86, the "coffee" button or icon 84, a beverage (e.g. coffee) menu may then be displayed (not specifically illustrated).

The beverage service order and the request for the rideshare event are both then transmitted as at signal 87 to only those rideshare service providers who offer beverage service, thereby providing an incentive to rideshare service provides to install the liquid delivery apparatus 40 in the corresponding rideshare vehicle. As soon as the rideshare driver confirms the order, the vehicle-based liquid delivery apparatus 40 receives the signal 87 for water/liquid preparation. It is contemplated that the water/liquid may be preheated just below optimal temperature.

By the time the rideshare service provider or driver is ready to pick up the rideshare passenger, the water/liquid in the vehicle-based liquid delivery apparatus 40 is preheated. The rideshare driver may (a) assemble the ensemble 38, and insert the ensemble 38 (optionally outfitted with seal or envelope 60) into the vehicle-based liquid delivery apparatus; (b) assemble the primary liquid container 10 and lid formation 11, giving the passenger the freedom to choose the type/flavor of single-service beverage media containers 12/13 and the ability to add desired ingredients (milk, sugar, etc.); or (c) the passenger may herself/himself opt to prepare the beverage from the various components as provided. Beverage service in ridesharing services may be provided by way of either complimentary customer service or charged to the passenger as an additional charge with the rideshare service company optionally earning a percentage of the beverage service income.

Referencing FIGS. 35-46, the reader will there consider an optional adapter mechanism according to the present invention as generally depicted and referenced at 42. It is contemplated that the adapter mechanism 42 may operate in combination with the plug/nozzle assemblies 16/16' as integrated into an adaptor-accommodating liquid delivery apparatus 40' and may operate to direct output beverage 48 into an open top liquid container as exemplified by coffee mug 43 that may sit atop a spill tray as at 44. The single-service beverage media containers 12/13 may be received in an orifice of the adapter mechanism 42 that is similarly shaped as compared to the aperture 99 of the lid formation 11 for receiving portions 71 and 73, as well as support structure for supporting the flange portion 52 and the upper peripheral edge 36.

The beverage service system according to the present invention may thus preferably further comprise an adapter mechanism as at 42 usable in combination with the liquid delivery apparatus 40' for enabling the user to direct liquid through the single-service beverage media containers 12/13 into an open top secondary liquid container exemplified by mug 43. The adapter mechanism 42 preferably comprises an adapter-based container-receiving aperture akin to aperture 99, an open top-seating/receiving formation as at 88, and casing edge-receiving structure as at 89 for receiving the casing edge 31. The adapter-based container-receiving aperture receives and positions the single-service beverage media containers 12/13, and the open top-seating formation accepts the open top 90 of the secondary liquid container 43.

The liquid delivery apparatus 40' may thus direct liquid through the single-service beverage media containers 12/13 for outputting beverage 48 therefrom into the open top secondary liquid container 43.

Turning now to FIGS. 50-57, the present specifications further contemplate certain packaging methods of single or double pod type single-service beverage media containers 13. In this regard, it is noted that pod type single-service beverage media containers as at 13 are proliferating and in many instances are replacing cup type single-service beverage media containers 12 for a number of reasons. A primary reason for the apparent trend is that pod type packaging has less impact on the environment at least insofar as many varieties are constructed from biodegradable materials.

The basic construction of a pod type single-service beverage media container, however, can have a negative impact on the ingredients or beverage media contained therein. The negative impact via exposure to outside elements can affect hygiene, food safety, quality of the product, etc. To prevent the negative impact, state of the art means for addressing this perceived need have involved packing a number (e.g. 10-12) of the pod type single-service beverage media containers into sealed bags or a package container.

The pod constructions are thus individually provided loosely in the sealed bags or package containers. After opening the bag/container, the user will typically make use of one or two pod constructions and leave behind the remainder of pod constructions in the now opened, seal-broke bag/container. The seal, having been broken, allows outside elements to negatively affect all remaining pod constructions left inside the bag/container even though the bag/container may comprise certain means for resealing the bag/container. Repeated opening of the bag/container re-exposes the pod constructions to outside elements.

The beverage service system according to the present invention thus contemplates individualized packaging of the pod constructions. Individualized pod construction packaging allows the user to open one or two pod constructions at the time of use, and leave remaining pod constructions sealed in original individualized packaging. Individualized vacuum packaging is envisioned as the preferred packaging method for the following concepts.

The beverage service system according to the present invention contemplates the provision of single-service beverage media containers 13 that are provided within an individual package construction 64 comprising a planar package top or seal material as at 62, and a package bottom or packaging shell as at 61. The package bottom or packaging shell 61 is preferably dimensioned or sized and shaped to receive the single-service beverage media containers 13 such that an upper seal or cover 22 of the single-service beverage media container 13 is flush with an upper package surface 91 of the package bottom 61, and such that internal package bottom surfacing 92 inferior to the upper package surface 91 is parallel to external surfacing 93 of the single-service beverage media container 13 inferior to the upper seal or cover 22.

Conceivably, the individual package construction 64 could be utilized as an outer container for pod type single-service beverage media containers 13 in order to better retain liquid pressure inside of the package bottom 61 during liquid delivery in a similar manner as the lower portion 71 of the cup type single-service beverage media containers 12. In other words, the individual packaging construction would not be removed for liquid delivery, but rather the entire individual package construction 64, with pod type single-service beverage media container inside, may be inserted into the lid formation 11 provided the planar package top 62 is modified to mate with the edge-receiving groove 14.

The individual package construction 64 may be preferably and structurally linked to at least one substantially identical adjacent individual package construction 64 as generally and comparatively depicted in FIGS. 54A-57. The individual package construction 64 and at least one adjacent individual package construction 64 may preferably be linked or attached to one another the planar package tops 62, which planar package tops 62 are preferably and removably connected to one another.

In this regard, the planar package tops 62 may be either connected to one another at peripheral edging 94 of adjacent planar package tops 62 (e.g. via perforated junctions at the edging 94), or may be connected to one another at opposed planar surfacing 95 of the planar package tops 62. A multi-pack pod construction according to the present invention is generally depicted and referenced at 65; a juxta-positioned multi-pack pod construction according to the present invention is generally depicted and referenced at 66; and a juxta-positioned multi-pack pod construction according to the present invention is generally depicted and referenced at 67.

While the above descriptions contain much specificity, this specificity should not be construed as limitations on the scope of the invention, but rather as an exemplification of the invention. In certain embodiments, the basic invention may be said to essentially teach or disclose a beverage service system for enabling a consumer to portably consume a beverage output from a single-service beverage media container. The foregoing specifications, however, further support a beverage service assembly basically comprising the lid formation and single-service beverage media container(s), as well as certain beverage service methodology practiced or enabled thereby.

The beverage service system according to the present invention may be said to essentially comprise the lid formation and primary liquid container usable as a lid-container combination. The lid formation is preferably configured to receive and retain a single-service beverage media container, and comprises a primary beverage outlet, a container-receiving aperture, and at least one container retention mechanism. The single-service beverage media container is received in the container-receiving aperture and retained by the at least one container retention mechanism.

As stated, the lid formation, being attached to the primary liquid container, forms a lid-container combination. A liquid such as hot water may be directed through the single-service beverage media container as received and retained by the lid formation for outputting beverage therefrom into the primary liquid container. The beverage may be outlet from the lid formation via the primary beverage outlet for enabling the consumer to portably consume the beverage as output via the received/retained single-service beverage media container.

The single-service beverage media container comprises an upper peripheral edge and the at least one container retention mechanism comprises an edge-receiving groove. The upper peripheral edge is receivable in the edge-receiving groove, which edge-receiving groove retaining the upper peripheral edge in secured position thereby preventing inadvertent removal of the single-service beverage media container from the lid formation. The lid formation preferably further comprises a sloped region in superior adjacency to the edge-receiving groove for structurally guiding the upper peripheral edge into the edge-receiving groove. The edge-receiving groove is preferably formed in the lid formation so as to position the upper peripheral edge in a plane parallel to and above the rim-receiving groove.

The single-service beverage media container comprises at least one outwardly extending support ledge that extends in parallel relation to the upper peripheral edge. The outwardly extending support ledge supports an inner downwardly extending edge of the lid formation for enhancing container-to-lid retention of the single-service beverage media container. The at least one outwardly extending support ledge may preferably extend outwardly in inferior adjacency to an upper groove formation formed in the single-service beverage media container, which upper groove formation may receive inner portions of the inner downwardly extending edge. The at least one outwardly extending support ledge may be within a serrated region, which serrated region may preferably comprise a series of outwardly extending tooth-like support ledges.

The beverage service system according to the present invention may further comprise, in combination, a liquid delivery apparatus for directing liquid through the single-service beverage media container and for outputting beverage therefrom into the primary liquid container. In this regard, the lid formation may preferably comprise an upper lid profile and the liquid delivery apparatus, may comprise a plug/nozzle assembly having a lower plug profile. The upper lid profile and lower plug profiles each comprise outer peripheral portions, which outer peripheral portions comprise opposed parallel surfacing for enhancing mated engagement therebetween.

The lower plug profile may comprise a central portion relative to the outer peripheral portion of the plug/nozzle assembly. The central portion is preferably convex relative to upper planar seal or cover of the single-service beverage media container. The central portion operates to depress the upper planar seal or cover when directing liquid through the single-service beverage media container for enhancing liquid delivery therethrough.

The liquid delivery apparatus may further preferably comprise an assembly-receiving profile and the lid-container combination may preferably comprise an upper assembly profile. The assembly-receiving profile is dimensioned or sized and shaped to receive the upper assembly profile such that lateral and superior opposed surfacing of the liquid delivery apparatus and the lid-container formation are substantially parallel when so received. The liquid delivery apparatus may be vehicle-based, the vehicle-based liquid delivery apparatus enables the user to portably consume the beverage output from the single-service beverage media container while in a vehicle outfitted with the vehicle-based liquid delivery apparatus.

The beverage service system according to the present invention may further preferably comprise, in combination, the single-service beverage media container as received and retained in the lid formation as attached to the primary liquid container and all elements sealed in an assembly-protective envelope. The assembly-protective envelope seals the single-service beverage media container and lid-container combination before liquid is directed through the single-service beverage media container.

The beverage service system may further preferably comprise an adapter mechanism usable in combination with the liquid delivery apparatus for enabling the user to direct liquid through the single-service beverage media container into an open top secondary liquid container. The adapter mechanism may comprise an adapter-based container-receiving aperture and an open top-seating formation. The adapter-based container-receiving aperture receives and positions the single-service beverage media container. The open top-seating formation accepts the open top of the secondary liquid container. The liquid delivery apparatus directs liquid through the single-service beverage media container for outputting beverage therefrom into the open top secondary liquid container.

The beverage service system further contemplates a vehicle-based liquid delivery apparatus comprising circuitry or means for receiving a remotely initiated signal to wirelessly or automatically direct liquid through the single-service beverage media container for outputting beverage therefrom into the primary liquid container. The remotely initiated signal may preferably be remotely initiated via a mobile application operable via a communication device or similar other computer or electronic device for sending similar signals.

The single-service beverage media container may preferably be provided within an individual package construction according to the present invention. The individual package construction comprises a planar package top and a package bottom dimensioned or sized and shaped to receive the single-service beverage media container such that an upper seal or cover of the single-service beverage media container is flush with upper package surface of the package bottom, and such that package bottom interior surfacing inferior to the upper package surface is parallel to exterior surfacing of the single-service beverage media container inferior to the upper seal or cover.

The individual package construction is structurally linked to at least one substantially identical adjacent individual package construction. The individual package construction and at least one adjacent individual package construction are preferably removably linked or removably interconnected via the planar package tops. The planar package tops may be connected to one another either at peripheral edging of adjacent planar package tops or at opposed planar surfacing of the planar package tops.

The beverage service assembly according to the present invention may be said to essentially comprise a single-service beverage media container according to the present invention and a lid formation configured to receive and support the single-service beverage media container. The lid formation comprises a container-receiving aperture and a container support mechanism. The single-service beverage media container is received in the container-receiving aperture and supported by the container support mechanism.

The beverage service assembly according to the present invention may further preferably comprise, in combination, a liquid container. The lid formation is attachable to the liquid container for enabling a consumer to position the single-service beverage media container relative to the liquid container for dispensing beverage directly into the liquid container via the lid formation. The lid formation may further preferably comprise a primary beverage outlet. Liquid directed through the single-service beverage media container outputs as beverage into the liquid container. The primary beverage outlet enables a user to consume beverage from the liquid container. The lid formation further preferably comprises at least one container retention mechanism. The at least one container retention mechanism prevents inadvertent removal of the single-service beverage media container from the lid formation.

The beverage service method according to the present invention may be said to essentially comprise the steps of: (1) providing a lid formation, the lid formation being configured to receive and retain a single-service beverage media container, and comprising a container-receiving aperture and a container support mechanism; (2) inserting a single-service beverage media container in the container-receiving aperture; and (3) supporting the single-service beverage media container by the container support mechanism.

The method may further comprise the step of attaching the lid formation to a liquid container thereby simultaneously covering the liquid container and positioning the single-service beverage media container relative to the liquid container. The method of may further comprise the step of directing liquid through the single-service beverage media container for outputting beverage into the liquid container. The method may further comprise the step of outfitting the lid formation with a primary beverage outlet for enabling a user to consume beverage from the liquid container. The method may further comprise the step of retaining the single-service beverage media container in the lid formation via a container retention mechanism.

Although the beverage service system, assembly, and method according to the present invention have been described by reference to a number of different embodiments, aspects, and features, it is not intended that the novel combinations or assemblies be limited thereby, but that modifications thereof are intended to be included as falling within the broad scope and spirit of the foregoing disclosure, the appended drawings, and the following claims.

What is claimed is:

1. A beverage service system for enabling a consumer to consume a beverage from a single-service beverage media container, the beverage service system comprising:
   a plug-nozzle assembly, the plug-nozzle assembly comprising a plug body and at least one nozzle, the plug body comprising a lower plug profile, the lower plug profile comprising a central portion, a stepped plug portion radially outward from the central portion, and an outer perimeter flange radially outward from the stepped plug portion, the central portion being convex relative to an upper seal of the single-service beverage media container, the central portion of the plug body arcuately depressing the upper seal into an arcuately depressed seal configuration when engaged therewith for preventing a liquid to pass between the plug-nozzle assembly and the upper seal of the single service beverage media container;
   a lid formation, the lid formation being configured to receive and retain the single-service beverage media container, the single-service beverage media container containing a beverage media, the lid formation comprising a primary beverage outlet, a container-receiving aperture, an upper lid profile, and a container retention mechanism, the upper lid profile comprising an outer lid peripheral portion and a stepped lid formation radially inward from the outer lid peripheral portion and radially outward from the container-receiving aperture, the stepped plug portion and the stepped lid portion being spaced from one another, the single-service beverage media container being receivable in the container-receiving aperture and retainable by the container retention mechanism, the plug body plugging the lid formation above the single-service beverage media container, the at least one nozzle extending downwardly from the plug body for piercing the upper seal; and
   a primary liquid container, the lid formation being attachable to the primary liquid container thereby forming a lid-container combination, the liquid being directable through the at least one nozzle and through the single-service beverage media container for outputting the beverage from the single-service beverage media container through the lid formation and into the primary liquid container for enabling the consumer to consume the beverage.

2. The beverage service system of claim 1 wherein the single-service beverage media container comprises an upper peripheral edge and the container retention mechanism comprises an edge-receiving groove, the upper peripheral edge being receivable in the edge-receiving groove, the edge-receiving groove receiving and retaining the upper peripheral edge thereby preventing inadvertent removal of the single-service beverage media container from the lid formation during beverage consumption.

3. The beverage service system of claim 2 wherein the single-service beverage media container comprises at least one outwardly extending support ledge, the at least one outwardly extending support ledge being vertically supported by an inner, flange support structure of the lid formation.

4. The beverage service system of claim 1 comprising in combination, a liquid delivery apparatus, the liquid delivery apparatus for directing the liquid through the single-service beverage media container for outputting the beverage therefrom into the primary liquid container.

5. The beverage service system of claim 4 wherein the lower plug profile comprises an outer plug peripheral portion, the outer lid peripheral portion having an upper surface and the outer plug peripheral portion having a lower surface, wherein the upper surface of the outer lid peripheral portion is parallel to and spaced apart from the lower surface of the outer plug peripheral portion to form a first peripheral space when the central portion is fully engaged with the upper seal of the single service beverage media container in the arcuately depressed seal configuration.

6. The beverage service system of claim 5 wherein the plug-nozzle assembly comprises a series of nozzles, the series of nozzles for directing a series of liquid streams through the single-service beverage media container, the series of liquid streams for increasing liquid pressure within the single-service beverage media container.

7. The beverage service system of claim 4 wherein the liquid delivery apparatus comprises an assembly-receiving profile and the lid-container combination comprises an upper assembly profile, the assembly-receiving profile being sized and shaped to receive the upper assembly profile such that opposed surface portions of the liquid delivery apparatus and the lid-container combination are substantially parallel.

8. The beverage service system of claim 4 wherein the liquid delivery apparatus enables the consumer to consume the beverage from the single-service beverage media container while in a vehicle outfitted with the liquid delivery apparatus.

9. The beverage service system of claim 4 wherein the liquid delivery apparatus comprises means for receiving a remotely initiated signal to direct the liquid through the single-service beverage media container for outputting the beverage therefrom into the primary liquid container.

10. The beverage service system of claim 1 wherein the single-service beverage media container is provided within an individual package assembly, the individual package assembly comprising, in assembled combination, the single-service beverage media container, the lid formation, and the primary liquid container.

11. A beverage service assembly, the beverage service assembly comprising:

a single-service beverage media container, the single-service beverage media container comprising an upper seal;

a plug-nozzle assembly, the plug-nozzle assembly comprising a plug body and at least one nozzle, the plug body comprising a lower plug profile, the lower plug profile comprising a central portion, a stepped plug portion radially outward from the central portion, and an outer peripheral flange radially outward from the stepped plug portion, the central portion being convex relative to the upper seal of the single-service beverage media container, the central portion of the plug body arcuately depressing the upper seal in an arcuately depressed seal configuration when engaged therewith for preventing a liquid to pass between the plug-nozzle assembly and the upper seal of the single service beverage media container; and a lid formation, the lid formation being configured to receive and support the single-service beverage media container, the lid formation comprising a container-receiving aperture, a container support mechanism, an outer lid peripheral portion and a stepped lid formation radially inward from the outer lid peripheral portion and radially outward from the container-receiving aperture, the stepped plug portion and the stepped lid portion having a spacing therebetween in the arcuately depressed seal configuration, the single-service beverage media container being receivable in the container-receiving aperture and supportable by the container support mechanism, the plug body plugging the lid formation and the at least one nozzle for piercing the upper seal of the single service beverage media container when in the arcuately depressed seal configuration.

12. The beverage service assembly of claim 11 comprising, in combination, a liquid container, the lid formation being attachable to the liquid container for enabling a consumer to position the single-service beverage media container relative to the liquid container.

13. The beverage service assembly of claim 12 wherein the lid formation comprises a primary beverage outlet, the liquid being directable through the single-service beverage media container for outputting a beverage into the liquid container, the primary beverage outlet for enabling the consumer to consume the beverage from the liquid container.

14. The beverage service assembly of claim 11 wherein the lid formation comprises at least one container retention mechanism, the at least one container retention mechanism for preventing inadvertent removal of the single-service beverage media container from the lid formation.

15. The beverage service assembly of claim 11 wherein the single-service beverage media container comprises at least one container retention mechanism, the at least one container retention mechanism for preventing inadvertent removal of the single-service beverage media container from the lid formation.

16. A beverage service system for enabling a consumer to consume a beverage from a single-service beverage media container, the beverage service system comprising:

a plug-nozzle assembly, the plug-nozzle assembly comprising a plug body and at least one nozzle, the plug body comprising a lower plug profile, the lower plug profile comprising a central portion, the central portion being convex relative to an upper seal of the single-service beverage media container, the central portion of the lower plug profile arcuately depressing the upper seal into an arcuately depressed seal configuration when engaged therewith for preventing a liquid to pass between the plug-nozzle assembly and the upper seal of the single-service beverage media container;

a lid formation, the lid formation being configured to receive and retain the single-service beverage media container, the lid formation comprising a primary beverage outlet, a container-receiving aperture, an upper lid profile, and a container retention mechanism, the single-service beverage media container being receivable in the container-receiving aperture and retainable by the container retention mechanism, the plug body plugging the lid formation above the single-service beverage media container, the at least one nozzle extending downwardly from the plug body for piercing the upper seal;

the upper lid profile comprising an outer lid peripheral portion, the lower plug profile comprising an outer plug peripheral portion, the outer lid peripheral portion having an upper surface and the outer plug peripheral portion having a lower surface, wherein the upper surface of the outer lid peripheral portion is parallel to and spaced apart from the lower surface of the outer plug peripheral portion to form a first peripheral space when the central portion of the lower plug profile is fully engaged with the upper seal of the single service beverage media container in the arcuately depressed seal configuration; and a primary liquid container, the lid formation being attachable to the primary liquid container thereby forming a lid-container combination, the liquid being directable through the at least one nozzle and through the single-service beverage media container for outputting the beverage from the single-service beverage media container through the lid formation and into the primary liquid container for enabling the consumer to consume the beverage.

17. The beverage service system of claim 16 wherein the plug body comprises a stepped plug formation, the stepped plug formation being formed radially inward from the outer plug peripheral portion and radially outward from the central portion, the stepped plug formation and the stepped lid formation being spaced from one another coextensively with the first peripheral space.

18. The beverage service system of claim 17 wherein the stepped plug formation and the stepped lid formation, being spaced from one another, allow for a packaging envelope to extend therebetween.

* * * * *